US011584321B2

(12) United States Patent
Brozovich et al.

(10) Patent No.: US 11,584,321 B2
(45) Date of Patent: *Feb. 21, 2023

(54) METHOD AND SYSTEM FOR REPORTING DIAGNOSTIC TROUBLE CODE SET IN VEHICLE IS COLLISION-RELATED

(71) Applicant: Snap-on Incorporated, Kenosha, WI (US)

(72) Inventors: Roy S. Brozovich, Campbell, CA (US); Patrick S. Merg, Hollister, CA (US); Joshua C. Covington, San Juan Bautista, CA (US); Joshua D. Williamson, Manteca, CA (US); Oswaldo Neri, Kingwood, TX (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,148

(22) Filed: Apr. 14, 2022

(65) Prior Publication Data
US 2022/0242351 A1 Aug. 4, 2022

Related U.S. Application Data

(63) Continuation of application No. 17/010,760, filed on Sep. 2, 2020, now Pat. No. 11,338,750, which is a (Continued)

(51) Int. Cl.
*B60R 21/013* (2006.01)
*G07C 5/00* (2006.01)
(Continued)

(52) U.S. Cl.
CPC ............ *B60R 21/013* (2013.01); *G07C 5/008* (2013.01); *G07C 5/0808* (2013.01); *B60R 2021/0027* (2013.01)

(58) Field of Classification Search
CPC .......... B60R 21/013; B60R 2021/0027; G07C 5/008; G07C 5/0808; G07C 2205/02; G07C 5/006; G07C 5/0825
See application file for complete search history.

(56) References Cited

U.S. PATENT DOCUMENTS 5,182,863 A   2/1993  Rando
5,295,073 A   3/1994  Celette
(Continued)

FOREIGN PATENT DOCUMENTS

EP        2667335 A1      11/2013
KR     20150117561 A      10/2015

OTHER PUBLICATIONS

CCC; Technology Change Agents and the Future of Auto Claims, predicting the future by inventing it; Retrieved from Internet:<https://www.cccis.com/claims> on Sep. 19, 2018.
(Continued)

*Primary Examiner* — Sisay Yacob
(74) *Attorney, Agent, or Firm* — McDonnell Boehnen Hulbert & Berghoff LLP

(57) ABSTRACT

A method and computing system for determining whether a DTC set in a vehicle involved in a collision is collision-related or non-collision-related. The method can include determining a vehicle model associated with the vehicle, determining a DTC set within an ECU in the vehicle, determining a damaged portion in the vehicle, determining the DTC is collision-related, and outputting a collision report that indicates the DTC is collision-related. The determined damaged portion indicates where the vehicle was damaged by the collision. Determining the DTC is collision-related can include determining the damaged portion in the vehicle matches a reference vehicle portion associated with both a component attributable to setting the DTC and the vehicle model associated with the damaged vehicle. The
(Continued)

collision report can indicate that a different DTC set by the same or a different ECU in the vehicle is non-collision-related.

20 Claims, 33 Drawing Sheets

Related U.S. Application Data continuation of application No. 16/245,059, filed on Jan. 10, 2019, now Pat. No. 10,773,671.

(51) Int. Cl.
  *G07C 5/08* (2006.01)
  *B60R 21/00* (2006.01)

(56) References Cited

U.S. PATENT DOCUMENTS

| | | | |
|---|---|---|---|
| 5,737,085 A | 4/1998 | Zollars et al. | |
| 6,470,303 B2 | 10/2002 | Kidd et al. | |
| 8,239,220 B2 | 8/2012 | Kidd et al. | |
| 8,401,878 B2 | 3/2013 | Stender et al. | |
| 8,424,752 B2 | 4/2013 | Rothschild | |
| 8,515,152 B2 | 8/2013 | Siri | |
| 8,712,893 B1 | 4/2014 | Brandmaier et al. | |
| 8,954,226 B1 | 2/2015 | Binion et al. | |
| 9,508,200 B1 | 11/2016 | Mullen et al. | |
| 10,013,679 B1 | 7/2018 | Lewis et al. | |
| 10,773,671 B2 | 9/2020 | Brozovich et al. | |
| 2005/0192727 A1* | 9/2005 | Shostak | G07C 5/0808 701/1 |
| 2005/0273218 A1* | 12/2005 | Breed | G07C 5/085 701/2 |
| 2009/0018859 A1 | 1/2009 | Purifoy et al. | |
| 2012/0116630 A1 | 5/2012 | Howell et al. | |
| 2012/0297337 A1 | 11/2012 | St. Denis et al. | |
| 2014/0019280 A1 | 1/2014 | Medeiros et al. | |
| 2015/0039397 A1* | 2/2015 | Fuchs | G06Q 30/0283 705/7.35 |
| 2015/0112504 A1 | 4/2015 | Binion et al. | |
| 2015/0154712 A1 | 6/2015 | Cook | |
| 2016/0035150 A1* | 2/2016 | Barfield, Jr. | G05B 23/0254 701/29.3 |
| 2016/0178465 A1 | 6/2016 | Smith et al. | |
| 2017/0262815 A1 | 9/2017 | Shipman et al. | |
| 2020/0223385 A1 | 7/2020 | Brozovich et al. | |
| 2020/0398777 A1 | 12/2020 | Brozovich et al. | |

OTHER PUBLICATIONS

Toyota Motor Corporation; Toyota Service Blog, Toyota Camry Repair. Diagnosis display Detailed Description; Aug. 6, 2017.
Chrysler Client Services; Collision Information / Standard Procedure, Service After a Supplemental Restraint System Deployment; 2018—LX—Chrysler 300—3.6L V6 V.V.T.; Retrieved from Internet: <https://www.techauthority.com> on Sep. 25, 2018, pp. 1-4.
Occipital, Inc.; Precise 3D Vision for Embedded Applications; Retrieved from Internet: <https://structure.io/embedded> on Feb. 22, 2018, pp. 1-8.
Vehicle Scans LLC; Vehicle Scans, High Quality 3D Scans, Retrieved from Internet: <http://www.vehiclescans.com/resources> on Feb. 29, 2018, pp. 1-6.
Bosch Automotive Service Solutions GMBH; Crash Data Retrieval Tool; F-00K-108-990, Dec. 20, 2013.
Occipital, Inc.; Structure Sensor—3D scanning, augmented reality, and more for mobile devices; Retrieved from Internet: <https://structure.io/> on Feb. 22, 2018, pp. 1-6.
General Motors Corporation; GM STG (Service Technology Group), 1992 VIN Cards,—Retrieved from Internet: <http://imaworkinprogress.com/modules/tech/vin_cards.html>; Last Updated Nov. 21, 2012.
Collision Industry Electronic Commerce Association (CIECA); BMS Data Migration Guide; Retrieved from Internet: <https://www.cieca.com/editor_upload/File/Road-Maps/EMS2BMS%20Data%20Migration%20Guide.pdf> on Jan. 9, 2018.
Collision Industry Electronic Commerce Association (CIECA); Data Standards, Retrieved from Internet: <http://www.cieca.com/info.php?pnum=75906443538b12> on Jan. 9, 2018.
Collision Industry Electronic Commerce Association (CIECA); EMS to BMS Mapping, Retrieved from Internet: <http://www.cieca.com/info.php?pnum=95904e8a7424dc> on Jan. 9, 2018.
Collision Industry Electronic Commerce Association (CIECA); Repair Order, Retrieved from Internet: <http://www.cieca.com/info.php?pnum=75906088ac1a5e> on Jan. 9, 2018.
Collision Industry Electronic Commerce Association (CIECA); Vehicle Diagnostic Scanning, Retrieved from Internet: <http://www.cieca.com/info.php?pnum=4592070c2ca0a6> on Jan. 9, 2018.
Collision Industry Electronic Commerce Association (CIECA); Work Products; Retrieved from Internet: <http://www.cieca.com/info.php?pnum=55904eaaec1983> on Jan. 9, 2018.
Collision Industry Electronic Commerce Association (CIECA); Repair Order Folder Service XML Implementation Guide Appendix C Business Usage FAQs; CIECA Release 2009-R2 & Later, Beginning Oct. 2009.
Collision Industry Electronic Commerce Association (CIECA); Attachment XML Service XML Implementation Guide Appendix C Business Use Cases and Standard XML Implementation Examples, CIECA Release 2004R2 & Later Beginning Nov. 2004, Mar. 28, 2012.
Collision Industry Electronic Commerce Association (CIECA); Business Message Suite (BMS); Version 5.6.0 For Release 2017R2, Oct. 2017.
Collision Industry Electronic Commerce Association (CIECA); Scan Services XML Implementation Guide, CIECA Release 2017R2 & Later; Beginning Oct. 2017.
Collision Industry Electronic Commerce Association (CIECA); Scan Messages XML Implementation Guide Appendix C Business Usage FAQs, CIECA Release 2017R2 & Later Beginning Oct. 2017.
Volker Lantzsch; Volkswagen Group of America, A Short Story of On Board Diagnostics; Sep. 29, 2009.
Interactive Mathematics; Introduction to Vectors, 7. Vectors in 3-D Space; Retrieved from Internet: <https://www.intmath.com/vectors/7-vectors-in-3d-space.php> on Sep. 29, 2009, pp. 1-3.
Michelle Hellyar; CCC Introduces AI Damage Detection for all Major U.S. Vehicle Types; Retrieved from Internet: <https://www.cccis.com/category/companynews/>; Apr. 25, 2018.
FCA US LLC; MOPAR, Scan Tool Position Statement, Feb. 15, 2018.
John Huetter; RDN (Repairer Driven News); CCC: A.I. Claims tech could be offered to shops too; Dec. 4, 2018.
My Airbags; How can I tell if my belt is a single stage belt or dual stage belt or even triple stage?, Apr. 24, 2018.
Tilo Voitel and Toby Terpstra, Kineticorp, LLC; Benefits of 3D Laser Scanning in Vehicle Accident Reconstruction, Apr. 10, 2012.
Toby Terpstra, Tilo Voitel, and Alireza Hashemian; A Survey of Multi-View Photogrammetry Software for Documenting Vehicle Crush; SAE Technical Paper 2016-01-1475, 2016, doi:10.4271/2016-01-1475; published Apr. 5, 2016.
Vehicle Identification Numbers (VIN codes)/Toyota/VIN Codes; Retrieved from Internet <https://en.wikibooks.org/wiki/Vehicle_Identification_Numbers_(VIN_codes)/Toyota/VIN_Codes>; last edit Sep. 13, 2017.
Illinois Department of Transportation, Divsion of Traffic Safety; Crash Information Staff and Crash Records Staff; 2014 Illinois Crash Facts and Statistics; Dec. 4, 2015.
Robson Forensic, Inc.; Event Data Recorded (EDR) Reports: Understanding the Basics—Expert Article; Feb. 26, 2015.
Association for Safe International Road Travel (ASIRT), Annual Global Road Crash Statistics, Retrieved from Internet <https://www.asirt.org/safe-travel/road-safety-facts/>; Sep. 15, 2017.
OBD Solutions; STN1110: Multiprotocol OBD to UART Interpreter IC; Retrieved from Internet <https://www.obdsol.com/solutions/chips/stn1110/> on Sep. 22, 2017.

(56) References Cited

OTHER PUBLICATIONS

Cornell Law School; Legal Information Institute, 40 CFR 86.010-18—On-board Diagnostics for engines used in applications greater than 14,000 pounds GVWR; Retrieved from Internet <https://www.law.cornell.edu/cfr/text/40/86.010-18#k_4_iii> on Sep. 15, 2017.
John Huetter; Repair Driven News; CCC unveils damage-detection AI with customer-friendly 'heat maps'; Apr. 27, 2018.
A&M Forensics and Engineering, Inc.; Bosch and Kia Crash Data Retrieval System; Retrieved from Internet <http://adamson-engineering.com/our-services/passenger-vehicle-acm/> on Sep. 15, 2017.
I-Car; Repairability Technical Support; Toyota/Lexus/Scion Position Statement: Pre- and Post-Repair System Scanning; Jul. 28, 2016.
x-ingineer.org; Automotive Engineering, Internal Combustion Engines, Diagnostics, On-Board Diagnostics (OBD)—Introduction to the Modes of Operation (Diagnostic Services); Retrieved from Internet <https://web.archive.org/web/20171029174114/https://x-engineer.org/automotive-engineering/internal-combustion-engines/diagnostics/on-board-diagnostics-obd-modes-operation-diagnostic-services/>; archived on Oct. 29, 2017.
Logan Diagnostic; Bosch crash data retrieval system; Nov. 22, 2007.
Steve Carlson; Electronic Design; Ethernet Standard Opens the Door to Advanced Connected-Car Design; Jun. 21, 2016.
Just Answer; Where can I find the location of 2010 suburban airbag sensors?; Retrieved from Internet <https://www.justanswer.com/chevy/3y5hp-find-location-2010-suburban-airbag-sensors.html>; Sep. 2, 2010.
Precision Simulations, Inc; Vehicle Crush Analysis with Laser Scanning; Retrieved from Internet <http://www.precisionsim.com/blog/2015-blog-posts/oct-2015-blog-posts/vehicle-crush-analysis> PSI Blog; Oct. 20, 2015.
IXIA; Automotive Ethernet: An Overview, white paper; 915-3510-01, Rev. A, May 2014.
International Searching Authority; International Search Report and Written Opinion for International Application No. PCT/US2019/060396 dated Mar. 18, 2020.

\* cited by examiner

69 →

| VEHICLE MODEL: 2017 BETA TANGO | ← 75 |
| --- | --- |

```
VEHICLE MODEL: 2017 BETA TANGO
DATE: FEBRUARY 18, 2018, 09:04:10
TIME   VS    RPM    BRAKES   SEAT BELT
-5     45    2,000    OFF       ON
-4     50    2,100    OFF       ON
-3     51    2,150    OFF       ON
-2     52    2,200    OFF       ON
-1     40    1,785    ON        ON
TCS: ON,  ABS: OFF, PDOF: +30°
LAT. ACCEL: 3.5G YAW: -30°/SEC
```

DAMAGE: RT. FRT. FENDER, B-PILLAR, FRT. ROW RT. SB RET. PRE-TENSIONER, RT. FRT. WSS  ← 77

FIG. 3D

VEHICLE REFERENCE DATA

VEHICLE MODEL: VM1 — 302, 303, 304

| ECU | ECU ID | PROTOCL | DTC | RELATED COMPONENT | DTC | COMPONENT LOCATION | PROCEDURE |
|---|---|---|---|---|---|---|---|
| PCM | $10 | J1850 | P0095 | AMBIENT AIR TEMP. SENSOR (AATS) | 0.9% | RF | R&R1 |
| PCM | $10 | J1850 | P0095 | AATS WIRE | 0.0006% | RFQ | CR4 |
| ABS | $20 | J1850 | C0040 | WHEEL SPEED CIRCUIT | 2.5% | RF | R2 |

305, 306, 307, 308, 309

PROCEDURE — 311
REPLACE AATS: R&R1
RESET: R2
CALIBRATION: C1
(LRQ, RRQ, LR, RR) CIRCUIT REPAIR: CR4

VDM — 312
VIN REQUEST FROM PCM:
$10 F1 01 DA

WARNING — 310
WARNING #1 (LFU, RFU, LF, RF)
WARNING #2 (LRQ, RRQ, LR, RR) — 360

| | PID1 | PID2 | PID3 | PID4 | PID5 |
|---|---|---|---|---|---|
| MILEAGE: M1 | 50 | 128 | 15 | 88 | 128 |
| FAULT | 10 | 147 | 25 | 63 | 75 |

361

ASSOCIATED DTC: P0095    POSSIBLE RCD DATA 805, 806, 808, 809, 811, 812, 820, 821, 822, 823, 824

VEHICLE IMAGE — 313
FRONT: IMG456
REAR: IMG865G
LEFT SIDE: IMG46G
RIGHT SIDE: IMG901G
RIGHT SIDE: IMG901B — 301

MULTI-STAGE AIRBAGS: DRIVER-FRONT, PASSENGER-FRONT
POI DATA 804, 807, 810 — 867

VEHICLE MODEL: VM2 — 340

VEHICLE MODEL: VM3 — 350

MULTIPLE VEHICLE MODELS: VM1, VM2, ... VMX ←801
POI DAMAGE
1. ANY COLLISION WITH AIR BAG DEPLOYMENT ←804
POSSIBLE RCD
1. ALL SEAT BELTS CONNECTED AT TIME OF COLLISION ←805
2. ALL SEAT BELT RETRACTOR PRE-TENSIONERS FOR SEAT BELTS CONNECTED AT TIME OF COLLISION ←806

VEHICLE MODEL: VM1 ←802
POI DAMAGE
1. RIGHT FRONT FENDER ←807
POSSIBLE RCD
1. B-PILLAR ←808
2. FRONT ROW RIGHT SEAT BELT RETRACTOR PRE-TENSIONER ←809

POI DAMAGE
1. LEFT FRONT FENDER ←810
POSSIBLE RCD
1. B-PILLAR ←811
2. FRONT ROW LEFT SEAT BELT RETRACTOR PRE-TENSIONER ←812

RESTRAINT / SAFETY COMPONENTS ←819
1. COLLAPSIBLE STEERING COLUMN ←820
2. INSTRUMENT PANEL KNEE BOLSTERS ←821
3. SEAT BELTS ←822
4. SEAT BELT RETRACTOR PRE-TENSIONERS ←823
5. AIR BAGS ←824

VEHICLE MODEL: VM2 ←803
POI DAMAGE
1. RIGHT FRONT FENDER ←813
POSSIBLE RCD
1. B-PILLAR ←814
2. RIGHT-HAND BODY HARNESS LOCATED IN RIGHT-SIDE B-PILLAR ←815

POI DAMAGE
1. LEFT FRONT FENDER ←816
POSSIBLE RCD
1. B-PILLAR ←817
2. LEFT-HAND BODY HARNESS LOCATED IN LEFT-SIDE B-PILLAR ←818

COLLISION REPORT 69

SHOP ID: AAA ←—510
TECHNICIAN ID: BBB ←—511
VEHICLE MODEL ID: YMM ←—512
CUSTOMER NAME: DDD ←—513
CUSTOMER INSURANCE COMPANY ID: 24 ←—514
REPAIR DATES: 15-SEP-2017 TO 18-SEP-2017 ←—515

COLLISION IMAGES ←—523

 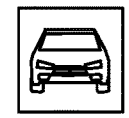

COLLISION DATE: 08-SEP-2017 ←—516
COLLISION TIME: 13:45:57 ←—517

←—518
COLLISION-RELATED DTC: B0051 (08-SEP-2017, 13:45-57), C0040, C0070 ←—519

←—520
NON-COLLISION-RELATED DTC: B0520, B1182 (31-AUG-2017, 07:15:05), C0085, ←—521

| REPAIR PARTS | UNIT COST | QTY | TOTAL COST |
|---|---|---|---|
| SEAT BELT R1,L | $150 | 1 | $150 |
| SEAT BELT R2,L | $150 | 1 | $150 |
| SEAT BELT R1,M | $150 | 1 | $150 |
| SEAT BELT RET. P-TEN. | $150 | 4 | $600 |
| LT. FRONT FENDER | $875 | 1 | $875 |
| WHEEL SPD. SNSR. | $80 | 1 | $80 |

←—522

LABOR TIME: 19 HOURS ←—524
LABOR RATE: $XX.XX / HR

TOTAL CHARGE: $X,XXX.XX ←—525

FIG. 17

METHOD AND SYSTEM FOR REPORTING DIAGNOSTIC TROUBLE CODE SET IN VEHICLE IS COLLISION-RELATED

CROSS REFERENCE TO RELATED APPLICATION

This application is a continuation application of U.S. patent application Ser. No. 17/010,760, filed on Sep. 2, 2020 and published on Dec. 24, 2020 as United States Patent Application Publication No. 2020/0398777 A1. U.S. patent application Ser. No. 17/010,760 is a continuation application of U.S. patent application Ser. No. 16/245,059, filed on Jan. 10, 2019 and issued on Sep. 15, 2020 as U.S. Pat. No. 10,773,671 B2. U.S. patent application Ser. No. 17/010,760 and U.S. patent application Ser. No. 16/245,059 are incorporated herein by reference.

BACKGROUND

Vehicle collisions are costly. For example, the Illinois Department of Transportation issued a report in 2015 indicating that there were 296,049 crashes involving motor vehicles in Illinois in 2014. That same report indicates that the total estimated cost of crashes in Illinois for 2014 was $5.8 billion. A substantial portion of those costs are associated with repairing the crashed vehicles (i.e., vehicles involved in a crash). In some instances, a crashed vehicle will display a malfunction indicator lamp (MIL) to indicate that a diagnostic trouble code (DTC) is currently set to an active status. The DTC can be indicative of a particular vehicle malfunction. Repairing a crashed vehicle can include repairing the vehicle malfunction so that the MIL is not illuminated when the vehicle owner drives the repaired vehicle away from the repair shop.

In many instances, an insurance company, such as the State Farm Mutual Automobile Insurance Company, issues an insurance policy that covers at least some of the costs associated with repairing a policy holder's crashed vehicle. Many insurance policies do not cover the costs associated with repairing a vehicle malfunction that existed before a vehicle crash or a vehicle malfunction that arose while repairing the crashed vehicle.

Many insurance companies require or determine estimates for repairing a crashed vehicle. A problem in determining an estimate to repair a crashed vehicle is determining whether or not a DTC set to the active status within the crashed vehicle existed before the vehicle crash. Existing vehicle scan tools do not determine whether a DTC set in a vehicle is collision-related.

Furthermore, in many situations, a vehicle body repair person is skilled in repairing the body of a damaged vehicle, but is unskilled as to using a vehicle scan tool to diagnose or repair a vehicle because of the complexity of the scan tool. A diagnostic tool configured to determine if a DTC is collision-related and/or that is simpler to use would be useful to many vehicle body repair persons.

OVERVIEW

Several example implementations that relate to diagnosing or repairing a vehicle damaged during a collision are described herein. The implementations can include determining whether a DTC set in the vehicle is collision-related or non-collision related.

In a first implementation, a method is provided. The method includes: (i) determining, by one or more processors, a vehicle model associated with a first vehicle, (ii) determining, by the one or more processors, a first DTC set within a first electronic control unit (ECU) in the first vehicle, (iii) determining, by the one or more processors, a first damaged portion of the first vehicle, wherein the first damaged portion indicates where the first vehicle was damaged by a collision; (iv) determining, by the one or more processors, the first DTC is collision-related, wherein determining the first DTC is collision-related includes determining, by the one or more processors, the first damaged portion of the first vehicle matches a reference vehicle portion associated with both a component attributable to setting the first DTC and the vehicle model associated with the first vehicle, and (v) outputting, by the one or more processors, a collision report that indicates the first DTC is collision-related.

In a second implementation, a computing system is provided. The computing system includes (a) a computer-readable memory having stored thereon a reference vehicle portion associated with both a component attributable to setting a first DTC and a vehicle model associated with a first vehicle, and (b) one or more processors configured to refer to the computer-readable memory. The one or more processors is programmed to: (a) determine the vehicle model associated with the first vehicle; (b) determine the first DTC set within a first ECU in the first vehicle; (c) determine, a first damaged portion of the first vehicle, wherein the first damaged portion indicates where the first vehicle was damaged by a collision; (d) determine the first DTC is collision-related, wherein determining the first DTC is collision-related includes determining the first damaged portion of the first vehicle matches the reference vehicle portion associated with both the component attributable to setting the first DTC and the vehicle model associated with the first vehicle; and (e) output a collision report that indicates the first DTC is collision-related.

In a third implementation, a computer readable memory is provided. The computer readable memory has stored thereon instructions executable by one or more processors to cause a computing system to perform functions. The functions include (a) determining a vehicle model associated with a first vehicle; (b) determining a first DTC set within a first ECU in the first vehicle; (c) determining a first damaged portion of the first vehicle, wherein the first damaged portion indicates where the first vehicle was damaged by a collision; (d) determining the first DTC is collision-related, wherein determining the first DTC is collision-related includes determining, by the one or more processors, the first damaged portion of the first vehicle matches a reference vehicle portion associated with both a component attributable to setting the first DTC and the vehicle model associated with the first vehicle; and (e) outputting a collision report that indicates the first DTC is collision-related.

Other implementations will become apparent to those of ordinary skill in the art by reading the following detailed description, with reference where appropriate to the accompanying drawings.

BRIEF DESCRIPTION OF THE DRAWINGS

FIG. 3D is a diagram showing example crash and damage data in accordance with example implementations.

FIGS. 16A and 16B are diagrams showing example vehicle reference data in accordance with the example implementations.

FIG. 17 is a diagram showing an example collision report in accordance with the example implementations.

DETAILED DESCRIPTION

I. Introduction

Figure 1A:
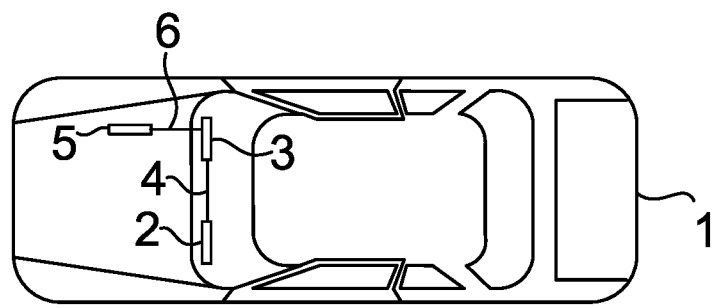
FIG. 1A is a diagram showing a vehicle in accordance with the example implementations.

In this description, a vehicle damaged during and/or due to a collision is at least sometimes referred to as a "damaged vehicle," and a vehicle that is inoperative or that is operative, but exhibiting some fault, is at least sometime referred to as a "malfunctioning vehicle." A malfunctioning vehicle can, but need not necessarily, be a damaged vehicle. In at least some instances, one or more of the faults of the malfunctioning vehicle is due to the vehicle being damaged during a collision. In those or in other instances, one or more of the faults of malfunctioning vehicle is not due to the vehicle being damaged in a collision.

In general, this description pertains to vehicle scanner technology and/or to computing systems configured to perform unconventional functions with respect to a vehicle, such as a damaged vehicle and/or a malfunctioning vehicle. More particularly, at least a portion of this description pertains to a damaged vehicle, and/or to a computing system (e.g., a vehicle scan tool and/or a server) configured to perform unconventional functions with respect to the damaged vehicle. The computing systems described herein can also be used on or with respect to vehicles that have not been damaged due to a collision and that are not exhibiting any fault.

As noted above, a vehicle scan tool is an example of a computing system of the example implementations. A vehicle scan tool (or more simply, a "scanner") is a computing system that is operatively and removably connectable to a vehicle in order to communicate with one or more vehicle components on the vehicle. A vehicle scan tool is not a vehicle component, but can be removably connected to a vehicle component, such as an on-board diagnostic connector, and can communicate with a vehicle component, such as an electronic control unit, using vehicle data messages. The scanner can include a vehicle communication transceiver to transmit vehicle data messages to a vehicle and/or to receive vehicle data messages from a vehicle.

In an example implementation, a scanner can be configured to perform one or more unconventional functions, such as determining whether a DTC set in a vehicle is collision-related and/or determining possible related collision damage (PRCD) to the vehicle based on point-of-impact (POI) damage to the vehicle. In that or another example implementation, the scanner provides the server with information the server uses to determine whether the DTC is collision-related. In those or another example implementation, the scanner and/or the vehicle including the ECU that set the DTC provides the server with information the server uses to determine whether the DTC is collision-related. The scanner and/or the server can determine whether a DTC is non-collision related. A DTC that is collision-related or non-collision related can have a status of current, pending, history, or some other status.

In the prior mentioned example implementations and/or another example implementation, the scanner and/or a server determines PRCD to a damaged vehicle. The vehicle damage determined to be PRCD can include vehicle damage overlooked by a person (e.g., an inspector) inspecting a vehicle for collision damage. Typically, the POI damage is readily visible to the inspector, but the PRCD is not readily visible to the inspector. In some instances, the PRCD is visible, but only after removing one or more other vehicle components. In these example implementations, the scanner and/or the server can include a processor configured to determine the PRCD and/or a user interface that shows the determined PRCD. The user interface can be configured to allow a user to select the PRCD so as to cause a processor to augment a collision report based on the PRCD. The determined PRCD can, but need not necessarily, include text and/or an image representative of vehicle damage to a vehicle.

In any of the aforementioned example implementations, the scanner can be configured to adjust a vehicle that is connected to scanner. The adjustment performed by the scanner can, for example, include resetting a vehicle component, initializing a vehicle component, calibrating a vehicle component, or programming a vehicle component. Resetting a vehicle component can include powering the component off and back on. Programming a vehicle component can include programming the vehicle component for the first time or reprogramming a vehicle component that was programmed previously.

Reprogramming a vehicle component can include deleting a portion of an existing program from the vehicle component prior to writing a new program into the vehicle component. Calibrating a vehicle component can include writing calibration values into a portion of a memory in the vehicle component, the calibration values may be referred to by an executable program executed by a processor in the vehicle component. Initializing a vehicle component can include setting the vehicle component to a particular state, such as a window controller in the window fully-up state or the window fully-down state.

II. Example Vehicle and Operating Environment

FIG. 1A shows a vehicle 1. A vehicle, such as the vehicle 1, is a mobile machine that can be used to transport a person, people, or cargo. A vehicle can be driven or otherwise guided along a path (e.g., a paved road or otherwise) on land, in water, or in the air or outer space. A vehicle can be wheeled, tracked, railed, or skied. A vehicle can be guided by a user within the vehicle or by a user outside of the vehicle by use of a remote control. A vehicle can be guided at least partially autonomously. In the case of an autonomous vehicle, the vehicle can at least sometimes be guided along a path without any person or cargo inside or on the vehicle. A vehicle can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a farm machine, a van (such as a dry or refrigerated van), a tank trailer, a platform trailer, or an automobile carrier. A vehicle can include or use any appropriate voltage or current source, such as a battery, an alternator, a fuel cell, and the like. A vehicle can include or use any desired drive system or engine. That drive system or engine can include items that use fossil fuels, such as gasoline, natural gas, propane, and the like, electricity, such as that generated by a battery, magneto, fuel cell, solar cell and the like, wind and hybrids or combinations thereof. A vehicle can include an electronic control unit (ECU) 3, a data link connector (DLC) 2, and a vehicle communication link 4 that operatively connects the DLC 2 to the ECU 3. The ECU 3 can detect a malfunction in the vehicle and set a DTC indicative of the malfunction to an active status.

A vehicle manufacturer can build various quantities of vehicles each calendar year (i.e., January $1^{st}$ to December $31^{st}$). Some vehicle manufacturers build one vehicle model or multiple different vehicle models. In some instances, a vehicle manufacturer defines a model year for a particular vehicle model to be built. The model year can start on a date other than January $1^{st}$ and/or can end on a date other than December $31^{st}$. The model year can span portions of two or more calendar years. Two or more different vehicle models built by a vehicle manufacturer during a particular calendar year can have the same or different defined model years. The vehicle manufacturer can build vehicles of a vehicle model with different vehicle options. For example, a particular vehicle model can include vehicles with six-cylinder engines and vehicles with eight-cylinder engines. The vehicle manufacturer or another entity can define vehicle identifying information for each vehicle model built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can include indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name), and features of the vehicle (e.g., an engine type). In accordance with that example, the particular vehicle identifying information can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4 Cyl, in which "2004" represents the model year the vehicle was built, "Toyota" represents the name of the vehicle manufacturer Toyota Motor Corporation, Aichi Japan, "Camry" represents a vehicle model name built by that manufacturer, and "4 Cyl" represents an engine type (i.e., a four cylinder internal combustion engine (ICE)) within the vehicle. A person skilled in the art will understand that other features in addition to or as an alternative to "engine type" can be used to identify a vehicle model using particular vehicle identifying information, and for some purposes, a vehicle model could be identified by its vehicle make and vehicle model name M/M. These other features can be identified in various manners, such as a regular production option (RPO) code, such as the RPO codes defined by the General Motors Company LLC, Detroit Mich. Furthermore, the vehicle identifying information can be combined and displayed as a vehicle identification number (VIN). The VIN can be displayed on a VIN label.

The vehicle communication link 4 within the vehicle 1 can include one or more conductors (e.g., copper wire conductors) or can be wireless. As an example, the vehicle communication link 4 can include one or more conductors for carrying vehicle data messages in accordance with a vehicle data message (VDM) protocol. A VDM protocol can include a Society of Automotive Engineers (SAE)® J1850 (PWM or VPW) VDM protocol, an International Organization of Standardization (ISO)® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a MOST® Cooperation VDM protocol (such as the MOST Specification Rev. 3.0 E2, or the MOST® Dynamic Specification, Rev. 3.0.2), or some other VDM protocol defined for performing communications with or within the vehicle 1. Each and every VDM discussed in this description is arranged according to a VDM protocol. The vehicle communication link 4 can be connected to one or more ECU 3 and to the DLC 2.

The ECU 3 can control various aspects of vehicle operation or components within a vehicle. For example, the ECU 3 can include a powertrain (PT) system ECU, an engine control module (ECM) ECU, a powertrain control module (PCM) ECU, a supplemental inflatable restraint (SIR) system (i.e., an air bag system) ECU, an entertainment system ECU, or some other ECU. The ECU 3 can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within a vehicle. The ECU 3 can perform a functional test or a reset procedure in response to receiving a VDM requesting performance of the functional test or the reset procedure. A VDM received by the ECU 3 can include a parameter request that includes a parameter identifier (PID). A VDM transmitted by the ECU 3 can include a response including the PID and a PID data value for the PID. The ECU 3 can be connected to a vehicle component 5, such as a vehicle battery, a sensor, a vehicle chassis, a solenoid, a fuel injector, a fuel pump, or some other vehicle component via a circuit 6. The SIR system can include one or more initiators (sometimes referred to as "squibs") for each air bag in the vehicle. The squibs can include electrical circuitry upon which the SIR ECU can perform self-diagnostics. The SIR ECU can output an electrical current to a squib to initiate deployment of an air bag of the SIR system.

The DLC 2 can include a connector such as an on-board diagnostics (OBD) I connector, an OBD II connector, or some other connector. An OBD II connector can include slots for retaining up to sixteen connector terminals, but can include a different number of slots or no slots at all. As an example, the DLC 2 can include an OBD II connector that meets the SAE J1962 specification such as a connector 16M, part number 12110252, available from Aptiv LLC of Dublin, Ireland. The DLC 2 can include conductor terminals that connect to a conductor in the vehicle 1. For instance, the DLC 2 can include connector terminals that connect to conductors that respectively connect to positive and negative terminals of a vehicle battery. The DLC 2 can include one or more conductor terminals that connect to a conductor of the vehicle communication link 4 such that the DLC 2 is operatively connected to the ECU 3.

Many vehicles require unlocking or engaging some component before the vehicle can be driven or guided along the path. For example, some vehicles that include an ICE and a starter motor require unlocking a key cylinder with a key in order to engage the starter motor to start the ICE. In some instances, the starter motor can be engaged by pushing a push button while also pushing a brake pedal in the vehicle. Some vehicles, such as an electric vehicle, may or may not include an ICE, but still require use of a key or push button before the vehicle can be driven or guided along the path. Moreover, some other vehicles provide for starting a vehicle by bringing a key fob in proximity to the vehicle and positioning a transmission direction selector in a forward or reverse position. Upon starting such vehicles, the vehicles can be driven or guided along a path. Other examples configurations for starting a vehicle are also available.

Each instance of driving or guiding a vehicle along a path is a "drive cycle." For a vehicle that requires a key to start the ICE, the drive cycle can further be defined with respect to the time from when the key is used to start the ICE until such time that the key is used to stop the ICE. For vehicles that require a key to start the ICE, the drive cycle can be referred to as "key cycle." Furthermore, some vehicles track "warm-up cycles," where each warm-up cycle is achieved if an operating temperature of the vehicle reaches at least a threshold temperature since a current drive cycle began.

Figure 1B:
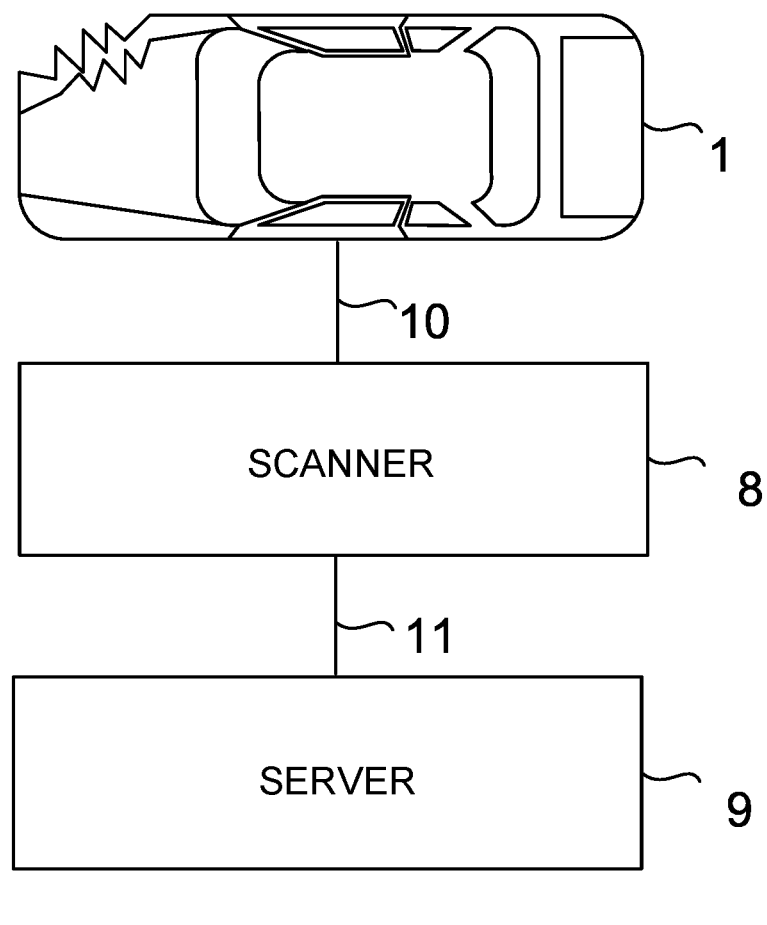
FIG. 1B is a diagram showing an operating environment in which the example implementations can operate.

Next, FIG. 1B is a diagram showing an operating environment 7 in which the example implementations can operate. The operating environment 7 includes the vehicle 1, a scanner 8, a server 9, a vehicle communication link (VCL) 10, and a network 11. FIG. 1B shows that the vehicle 1 has been in a collision. The right side of the vehicle's front end sustained damage during the collision.

The VCL 10 is configured to carry communications between the vehicle 1 and the scanner 8. The VCL 10 can carry other communications, such as communications between the vehicle 1 and one or more other computing systems operatively connected to the VCL 10, communications between the scanner 8 and one or more other computing systems operatively connected to the VCL 10, or communications between two or more devices other than the vehicle 1 and the scanner 8.

The network 11 is configured to carry communications between the scanner 8 and the server 9. The network 11 can carry other communications, such as communications between the scanner 8 and one or more other computing systems operatively connected to the network 11, communications between the server 9 and one or more other computing systems operatively connected to the network 11, or communications between two or more devices other than the scanner 8 and the server 9. The network 11 can include various network components such as switches, modems, gateways, antennas, cables, transmitters, or receivers. The network 11 can include a wide area network (WAN). The WAN can carry data using packet-switched or circuit-switched technologies. The WAN can include an air interface or wire to carry the data. The network 11 can include a network or at least a portion of a network that carries out communications using a Transmission Control Protocol (TCP) and the Internet Protocol (IP), such as the communication network commonly referred to as the Internet.

Figure 2:
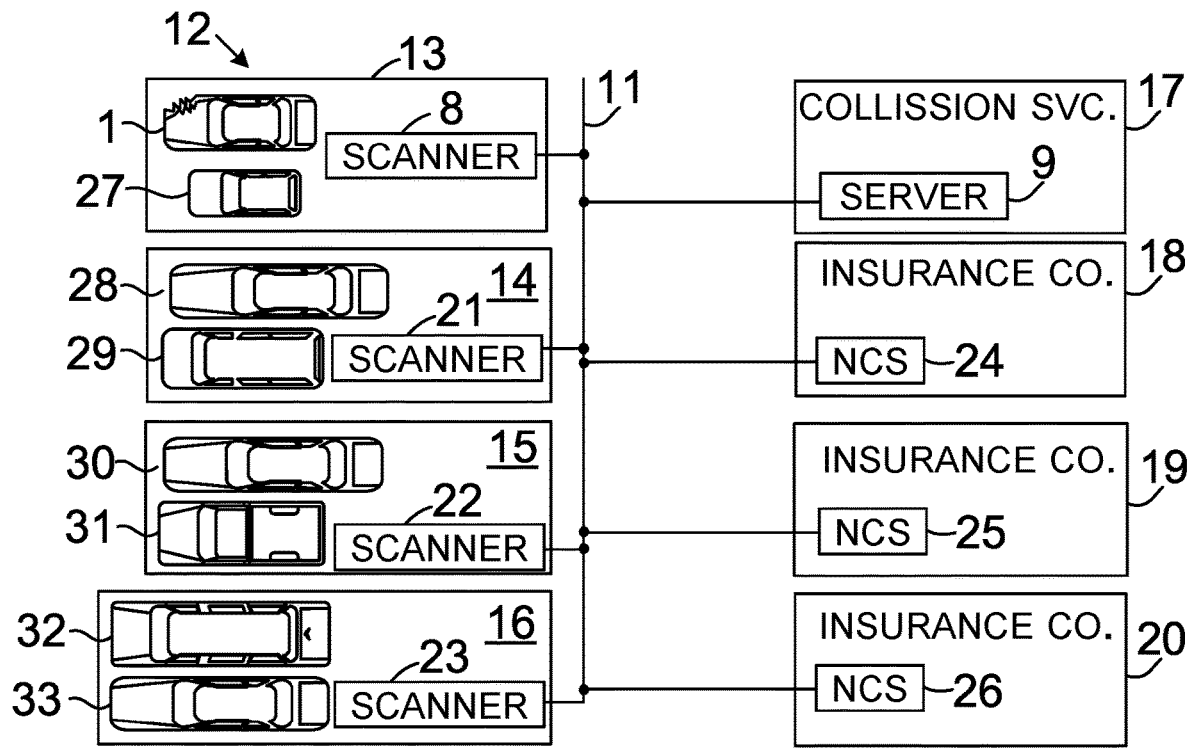
FIG. 2 is a diagram showing an operating environment in which the example implementations can operate.

Next, FIG. 2 is a diagram showing an operating environment 12 in which the example implementations can operate. The operating environment 12 includes aspects of the operating environment 7. The operating environment 12 also includes repair shop 13, 14, 15, 16, a collision services provider 17, and insurance companies 18, 19, and 20. The repair shop 13, 14, 15, 16 include a scanner 8, 21, 22, 23, respectively. The repair shop 13, 14, 15, 16 are business entities at which technicians repair vehicles. The repairs performed at the repair shop 13, 14, 15, 16 can include any of a variety of repairs, such as vehicle body repairs, mechanical repairs, electrical repairs, vehicle maintenance, etc.

Some repair shops are large and can accommodate a large number of vehicles at any given time, whereas some repair shops are small and can accommodate a small number of vehicles at any given time. The repair shop 13 is shown with the vehicle 1 and a vehicle 27. The repair shop 14 is shown with vehicle 28, 29. The repair shop 15 is shown with vehicle 30, 31. The repair shop 16 is shown with vehicle 32, 33. Since the repair shop 13, 14, 15, 16 are example repair shops a person skilled in the art will understand that a different number of vehicles could be at or within one or more of the repair shop 13, 14, 15, 16. A repair shop can include more than one scanner.

The insurance company 18, 19, 20 includes network computing system (NCS) 24, 25, 26, respectively, operatively connected to the network 11. The NCS 24, 25, 26 can include network transceivers for receiving a communication from another device connected to the network 11, such as the scanner 8, 21, 22, 23, or the server 9. The communication received by the insurance company 18, 19, 20 can include a collision report output by a scanner, such as scanner 8, 21, 22, 23, or by the server 9. The collision services provider 17 includes the server 9. The collision services provider 17 can, for example, include a business entity that provides repair information to repair shops. The collision services provider 17 can operate the server 9 to receive repair orders regarding instances of vehicles being serviced and determine from the repair orders characteristics regarding different vehicle models, such as whether or not a DTC is commonly or rarely set in the vehicle models. FIG. 2 shows an implementation in which the repair shop 13, 14, 15, 16, the collision services provider 17, and the insurance company 18, 19, 20 include computing systems operatively connected to the network 11.

III. Example Computing Systems

A. Example Scanner

Figure 3A:
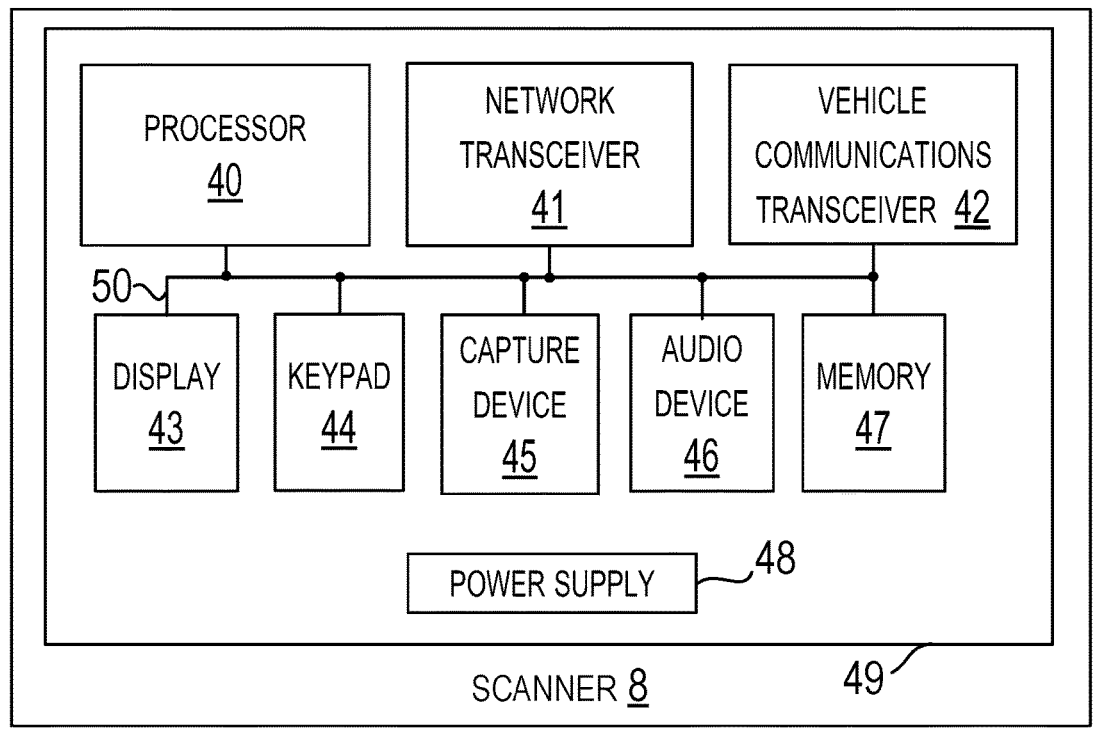
FIG. 3A is a simple block diagram of a scanner in accordance with the example implementations.

Next, FIG. 3A is a simple block diagram of the scanner 8, in accordance with example implementations. The scanner 8 can include one or more of the following: a processor 40, a network transceiver 41, a vehicle communication transceiver 42, a display 43, a keypad, 44, a capture device 45, an audio device 46, or a memory 47. Two or more of those components can be operatively connected via a system bus, network, or other connection mechanism 50. The scanner 8 can also include a power supply 48 and/or a housing 49. The scanner 21, 22, 23 can be configured like any implementation of the scanner 8.

1. Processor

A processor, such as the processor 40 or any other processor discussed in this description (e.g., a processor 440 shown in FIG. 4A), can include one or more processors. A processor can include a general purpose processor (e.g., an INTEL® single core microprocessor or an INTEL® multi-core microprocessor), or a special purpose processor (e.g., a digital signal processor, a graphics processor, an embedded processor, or an application specific integrated circuit (ASIC) processor). A processor can be configured to execute computer-readable program instructions (CRPI). The CRPI discussed in this disclosure, such as the CRPI 60, 460, can include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a conventional procedural programming language, such as the "C" programming language. A processor can be configured to execute hard-coded functionality in addition to or as an alternative to software-coded functionality (e.g., via CRPI). The processor 40 can be programmed to perform any function or combination of functions described herein as being performed by the scanner 8. Anything that a processor receives or transmits, such as data, can, but need not necessarily, be arranged as computer-readable data.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the processor 40, 440 can, but need not necessarily, include (a) an advanced RISC (reduced instruction set computer) machine (ARM) processor (e.g., an AT91SAM4E ARM processor provided by the Atmel Corporation, San Jose, Calif.), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

2. Memory

A memory, such as the memory 47 or any other memory discussed in this description (e.g., a memory 446 shown in FIG. 4A), can include one or more memories. Any memory discussed in this description can thus be referred to as least one memory or one or more memories. A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can include static RAM or dynamic RAM.

A transitory memory can include, for example, CRPI provided over a communication link, such as the network 11. The network 11 can include a digital or analog communication link. The network 11 can include a wired communication link including one or more wires or conductors, or a wireless communication link including an air interface.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," "one or more computer-readable medium," and/or a "system memory." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. Transceivers

A network transceiver, such as the network transceiver 41 or any other network transceiver discussed in this description (e.g., the network transceiver 441 shown in FIG. 4A), can include one or more network transceivers. Each network transceiver includes one or more transmitters configured to transmit data or a communication onto a network, such as the network 11. The network transceiver 41 can transmit any data or communication discussed as being transmitted, output, or provided by the scanner 8 to one or more of the following: the server 9, the NCS 24, 25, 26, the collision service provider 17, or the insurance company 18, 19, 20. Each network transceiver (e.g., the network transceiver 41, 441) includes one or more receivers configured to receive data or a communication carried over a network, such as the network 11. The network transceiver 41 can receive any data or communications discussed as being received by the scanner 8 or the network transceiver 41 from one or more of the following: the server 9, the NCS 24, 25, 26, the collision service provider 17, or the insurance company 18, 19, 20. The network transceiver 41 can transmit a collision report 68 to one or more of the following: the server 9, the NCS 24, 25, 26, the collision service provider 17, or the insurance company 18, 19, 20.

The VCT 42 includes a transceiver configured for transmitting a VDM to the vehicle 1 via the VCL 10 and for receiving a VDM transmitted by the vehicle 1 via the VCL 10. The VCT 42 can include a transceiver (e.g., an integrated transmitter and receiver, or a distinct transmitter and a distinct receiver). In some implementations, a transmitter of the VCT 42 can be configured to transmit a VDM to the vehicle 1 via the VCL 10. The VDM transmitted to the vehicle 1 via the VCL 10 can include a request for diagnostic information (such as a DTC) from the ECU 3. In those implementations, the receiver of the VCT 42 can be configured to receive a VDM transmitted by the vehicle 1 over the VCL 10. The VDM received by the receiver of the VCT via the VCL 10 can include diagnostic information transmitted by the ECU 3. A VDM can include a component identifier, such as an identifier of the ECU 3 that transmits the VDM. The VDM can include data indicative of a DTC set by the ECU 3. The processor 40 can select data from within the VDM and cause the selected data to be displayed by the display 43.

The VCT 42 can include a transceiver (e.g., an integrated transmitter and receiver, or a distinct transmitter and a distinct receiver). The transmitter of the VCT 42 can be configured to transmit a VDM to a vehicle or, in particular, an ECU within the vehicle. The VDM transmitted by the VCT 42 can include a VDM with a request for a DTC set by the ECU. The receiver of the VCT 42 can be configured to receive a VDM transmitted by an ECU over the VCL 10. The VDM received by the VCT 42 can include an OBD II VDM indicative of a DTC set within the vehicle. As an example, a wired transceiver of the VCT 42 can include a transceiver such as a system basis chip with high speed CAN transceiver 33989 provided by NXP Semiconductors, Eindhoven, Netherlands.

The VCT 42 can include and/or be connected to a wiring harness. The wiring harness can be configured to provide a wired connection between the scanner 8 and the vehicle 1, in particular, an ECU in the vehicle storing crash data. In some implementations, the wiring harness is removably connectable to the DLC 2 within the vehicle 1. In those implementations, the DLC 2 can provide the scanner 8 with an indirect connection to the ECU that stores crash data. In some other implementations, the wiring harness is directly connectable to both the scanner 8 and the ECU that stores crash data. The VCT 42 can include and/or connect to one or more connectors, one of which can be located at the end of the wiring harness.

The VCT 42 can include a wireless transceiver to communicate with a separate wireless transceiver within the scanner 8. A transmitter, such as a transmitter in the network transceiver 41 or 441 or in the VCT 42, can transmit radio signals carrying data or a communication, and a receiver, such as a receiver in the network transceiver 41 or 441 or in the VCT 42, can receive radio signals carrying data or a communication. A transceiver with a radio transmitter and radio receiver can include one or more antennas and can be referred to as a "radio transceiver," an "RF transceiver," or a "wireless transceiver."

A radio signal transmitted or received by a radio transceiver can be arranged in accordance with one or more wireless communication standards or protocols such as an Institute of Electrical and Electronics Engineers (IEEE) standard, such as (i) an IEEE 802.11 standard for wireless local area networks (wireless LAN) (which is sometimes referred to as a Wi-Fi standard) (e.g., 802.11a, 802.11b, 802.11g, or 802.11n), (ii) an IEEE 802.15 standard (e.g., 802.15.1, 802.15, 3, 802.15.4 (ZigBee), or 802.15.5) for wireless personal area networks (PANs), (iii) a Bluetooth version 4.1 or 4.2 standard developed by the Bluetooth Special Interest Group (SIG) of Kirkland, Wash., (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are available.

Additionally or alternatively, a transmitter, such as a transmitter in the network transceiver 41 or 441 or in the VCT 42, can transmit a signal (e.g., one or more signals or one or more electrical waves) carrying or representing data or a communication onto a wire (e.g., one or more wires) and a receiver, such as a receiver in the network transceiver 41 or 441 or in the VCT 42, can receive via a wire a signal carrying or representing data or a communication over the wire. The wire can be part of a network, such as the network 11. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data or communication transmitted by a network transceiver, such as the network transceiver 41 or 441, can include a destination identifier or address of a network device to which the data or communication is to be transmitted. The data or communication transmitted by a network transceiver can include a source identifier or address of the system component including the network transceiver. The source identifier or address can be used to send a response to the network device that includes the network transceiver that sent the data or communication.

A network transceiver that is configured to carry out communications over the network 11, such as the network transceiver 41 or 441, can include one or more of the following: a modem, a network interface card, or a chip mountable on a circuit board. As an example the chip can include a CC3100 Wi-Fi® network processor available from Texas Instruments, Dallas, Tex., a CC256MODx Bluetooth® Host Controller Interface (HCI) module available from Texas instruments, or a different chip for communicating via Wi-Fi®, Bluetooth® or another communication protocol.

A device within or coupled to the network 11 or that communicates via the network 11 using a packet-switched technology can be locally configured for a next 'hop' in the network (e.g., a device or address where to send data to, and where to expect data from). As an example, a device (e.g., a transceiver) configured for communicating using an IEEE 802.11 standard can be configured with a network name, a network security type, and a password. Some devices auto-negotiate this information through a discovery mechanism (e.g., a cellular phone technology).

Figure 19:
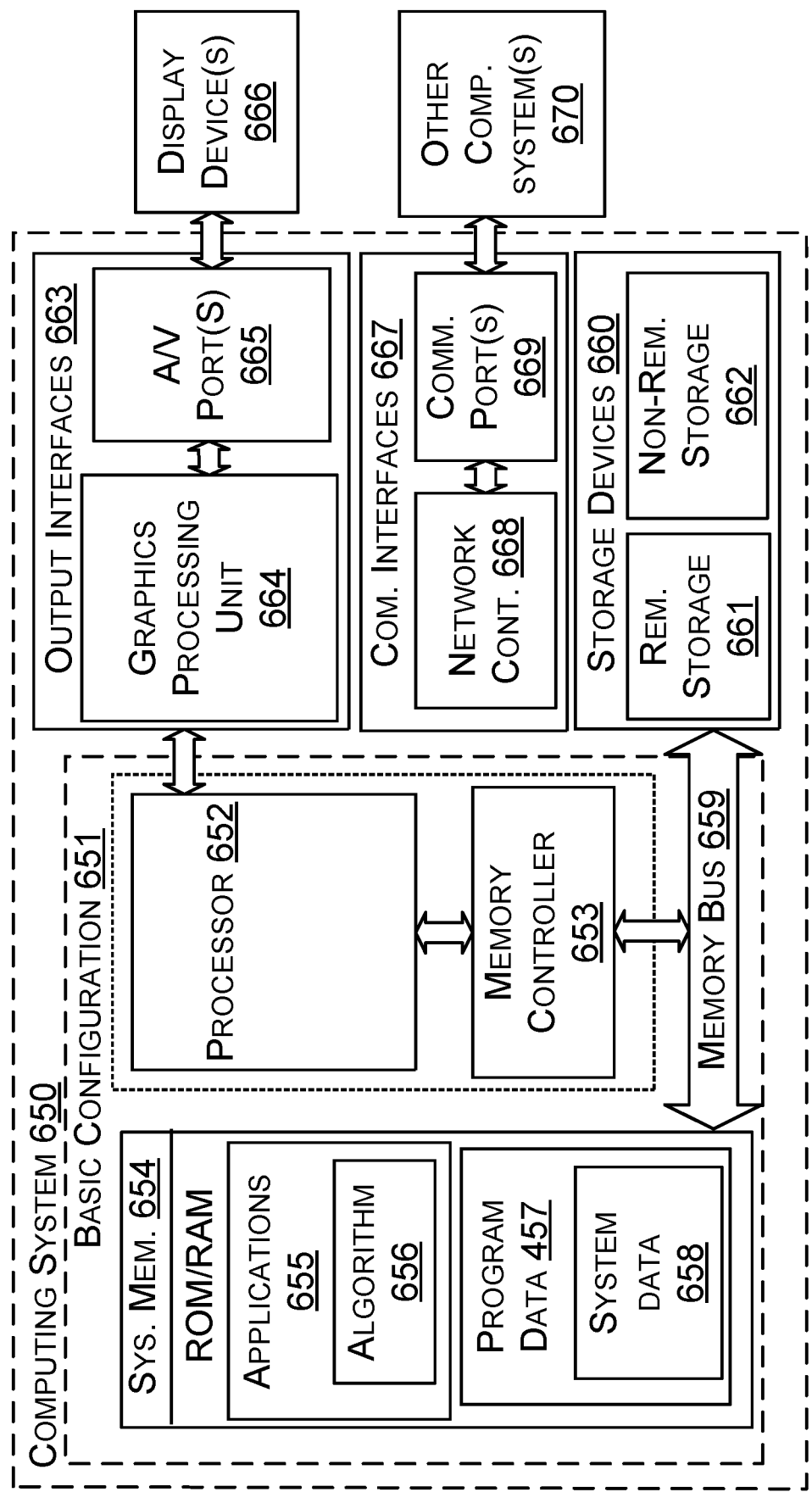
FIG. 19 is a simple block diagram of a computing system in accordance with the example implementations.

The scanner 8 can also include a communication interface 667, a network controller 668, and a communication port 669, as shown in FIG. 19.

4. User Interface Components

One or more components of the scanner 8 can be referred to as a "user interface component." As an example, the display 43, the keypad 44, the capture device 45, and/or the audio device 46 can be referred to as a user interface component. A user interface component can include a control. A control can be used by a user of the scanner 8 to enter an input into the scanner 8, such as an input detectable by the processor 40. A control can include a virtual control of a display screen shown on the display 43. A control can include a hardware control, such as a key of the keypad 44. In one respect, a virtual control can be independent of the keys of the keypad 44. In that case, an input can be entered using the virtual control by use of the display 43, for example by touching the display 43 in proximity to the virtual control. In another respect, a virtual control shown on the display 43 can be associated with a key of the keypad 44. In that case, an input can be entered using the virtual control by use of the key of the keypad 44. The keypad 44 can include a key that is not associated with a virtual control shown on the display. Moreover, the keypad 44 can include a key that is associated with a virtual control of some display screen and that is not associated with a virtual control on one or more other display screens.

The display 43 can, but need not necessarily, include a capacitive touch screen display, a resistive touch screen display, a plasma display, a light emitting diode (LED) display, a cathode ray tube display, an organic light-emitting diode (OLED) display, or a liquid crystal display (LCD). An OLED display can include an active-matrix OLED or a passive-matrix OLED. The LCD can be backlit, color LCD. The display 43 can include a touch screen display with the LCD. For instance, the display 43 can include a capacitive (such as a projective capacitive) touch screen display or a resistive touch screen display. Other examples of the display 43 are available.

The display 43 can include a horizontal scroll bar and a vertical scroll bar. The horizontal scroll bar and the vertical scroll bar can be used to cause the display 43 to display a non-visible portion of an image or a display screen output by the processor 40, 440 to be displayed. The display 43 can display still images, such as a still image of a vehicle. The display 43 can display videos, such as a video with content regarding a warning or procedure pertaining to repairing a vehicle damaged by a collision. The display 43 can display text, such as text with content regarding a warning or procedure pertaining to repairing a vehicle damaged by a collision.

The display 43 can display (e.g., present visually) a display screen that includes graphical objects. For instance, the display screen can show virtual controls via which a user can enter an input pertaining to use of the scanner 8. The input can represent a selection and/or information. As an example, a virtual control can include a graphical button, such as a rectangle surrounding text representative of a selection or information associated with the button. As another example, a virtual control can include a pull-down menu, a check box, and/or a text box for entering textual information. A virtual control configured for entering a selection can be referred to as a "selector." The display screen can, for example, show any of the content shown in FIG. 6A to FIG. 15N. Other examples of content displayable by the display 43 are available. The processor 40 can output a display screen to the display 43. The display screen, output by the processor 40, can be referred to as a "display output."

The keypad 44 can include one or more components configured for use by a user to enter selections or information into the scanner 8. A key configured for entering a selection can be referred to as a selector. The keypad 44 can include one or more control keys, or more simply "key". A key can include a push button, such as a press-and-hold button or a press-and-release button. In some implementations, the keypad 44 includes a hardware keypad with a set of numeric keys, alpha-numeric keys, alphabet keys, or some other hardware keys. In some other implementations, the display 43 includes at least a portion of the keypad 44 that includes soft keys, such as capacitive or resistive keys of a touch screen display. In still other implementations, the keypad includes one or more hardware keys, such as a power on/off key, a yes key and a no key, or four direction keys for selecting a direction such as up, down, left or right. In still yet other implementations, the soft keys of the keypad 44 on the touch screen display can include a power on/off key, a yes key and a no key, or four direction keys.

Figure 6A:
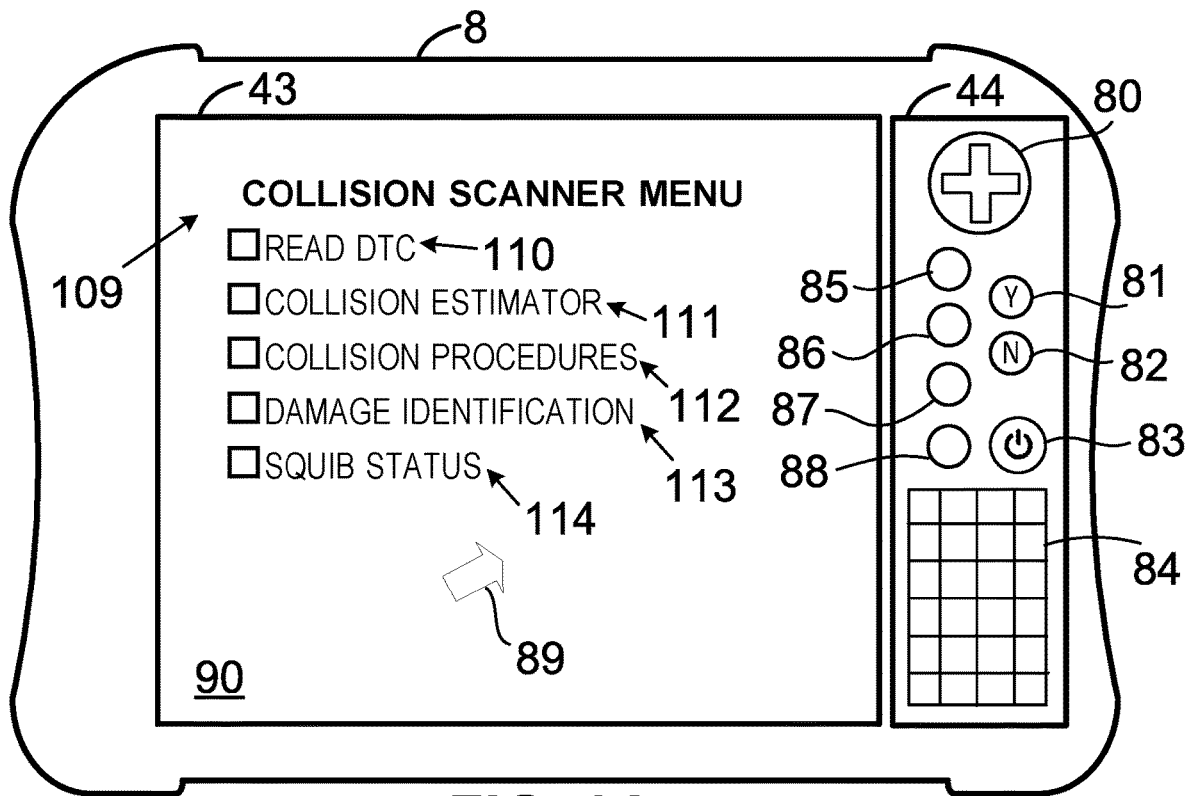
FIGS. 6A, 6B, 7A, 7B, 8A, 8B, 9A, 9B, 10A, 10B, 11A, 11B, 12A, 12B, 13A, 13B, 14A, 14B, 15A, 15B, 15C, 15D, 15E, 15F, 15G, 15H, 15I, 15J, 15K, 15L, 15M, 15N, 15O, and 15P depict example implementations of the scanner and a display screen shown on a display of the scanner in accordance with the example implementations.

Example keys of the keypad 44 are shown in FIG. 6A. The keypad 44 can be used to enter a variety of information into the processor 40. As an example, the information entered by the keypad 44 can include one or more of the following: vehicle model information, a damaged portion indicating where a vehicle sustained damage during a collision, or insurance company information so that the processor 40 can transmit a collision report to an insurance company. The vehicle model information can include a vehicle model identifier or one or more vehicle model attributes that can be used to determine a vehicle model. The display 43 can display the vehicle model identifier (such as a vehicle model identifier 179 shown in FIG. 11A or a vehicle model identifier 320 shown in at least FIG. 15G).

The capture device 45 includes one or more components configured to generate data based on objects in proximity to the scanner 8 and/or signals from which that data can be generated. As an example, the data generated by the capture device 45 can include an image (e.g., an image file), content of a scanned image, and/or measurement data. In at least some implementations, the capture device 45 includes one or more of the following: an image scanner, a barcode scanner, a visual light camera, a thermal camera, a light source, a lens, or an image sensor. A data file representative of a captured image or content of a scanned image can be stored in the memory 47 within the captured data 64. As an example, the captured image can include one or more of the following: an image of the vehicle 1, an image of some portion of the vehicle 1, such as a portion of the vehicle 1 damaged in a collision, a license plate attached to the vehicle 1, or a VIN label attached to the vehicle 1. As another example, the captured image can include image data of a scanned barcode, such as the barcode on a VIN label attached to the vehicle 1.

The audio device 46 can include one or more audio devices. In some implementations, the audio device 46 can include one or more microphones and/or one or more speakers. The connection mechanism 50 connected to the audio device 46 can include electrical circuitry for providing the processor 40 with inputs representing voice commands received by the one or more microphones. The voice commands can include commands representing selections and/or information that is described as being input by use of the keypad 44. The processor 40 can output signals to the one or more speakers to cause one or more speaker to produce audible sounds. As an example, the audible sounds can include instructions for using the scanner 8.

5. Other Scanner Components

The connection mechanism 50 can include any of a variety of conductions to carry data, communications, and/or signals between the components connected to the connection mechanism 50. As an example, the connection mechanism 50 can include a copper foil trace of a printed circuit board, a wire, or some other conductor.

The power supply 48 can be configured in any of a variety of configurations or combinations of the variety of configurations. As an example, the power supply 48 can include circuitry to receive AC current from an AC electrical supply (e.g., electrical circuits connected to an electrical wall outlet) and convert the AC current to a DC current for supplying to one or more of the components within the scanner 8. As another example, the power supply 48 can include a battery or be battery operated. As yet another example, the power supply 48 can include a solar cell or be solar operated. The power supply 48 can include electrical circuits to distribute electrical current throughout the scanner 8. Other example configurations of the power supply 48 are possible.

The housing 49 can surround at least a portion of the processor 40, at least a portion of the network transceiver 41, at least a portion of the VCT 42, at least a portion of the display 43, at least a portion of the capture device 45, at least a portion of the keypad 44, at least a portion of the memory 47, and/or at least a portion of the connection mechanism 50. The housing 49 can be referred to as an enclosure. The housing 49 can support a substrate. At least a portion of the processor 40, at least a portion of the network transceiver 41, at least a portion of the VCT 42, at least a portion of the display 43, at least a portion of the capture device 45, at least a portion of the keypad 44, at least a portion of the memory 47 and/or at least a portion of the connection mechanism 50 can be mounted on or connect to the substrate. The housing 49 can be made from various materials. For example, the housing 49 can be made from a plastic material (e.g., acrylonitrile butadiene styrene (ABS)) and a thermoplastic elastomer used to form a grip on the housing 49.

6. Memory Content

Figure 3B:
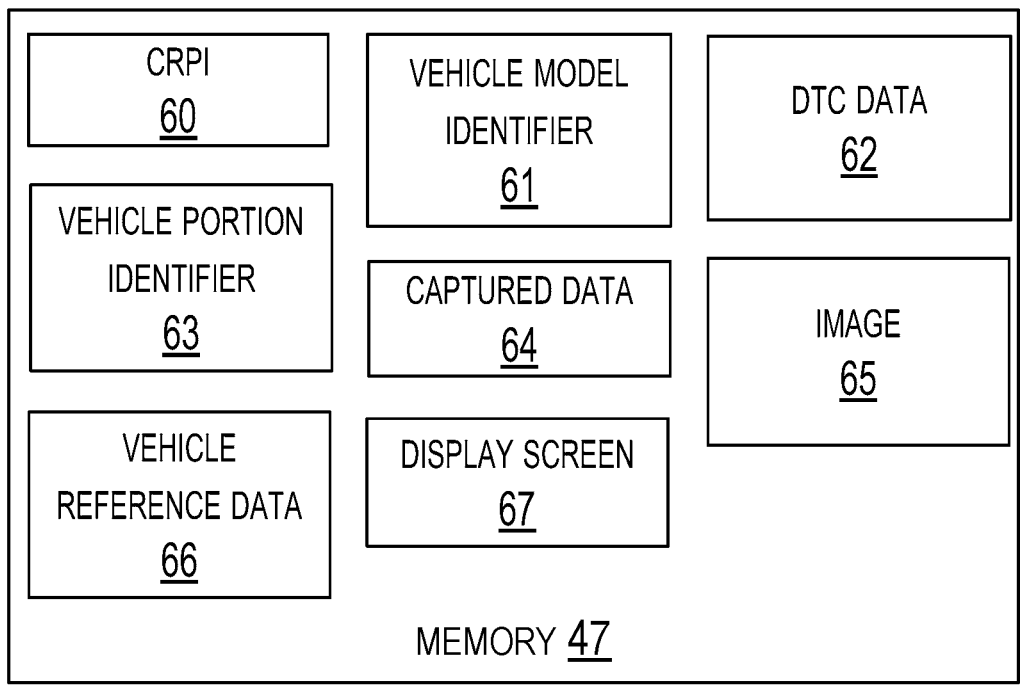
FIGS. 3B and 3C show memory content of a scanner in accordance with example implementations.

The memory 47 stores computer-readable data. In an example implementation, the memory 47 can be arranged like and/or include the system memory 654 and/or the storage device 660 shown in FIG. 19. In those or in different implementations, the memory 47 can store one or more of the following: the CRPI 60, a vehicle model identifier 61, DTC data 62, a vehicle portion identifier 63, captured data 64, an image 65, vehicle reference data (VRD) 66, a display screen 67, a collision report 68, crash and damage data (CADD) 69, or a technical service bulletin (TSB) and position statement 70. FIG. 3B illustrates an example implementation in which the memory 47 stores the CRPI 60, the vehicle model identifier 61, the DTC data 62, the vehicle portion identifier 63, the captured data 64, the image 65, the VRD 66, CADD 69, and the display screen 67.

The vehicle model identifier 61 includes data representing attributes of a vehicle, such as a vehicle previously and/or presently operatively connected to the scanner 8. As an example, the attributes can include attributes (e.g., a VIN) that the scanner 8 and/or the server 9 can use to distinguish a particular vehicle from all other vehicles. As another example, the attributes can include attributes that the scanner 8 and/or the server 9 can use to distinguish a class of vehicles including the particular vehicle from all other classes of vehicles. For instance, the attributes of the vehicle model identifier 61 can include a portion of the VIN (e.g., make and model) of the vehicle 1, the M/M of the vehicle 1, the Y/M/M of the vehicle 1, or the Y of the vehicle. The processor 40 and/or the network transceiver 41 can transmit the vehicle model identifier of the vehicle 1 to the server 9 to request data regarding the vehicle 1, such as images of the vehicle model associated with the vehicle 1 for storing in the image 65, or VRD associated with the vehicle model associated with the vehicle 1 for storage in the VRD 66.

The DTC data 62 includes DTC data regarding DTC(s) that can be set in the vehicle 1. In some instance, the DTC data 62 can indicate no DTC is/are set in the vehicle 1. In other instances, the DTC data 62 indicates one or more DTC are set in a component of the vehicle 1. As an example, the DTC set in the vehicle 1 can include the DTC referred to as: (1) B0051: air bag deployment commanded, (2) B0520: rear discharge temperature sensor malfunction, (3) B1182: TPMS right front malfunction, (4) C0040: right front wheel speed circuit malfunction, (5) C0070: right front ABS solenoid #1 circuit malfunction, and (6) C0085: left rear ABS solenoid #2 circuit malfunction.

The DTC data 62 can include DTC data associated with a DTC set in the vehicle 1. As an example, the DTC data associated with the DTC can include data indicating a status (e.g., current, pending, or history) of the DTC. The processor 40 and/or the VCT 42 can transmit a VDM to request the data associated with the DTC and receive, from the ECU that set the DTC, a VDM including the data associated with the DTC. The data associated with a DTC can be referred to as extended DTC data.

As an example, the data associated with the DTC can include data indicating a number of drive cycles, key cycles, or warm-up cycles since the DTC was set or since the MTh indicative of the DTC being set has been in the power-on state. For instance, an ECU configured to set a DTC indicative of a tire pressure monitor sensor (TPMS) malfunction can store data that indicates the number of key cycles since the DTC indicative of a TPMS malfunction was set current or caused the TPMS MTh to illuminate.

As another example, the data associated with the DTC can include freeze frame data. The ECU can store the freeze frame data when the ECU sets a DTC to a status of current. The ECU can store the freeze frame data for a number of drive, key, or warm-up cycles before erasing the freeze frame data. The VDM including freeze frame data can indicate the number of drive, key, or warm-up cycles that have occurred since the DTC was set. The freeze frame data can be stored and retrieved from a supplemental restraint system (SRS) ECU and/or by another ECU in the vehicle, such as a powertrain system ECU.

As still yet another example, the data associated with the DTC can include a time stamp indicative of when the DTC was set current in the vehicle. The time stamp can include date information in addition to time information.

The vehicle portion identifier 63 includes an identifier indicative of a portion of a vehicle, such as portion of the vehicle 1. In accordance with an example implementation, the portion of the vehicle can include an exterior portion of the vehicle. For a vehicle, such as an automobile, an exterior portion of the vehicle can include a body panel, such as a hood, an exterior door panel, a windshield, a quarter panel, among others. In the preceding and/or in another example implementation, the portion of a vehicle can include an interior portion of a vehicle, such as a front passenger compartment, a rear passenger compartment, an under-hood portion, among others. As an example, the vehicle portion identifier 63 can indicate a vehicle portion shown in Table 2 or Table 3 (shown below) or a body panel name. A portion of the vehicle can include a portion of the vehicle damaged during a collision. As another example, the portion of the vehicle can include a portion of the vehicle at which a malfunctioning component is located. Other examples of the vehicle portion identifier 63 are available. The processor 40 can determine a portion of the vehicle 1 that is to be stored as at least part of the vehicle portion identifier 63.

The captured data 64 can include data generated by the capture device 45. The captured data 64 can include one or more image files generated by the capture device 45. As an example, the captured data 64 can include an image file representing an image showing some portion of the vehicle 1. The processor 40 can use the image showing some portion of the vehicle 1 for various purposes, such as identifying the vehicle model associated with the vehicle 1. The selector 118 shown in FIG. 6B pertains to identifying the vehicle model associated with the vehicle 1 using an image captured by the capture device 45. As another example, the processor 40 can use the image showing some portion of the vehicle 1 to determine a damaged portion of the vehicle 1 at which the vehicle was damaged during a collision.

The image 65 can include one or more images files. The processor 40 and/or the network transceiver 41 can request and receive from the server 9 an image file for storing in the image 65. The image 65 can include image files associated with a single vehicle model or each vehicle model of multiple different vehicle models. As an example, the latter type of image file can include an image file representing all pick-up trucks, an image file representing all two-door automobiles, or an image file representing all four-door automobiles.

An image file in the image 65 can be used for various purposes. For instance, an image file in the image 65 can be displayed by the display 43 along with a vehicle grid, such as a vehicle grid 134 shown in FIG. 9B. The processor 40 can determine a vehicle grid location displayed on the display 43 has been selected and responsively determine that a portion of a vehicle displayed within the selected vehicle grid location has been selected. Selection of the portion of the vehicle can, but need not necessarily, indicate that the selected portion of the vehicle is damaged. In some implementations, the image file can include the vehicle grid 134, whereas in other implementations, the vehicle grid is separate from the image file. Allowing a user to select a portion of a vehicle can reduce the burden on a processor from having to determine the portion of the vehicle by comparing two or more images of the vehicle. Additionally, in some implementations, the processor 40 can select a vehicle grid location based on a DTC associated with the DTC and/or a vehicle component associated with the DTC being located in a portion of the vehicle represented by the vehicle grid location.

A vehicle grid (e.g., the vehicle grid 134, 148, 881 shown in the drawings) displayed on the display 43 can be displayed with grid lines, such as grid lines that identify a perimeter of a vehicle grid location. The vehicle grid locations shown in the drawings are shown as being rectangular. A vehicle grid location can be a shape other than rectangular. For instance, a vehicle grid location can be a shape that is at least partially defined by a contour of a portion of a vehicle.

As another example, an image file in the image 65 can be used by the processor 40 for comparison to an image file generated by the capture device 45. Based on the comparison, the processor 40 can make various determinations, such as a determination that a portion of a vehicle represented in both of those image files corresponds to a damaged portion of that vehicle. Configuring the processor 40 to determine a damaged portion of a vehicle can increase accuracy of determining all damaged portions of the vehicle in situations when a user overlooks one or more damaged portions of the vehicle.

The VRD 66 includes vehicle reference data regarding a vehicle, such as the vehicle 1. FIG. 16A shows example VRD 300. The VRD 300 includes VRD 301 that is associated with a first vehicle model (e.g., a vehicle model referred to as VM1), VRD 340 that is associated with a second vehicle model (e.g., a vehicle model referred to as VM2), and VRD 350 that is associated with a third vehicle model (e.g., a vehicle model referred to as VM3). The VRD 340 and the VRD 350 can include types of VRD similar to the types of VRD in the VRD 301 except that the VRD 340, 350 is associated with a different vehicle model. The VRD 66 can include VRD for one or more vehicle models. The scanner 8 can request and receive VRD from the server 9 to store as the VRD 66. That request can be transmitted by the scanner 8 upon determining a vehicle model of the vehicle connected to the scanner 8. As an example, VM1 can represent a vehicle model described or shown elsewhere in the application as a "2017 Beta Tango," VM2 can represent a vehicle model, such as a "2018 Rush Barchetta," and VM3 can represent a vehicle model, such as a "2018 Jeep® Rubicon®." The VRD 66 can, but need not necessarily, include an XML file containing VRD regarding one or more vehicle models.

The VRD 301 can include data indicating one or more of: a type of ECU 302, an ECU ID 303 used within a VDM, a VDM protocol 304, a DTC 305, a related component 306, a rate 307, a component location 308, and/or a procedure 309. Each of those items shown in a single row in FIG. 16A can be associated with that DTC and related component. The rate 307 can indicate whether a DTC is commonly set or rarely set. The rate 307 can include data the server 9 determines from repair order data regarding instances of vehicles of the vehicle model VM1 being serviced.

The VRD 301 can include other reference data associated with the vehicle model, such as warnings 310, procedures 311, VDM 312, and vehicle image data 313. The warnings 310 can be associated with a damaged portion of the vehicle, such as a "warning #2" 330 associated with a LRQ, RRQ, LR, and RR of the vehicle 1. The procedures 311 can include procedures such as a circuit repair procedure, a remove and replace (R&R) procedure, a reset procedure, an initialization procedure, a program procedure, and a calibration procedure, or any other procedure applicable to servicing the vehicle 1. The VDM 312 can include a VDM recognizable to the vehicle 1, such as VDM to request a VIN from the PCM ECU. The vehicle image data 313 can include identifiers of images that show reference portions of the vehicle 1. The vehicle image data 313 can include identifiers of multiple images that show the same reference portion of the vehicle model, but with different vehicle colors, such as an image of the right side of vehicle IMG901G showing the right side painted green and an image of the right side of the vehicle IMG901B showing the right side painted blue. The image identifier can be used to generate a display presentation including a selector to a vehicle image. The processor 40 can request an image associated with an image identifier in response to determine the selector to the vehicle image was selected.

The VRD 301 can include PID parameter data 361 that is associated with a DTC, such as the DTC P0095 or some other DTC. The PID parameter data 361 can include parameter values for each PID that is associated with the DTC. For instance, FIG. 16A shows that PID1, PID2, PID3, PID4, and PID5 are associated with the DTC P0095. The PID parameter data 361 can include parameters for PID1 to PID5 captured from a vehicle associated with the vehicle model VM1 operating without any DTC set at a particular mileage or within a particular mileage range M1 (e.g., 50,000 miles or 50,000 to 60,000 miles). The PID parameter data 361 can include fault parameter values indicative of when the DTC P0095 sets to active. A processor can compare the PID parameter data 361 to PID parameters captured from the vehicle 1 for use in making a determination of whether a setting of a DTC is collision-related. The top row of parameter values can be mean operating parameter values when the vehicle is operating without any DTC set. The bottom row of parameter values are the fault parameter values.

The VRD 301 can include VRD including POI damage data and PRCD data, such as the VRD 800 shown in FIG. 16B. The VRD 800 includes VRD that pertains to multiple vehicle models, such as all vehicle models, and VRD that pertains to a single vehicle model. VRD 801 is an example of VRD that pertains to multiple vehicle models. The VRD 801 includes POI damage data 804 and PRCD data 805, 806 that pertain to the aforementioned multiple vehicle models.

VRD 802 is an example of VRD that pertain to a single vehicle model. For instance, the VRD 802 pertains to vehicles identified by the vehicle model VM1. The VRD 802 includes POI damage data 807, and PRCD data 808, 809 that pertains to the POI damage data 807. The VRD 802 includes POI damage data 810, and PRCD data 811, 812 that pertain to the POI damage data 810. The VRD 802 includes VRD data 819 that includes identifiers for restraint and/or safety components for vehicle model VM1. The VRD data 819 can include PRCD data 820, 821, 822, 823, 824 indicative of components that can, but need not necessarily, be located in a POI portion of the damaged vehicle. As an example, the PRCD data 820, 821, 822, 823, 824 indicates a collapsible steering column identifier, an instrument panel knee bolsters identifier, a seat belts identifier, a seatbelt retractor pretensioners identifier, and an airbags identifier, respectively.

VRD 803 is another example of VRD that pertain to a single vehicle model. For instance, the VRD 803 pertains to vehicles identified by the vehicle model VM2. The VRD 803 includes POI damage data 813, and PRCD data 814, 815 that pertains to the POI damage data 813. The VRD 803 includes POI damage data 816, and PRCD data 817, 818 that pertains to the POI damage data 816. After determining POI damage to a vehicle, the processor 40, 440 can determine, from the VRD 800, PRCD that pertains to that vehicle and cause the display 43 to display the PRCD. In an example implementation, displaying the PRCD can include displaying one or more from among: textual PRCD, graphical PRCD, and/or an image of PRCD.

The VRD 301 can include multi-stage air bag data 867. The processor 40 can refer to the multi-stage air bag data 867 to determine air bag(s) in the vehicle that have multiple initiators, such as a front driver side air bag and a front passenger side air bag. The multi-stage air bag data 867 can include data indicating which DTC of the SIR ECU pertain to squibs being live or used, and/or data indicating parameters to refer to determine when a DTC pertaining to squibs being live or used were set active.

Returning to FIG. 3B, the display screen 67 can include one or more display screens. Each display screen can include one or more files for generating a display screen that can be displayed on the display 43. In accordance with an example implementation, a display screen displayed on the display 43 can include a menu and/or a graphical user interface (GUI). In accordance with those other implementations, a display screen displayed on the display 43 can include other content stored in the memory 47, such as image of the image 65. A display screen displayed on the display can include one or more virtual controls. The processor 40 can determine a display screen to display on the display in response to selection of a virtual control displayed on the display 43. Example display screens are shown in and described with respect to FIG. 6A to FIG. 15N. In one respect, a display screen can be static in that the processor 40 does not change or supplement the display screen. In another respect, a display screen can be dynamic in that the processor 40 changes or supplements the display screen before, while, or after being displayed. The network transceiver 41 can receive a display screen from the server 9. The display screen received from the server 9 can be stored in memory 47 as at least part of the display screen 67.

Figure 3C:
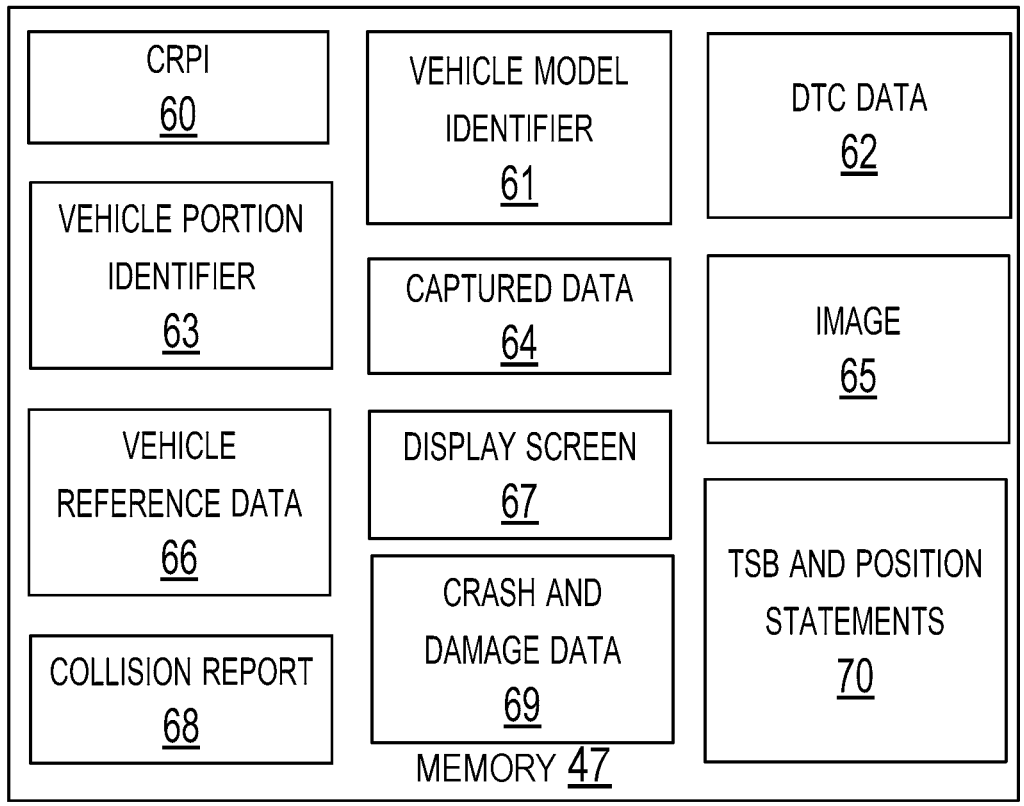

Next, FIG. 3C illustrates an example implementation in which the memory 47 stores the CRPI 60, the vehicle model identifier 61, the DTC data 62, the vehicle portion identifier 63, the captured data 64, the image 65, the VRD 66, the display screen 67, a collision report 68, the CADD 69, and the TSB and position statement 70.

The CADD 69 includes crash data generated by a vehicle involved in a collision and damage data regarding that vehicle. The processor 40 and/or the VCT 42 can receive the crash data from an SRS ECU in the vehicle or one or more separate ECU in the vehicle that store crash data. The processor 40 and/or the VCT 42 can request the crash data by sending a VDM to the SRS ECU and/or the one or more separate ECU storing the crash data. The crash data can be referred to as "event data" and a ECU that stores the event data can be referred to as an "event data recorder." The processor 40 can generate at least a portion of the damage data based on inputs entered using the display 43, the keypad 44, the capture device 45, and/or the audio device 46. The CADD 69 can include CADD for multiple vehicles, such as multiple vehicles that were connected to the VCT 42.

FIG. 3D is a diagram showing an example of the CADD 69 in accordance with the example implementations. As shown in FIG. 3D, the CADD 69 include crash data 75 and damage data 77. The crash data 75 includes data indicating a vehicle model of the vehicle involved in the collision and time and date data indicative of when the collision to the identified vehicle occurred. The vehicle model of the crash data 75 is the 2017 Beta Tango (referred to as VM1 herein).

The crash data from a vehicle can include pre-crash data (e.g., data generated by a vehicle prior to the collision), intra-crash data (e.g., data generated by a vehicle during the collision), and post-crash data (e.g., data generated by a vehicle after the collision). FIG. 3D shows time values −5, −4, −3, −2, and −1 associated with crash data parameters (vehicle speed (VS), engine revolutions per minute (RPM), brakes applied, and seat belt fastened). The time values −5, −4, −3, −2, and −1 can, respectively, represent times five, four, three, two, and one second(s) before the collision was detected. The vehicle speed and time values can determine a delta velocity ($\Delta V$) parameter. Other examples of crash data parameters include traction control system (TCS) (on or off), anti-lock brake system (ABS) (on or off), principal degree of force (PDOF), lateral acceleration, and YAW. The types of crash data parameters generated by a particular vehicle model are typically the same, although the values of those crash data parameters generated by vehicles of the particular vehicle model can vary from each other based on circumstances of the collision.

The damage data 77 includes data indicating vehicle components identified as being damaged during a collision to the vehicle. As shown in FIG. 3D, the vehicle components include the right front fender, the B-pillar, the front row right seat belt retractor pre-tensioner, and the right front wheel speed sensor. As an example, the wheel speed sensor could be added to the damage data 77 based on a DTC set in the vehicle and data pertaining to that DTC, such as the data pertaining to the DTC C0040 shown in FIG. 10B. As another example, the right front fender could be added to the damage data 77 based on a determination the processor 40 makes based on an image of damaged vehicle or a selection made via the display 43.

Figure 4A:
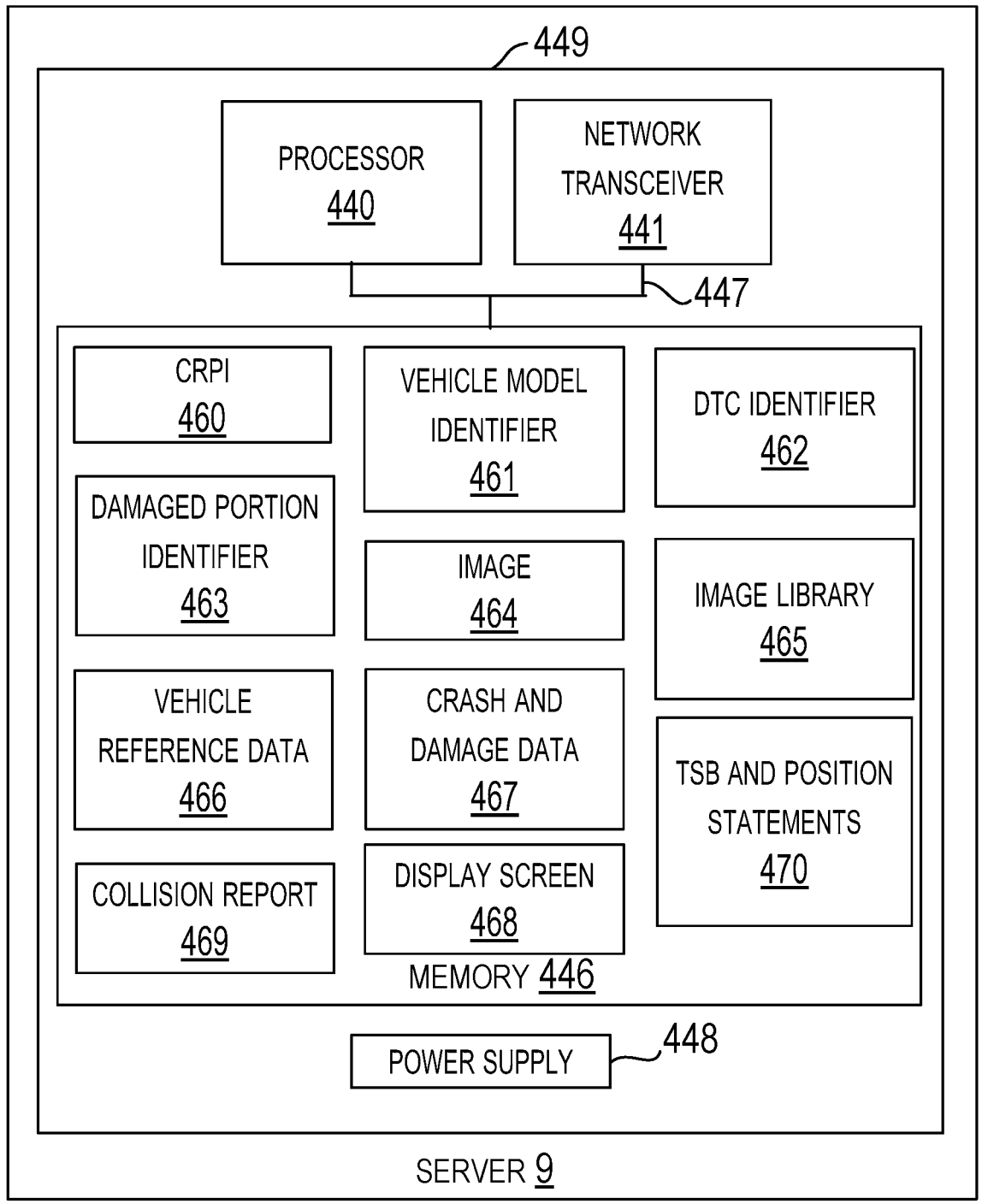
FIG. 4A is a simple block diagram of a server in accordance with the example implementations.

The network transceiver 41 can transmit the CADD 69 to the server 9 for storage within CADD 467 (shown in FIG. 4A). The network transceiver 41 can receive damage data from the server 9 for including within the CADD 69. The damage data provided by the server 9 could include damage data based on multiple vehicles involved in collisions, such as multiple vehicles associated with a common vehicle model, such as the vehicle model for VM1. The damage data provided by the server 9 could be possible related collision damage (PRCD) that the processor 40 could output on the display 43 to prompt a user to inspect the vehicle to see if the PRCD is applicable to the vehicle being worked on.

The collision report 68 includes a report the processor 40 generates based, at least in part, on data the processor 40 determines from various sources, such as one or more of the following: the vehicle 1, the server 9, the NCS 24, 25, 26, or data received by the scanner 8. FIG. 17 shows example data that can be part of the collision report 68. The processor 40 can output the collision report 68 to the display 43 for displaying on the display 43. The processor 40 and/or the network transceiver 41 can transmit the collision report 68 to one or more of the following: the server 9 or the NCS 24, 25, 26.

The TSB and position statement 70 can include a TSB and/or position statement related to a vehicle model determined by the processor 40 and related to POI damage and/or PRCD pertaining to the determined vehicle model. A TSB and/or position statement can be related to a DTC, such as a DTC determined to be collision-related. A TSB and/or position statement stored in the TSB and position statement 70 can include a TSB and/or position statement produced and/or received from a vehicle OEM or a vehicle component OEM. The TSB and/or position statement from an OEM can be augmented with a tag(s) for the processor 40 to determine that the TSB and/or position statement is related to the determined vehicle model and the POI damage and/or the PRCD. A TSB and/or position statement can include information from the vehicle or vehicle component OEM regarding a vehicle recall or repair campaign.

In general, the CRPI 60 can include program instructions to perform functions described in this description as being performed by the scanner 8 or a component of the scanner 8. For example, the CRPI 60 can include program instructions to perform one or more or all of the functions of the set of functions 500 shown in FIG. 5A and/or one or more or all of the functions of the set of functions 725 shown in FIG. 18A. Some examples of some particular program instructions of the CRPI 60 (executable by the processor 40) are described in the following section.

7. Example CRPI

The CRPI 60 can include program instructions to cause the processor 40 to transmit or cause the VCT 42 to transmit a VDM to the vehicle 1. That VDM can include any VDM described as being transmitted to a vehicle. The CRPI 60 can include program instructions to cause the processor 40 to attempt to transmit or cause the VCT 42 to attempt to transmit a VDM to the vehicle 1. Attempting to transmit a VDM can occur while the scanner 8 is trying to automatically identify a vehicle model of the vehicle 1. The CRPI 60 can include program instructions to cause the processor 40 to receive a VDM transmitted by the vehicle 1 to the scanner 8.

The CRPI 60 can include program instructions to cause the processor 40 to transmit or cause the network transceiver 41 to transmit a communication onto the network 11. The CRPI 60 can include program instructions to cause the processor 40 to receive a communication transmitted over the network 11 to the scanner 8.

The CRPI 60 can include program instructions to cause the scanner 8 to change its operating states, such as performing functions to change from a power-on state to a power-off state or to change from the power-off state to the power-on state. The CRPI 60 can include program instructions to determine a key of the keypad 44 has been pressed or otherwise manipulated to indicate a user action, and to determine an action to perform in response to determining the key has been pressed or otherwise manipulated. The CRPI 60 can include program instructions to determine a virtual control displayed on the display 43 has been pressed to indicate a selection has been entered, and to determine an action to perform in response to determining the virtual control was selected. The CRPI 60 can include program instructions to cause the display 43 to output a display screen stored in the display screen 67, such as any display screen shown in FIG. 6A to FIG. 15N.

The CRPI 60 can include program instructions to store an image captured by the capture device 45 within the captured data 64. The CRPI 60 can include program instructions to determine an image stored in the image 65 and to display on the display 43 the image stored in the image 65. The CRPI 60 can include program instructions to display the image within or as part of the vehicle grid 134. The CRPI 60 can include program instructions to determine a portion of the vehicle grid 134 has been selected and the portion of vehicle shown in the determined portion of the vehicle grid was damaged in a collision. The CRPI 60 can include program instructions to perform optical character recognition (OCR) to identify characters in a captured image. The CRPI 60 can include program instructions to decode a bar code scanned by the capture device 45.

The CRPI 60 can include program instructions to receive PRCD data the network transceiver 41 receives from the server 9. The CRPI 60 can include program instructions to store the PRCD data in the memory 47 (e.g., within the CADD 69) and/or to cause the display 43 to display the PRCD data. The CRPI 60 can include program instructions to cause the processor 40 to determine (e.g., confirm) whether or not the PRCD displayed on the display is RCD. As an example, the processor 40 can make that determination by receiving an input to the display 43 or via the keypad 44 indicating the PRCD is RCD. The CRPI 60 can cause the network transceiver 41 to transmit to the server 9 a communication indicating whether or not the PRCD indicated by the PRCD data was determined to be RCD. The CRPI 60 can include program instructions to cause the processor 40 to add to the collision report 68 identifiers of the PRCD determined to be RCD.

The CRPI 60 can include program instructions to determine whether an air bag squib on a vehicle connected to the scanner 8 is "live" or "used." For brevity, those CRPI are referred to hereafter in this description as "squib CRPI." A used squib is a squib that has initiated deployment of an air bag. A live squib is a squib that has not initiated deployment of an air bag. Special handling instructions exist for some live squibs. The squib CRPI can be configured to be executed in response to the processor 40 determining the squib status selector 114 was selected. Additionally or alternatively, the squib CRPI can be configured to be executed automatically in response to a trigger event. As an example, the trigger event can connection of the scanner 8 to a vehicle, the scanner 8 transmitting a VDM to an SIR ECU, and/or the scanner 8 receiving a VDM from an SIR ECU. The squib CRPI can be configured to cause the processor 40 and/or the VCT 42 to transmit to the SIR ECU a VDM including a request for DTC and to receive from the SIR ECU a VDM indicative of DTC set in the SIR ECU DTC. The squib CRPI can be configured to cause the processor 40 and/or the VCT 42 to transmit to the SIR ECU a VDM including a request for data indicating a time when each DTC set active was set active and to receive from the SIR ECU a VDM indicating a time when each DTC set active was set active.

The squib CRPI can cause the processor 40 to determine which DTC set active by the SIR ECU is/are indicative of an air bag squib status. As an example, the processor 40 can refer to the multi-stage air bag data 867 to make that determination. For instance, the processor 40 can refer to the multi-stage air bag data 867 to determine the front driver and front passenger air bags are multi-stage air bags, each with two squibs and the SIR ECU can set a respective DTC indicative of each of those squibs being open-circuited.

The squib CRPI can be configured to cause the processor 40 to determine a status (e.g., active or inactive) of a DTC that indicates a squib for a particular air bag (e.g., air bag N) is open circuited. Moreover, if the processor 40 determines the DTCs indicating each squib for a dual-squib air bag is open-circuited are active, the processor 40 can responsively determine an amount of time existing between each of those DTC for the dual-squib air bag going active. The processor 40 can compare the determined amount of time to a squib activation threshold to determine whether or not the amount of time exceeds the squib activation threshold. As an example, the squib activation threshold can be one minute, five minutes, ten minutes, or fifteen minutes.

Table 1 shows example squib statuses the processor 40 can determine by executing the squib CRPI. In Table 1, "Null" represents that a time comparison is not needed to determine the squib status.

TABLE 1

| DTC status - Squib #1 open for air bag N | DTC status - Squib #2 open for air bag N | Time Comparison | Squib Status |
|---|---|---|---|
| Active | Active | Time difference for squib #1 and squib #2 less than threshold | Squib #1 - used Squib #2 - used |
| Active | Active | Time for squib #2 exceeds by time for squib #1 by at least threshold | Squib #1 - used Squib #2 - live |
| Active | Active | Time for squib #1 exceeds by time for squib #2 by at least threshold | Squib #1 - live Squib #2 - used |
| Active | Inactive | Null | Squib #1 - used Squib #2 - live |
| Inactive | Active | Null | Squib #1 - live Squib #2 - used |

As an example, an SIR ECU in the vehicle 1 can be configured to set a DTC B1115 when squib #1 of a front driver side air bag is open-circuited, a DTC B1116 when squib #2 of the front driver side air bag is open-circuited, a DTC B1117 when squib #1 of a front passenger side air bag is open-circuited, a DTC B1118 when squib #2 of the front passenger side air bag is open-circuited. The processor 40 executing the squib CRPI can receive a VDM from an SIR ECU in that vehicle indicating that DTC B1115, B1116, and B1117 are active. That VDM may not include data indicating DTC B1118 is active. The processor 40 can use that omission to determine that DTC B1118 is inactive. The processor 40 can receive data indicating the DTC B1115 was set active at 7:00:05 AM on Apr. 6, 2018 and the DTC B1116 was also set active at 7:00:05 on the same date. The processor 40 can determine that a difference in those two DTC activation times is less than the squib activation threshold (e.g., ten minutes). Referring to Table 1, the processor 40 can determine that squib #1 and squib #2 of the front passenger side air bag are used, and squib #1 of the front passenger side air bag is used and the squib #2 for the front passenger side air bag is live. The processor 40 can output the display screen 854 and/or the squib status information 863 to the display 43 in response to determining the squib status of those two front air bags.

B. Example Server

Next, FIG. 4A is a simple block diagram of the server 9, in accordance with an example implementation. As shown in FIG. 4A, the server 9 includes a processor 440, a network transceiver 441, and a memory 446. Two or more of those components can be operatively connected via a system bus, network, or other connection mechanism 447. The server 9 also includes a power supply 448 and a housing 449.

1. Processor

The processor 440 can include one or more processors. The example processors described above with respect to processor 40 are applicable to the processor 440. The processor 440 can be configured to execute CRPI, such as the CRPI 460 stored in the memory 446. The processor 440 can be configured to execute hard-coded functionality in addition to or as an alternative to software-coded functionality (e.g., via CRPI). The processor 440 can be configured (e.g., programmed) to perform any function or combination of functions described herein as being performed by the server 9. The processor 440 can be configured (e.g., programmed) to perform any of the determining functions described as being performed by the processor 40.

2. Memory

The memory 446 includes a single memory or multiple memories. Two or more of the multiple memories can be the same type of memory or different types of memories. The memory 446 is configured to store computer-readable data, such as the example memory content discussed below. The example types of memories described above with respect to the memory 47 are applicable to the memory 446.

3. Transceiver

The network transceiver 441 can transmit any data or communication discussed as being transmitted, output, or provided by the server 9 to one or more of the following: the scanner 8, the NCS 24, 25, 26, or the insurance company 18, 19, 20. The network transceiver 441 can receive any data or communications discussed as being received by the server 9 or the network transceiver 441 from one or more of the following: the scanner 8, the NCS 24, 25, 26, or the insurance company 18, 19, 20. The network transceiver 441 can transmit a collision report 469 to one or more of the following: the scanner 8, the NCS 24, 25, 26, or the insurance company 18, 19, 20.

Some vehicles are equipped with a telematics system for communicating with an NCS operated by a telematics service provider. A typical telematics system includes a cellular network transceiver configured for transmitting a VDM to the telematics service provider to request a service, such as call a first responder to provide emergency services at the vehicle involved in a collision. The cellular network transceiver is also configured for receiving a VDM from the telematics service provider, such a VDM to cause the vehicle doors to unlock. The VDM transmitted by the cellular network transceiver can be arranged according a VDM protocol different than the VDM protocol of messages transmitted to the DLC 2. The telematics service provider can include a network transceiver to receive the VDM transmitted by the cellular network transceiver in the vehicle and to transmit a VDM to be received by the cellular network transceiver in the vehicle. The network transceiver 441 can be configured to receive a VDM transmitted by the cellular network transceiver in the vehicle and to transmit a VDM to be received by the cellular network transceiver in the vehicle. The content of a VDM transmitted to the vehicle by the network transceiver 441 can be identical to the content of a VDM transmitted to the vehicle by the VCT 42. The content of a VDM transmitted by the vehicle to the network transceiver 441 can be identical to the content of a VDM transmitted by the vehicle to the VCT 42.

The server 9 can also include a communication interface 667, a network controller 668, and a communication port 669, as shown in FIG. 19.

4. Other Server Components

The connection mechanism 447 can include any of a variety of conductions to carry communications or data between the components connected to the connection mechanism 447. As an example, the connection mechanism 447 can include a copper foil trace of a printed circuit board, a wire, or some other conductor.

The power supply 448 can be configured in any of a variety of configurations or combinations of the variety of configurations. As an example, the power supply 448 can include circuitry to receive AC current from an AC electrical supply (e.g., electrical circuits connected to an electrical wall outlet) and convert the AC current to a DC current for supplying to one or more of the components within the server 9. As another example, the power supply 448 can include a battery or be battery operated. As yet another example, the power supply 448 can include a solar cell or be solar operated. The power supply 448 can include electrical circuits to distribute electrical current throughout the server 9. Other examples of the power supply 448 are available.

The housing 449 can surround at least a portion of the processor 440, at least a portion of the network transceiver 441, at least a portion of the memory 446, or at least a portion of the connection mechanism 447. The housing 449 can be referred to as an enclosure. The housing 449 can support a substrate. At least a portion of the processor 440, at least a portion of the network transceiver 441, at least a portion of the memory 446, or at least a portion of the connection mechanism 447 can be mounted on or connected to the substrate. The housing 449 can be made from various materials. The housing 449 can include a computer rack.

5. Memory Content

The memory 446 stores computer-readable data. As an example, the memory 446 stores one or more of the following: the CRPI 460, a vehicle model identifier 461, a DTC data 462, a vehicle portion identifier 463, an image 464, an image library 465, VRD 466, CADD 467, a display screen 468, a collision report 469, and/or a TSB and position statement 470.

The vehicle model identifier 461 includes data the server 9 stores regarding the vehicle 1. The vehicle model identifier 461 can be configured like the vehicle model identifier 61. The processor 440 and/or the network transceiver 441 can receive the vehicle model identifier 61 from the scanner 8 and store the received vehicle model identifier as the vehicle model identifier 461. Based on the vehicle model identifier 461, the processor 440 can provide the scanner 8 with data regarding the vehicle 1, such as images of the vehicle model associated with the vehicle 1 for storing in the image 65, vehicle reference data associated with the vehicle model associate with the vehicle 1 for storage in the VRD 66.

The DTC data 462 includes DTC data indicative of the DTC(s) set in the vehicle 1. The processor 440 and/or the network transceiver 441 can receive the DTC data 62 from the scanner 8 or the vehicle 1 and store the received DTC data as the DTC data 462. Therefore, the DTC data 462 can include any of the DTC data described as being a part of the DTC data 62.

The vehicle portion identifier 463 includes an identifier indicative of a portion of the vehicle 1 damaged during a collision. The processor 440 and/or the network transceiver 441 can receive the vehicle portion identifier 63 from the scanner 8 or the vehicle 1 and store the received vehicle portion identifier as the vehicle portion identifier 463. The vehicle portion identifier 463 can indicate a damaged portion shown in Table 2 or in Table 3 or a body panel name. Other examples of the vehicle portion identifier 463 are available.

The image 464 includes an image captured by a capture device, such as the capture device 45. The processor 440 and/or the network transceiver 441 can receive an image from the scanner 8 or the vehicle 1 and store the received image as the image 464. The image 464 can include multiple images captured by the capture device 45. As an example, the image 464 can include an image showing some portion of the vehicle 1. The processor 440 can use the image showing some portion of the vehicle 1 for various purposes, such as identifying the vehicle model associated with the vehicle 1. As another example, the processor 440 can use the image showing some portion of the vehicle 1 to determine a damaged portion of the vehicle 1 at which the vehicle was damaged during a collision.

The image library 465 can include one or more images associated with a vehicle model associated with the vehicle 1. The processor 440 and/or the network transceiver 41 can provide the scanner 8 with an image for storing in the memory 47 as the image 65. An image in the image library 465 can be used for various purposes. For instance, an image in the image library 465 can be provided to the scanner 8 for displaying within a vehicle grid, such as the vehicle grid 134. As another example, an image in the image library 465 can be used by the processor 440 to compare to an image provided by the scanner 8. The image library 465 can include images associated with each vehicle model of multiple different vehicle models.

The VRD 466 includes vehicle reference data regarding the one or more vehicles. As an example, the VRD 466 can include or be configured with VRD like the VRD 300 shown in FIG. 16A. The processor 440 can refer to the VRD 466 to determine VRD to include in a display screen being generated for the scanner 8.

The CADD 467 includes crash data and damage data. The crash data can include crash data one or more scanners obtained from vehicles involved in collisions. For example, the processor 440 and/or the network transceiver 441 can receive the crash data from the scanner 8. The processor 440 and/or the network transceiver 441 can receive the damage data from scanner 8 and/or an NCS, such as the NCS.

Figure 4B:
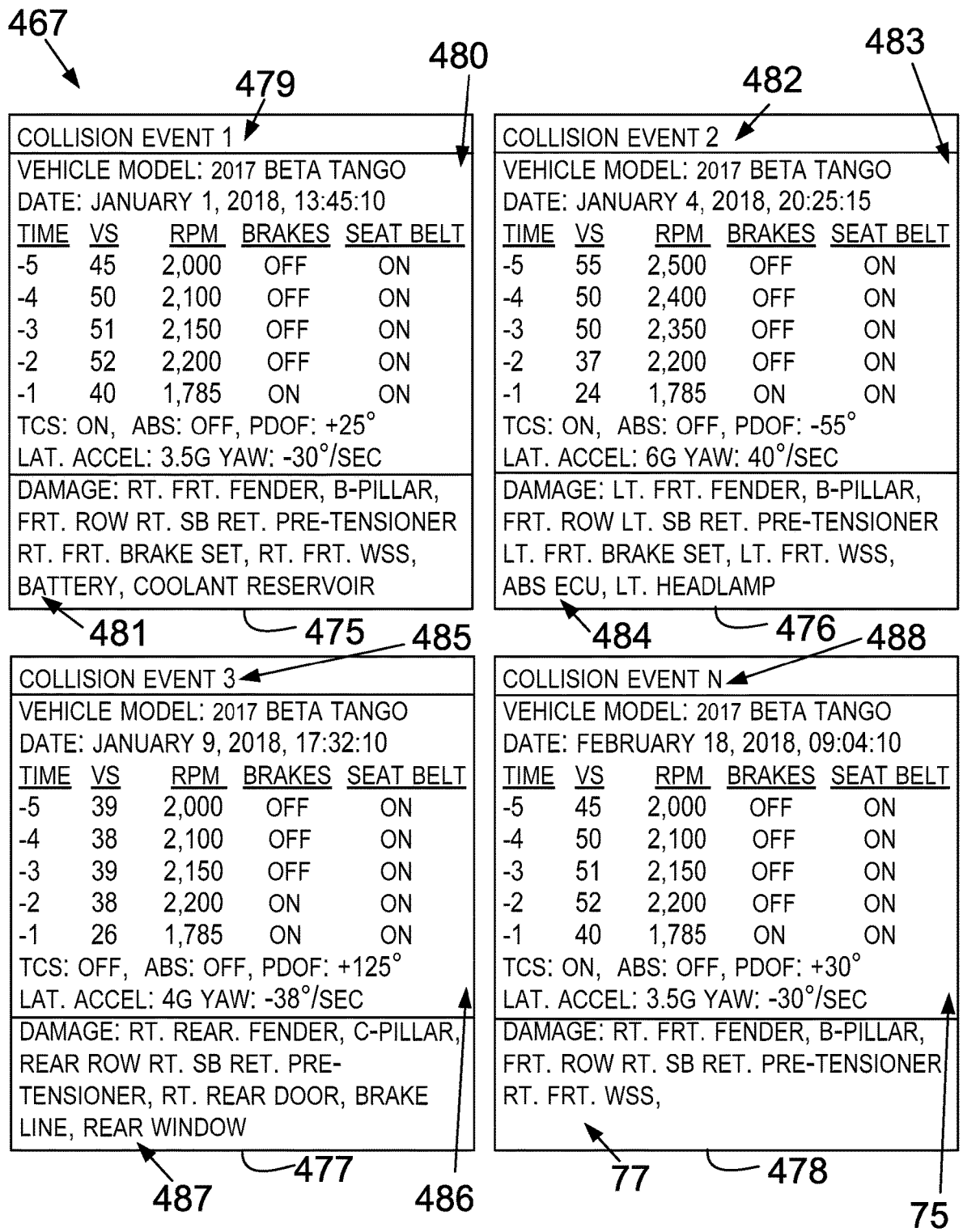
FIG. 4B is a diagram showing example crash and damage data in accordance with example implementations.

FIG. 4B is a diagram showing an example of the CADD 467. The CADD 467 includes crash data and damage data regarding multiple collisions and metadata associated with the crash and damage data. As shown in the figure, the CADD 467 includes CADD 475 for a collision event #1, CADD 476 for a collision event #2, CADD 477 for a collision event #3, and CADD 478 for a collision event #N. As an example, #N can represent a current greatest number of collision events for which the CADD 467 includes CADD (for all vehicle models or a particular vehicle model). For example, #N could be 5,000, 20,000, 1,000,000 or some other number greater than the 1 that pertains to a first collision (e.g., collision event #1). A skilled person will understand that the CADD 467 could include crash and damage data for one collision event prior to crash and damage data for another collision event being added to the CADD 467.

The CADD 475 includes metadata 479 referencing a particular collision event, crash data 480, and damage data 481. Similarly, the CADD 476 includes metadata 482 referencing a particular collision event, crash data 483, and damage data 484, the CADD 477 includes metadata 485 referencing a particular collision event, crash data 486, and damage data 487, and the CADD 478 includes metadata 488 referencing a particular collision event, and the crash data 75 and damage data 77. Similar to the crash data 75, the crash data 480, 483, 486 can include pre-crash data, intra-crash data, and/or post-crash data, a vehicle model identifier, and/or time and date data indicative of when the identified vehicle was involved in a collision. The CADD 475, 476, 477, 478 include vehicle model identifiers of a single vehicle model (i.e., 2017 Beta Tango, also referred to as VM1 herein). The CADD 467 can include CADD for more than one vehicle model.

Returning to FIG. 4A, the display screen 468 can include a display screen configured to be provided to the scanner 8 and shown on the display 43. Example display screens are shown in and described with respect to FIG. 6A to FIG. 15N. The scanner 8 can, for example, display a display screen from the display screen 468 within a browser window displayed on the display 43.

The collision report 469 includes a collision report regarding a vehicle connected to the scanner 8. In one respect, the processor 440 generates based, at least in part, on data the processor 440 determines from various sources, such as one or more of the following: the vehicle 1, the scanner 8, the NCS 24, 25, 26, or data received by the server 9. In another respect, the processor 440 and/or the network transceiver 441 receives the collision report 68 from the scanner 8 and stores the received collision report as the collision report 469. FIG. 17 shows example data that can be part of the collision report 469. The processor 440 and/or the network transceiver 441 can transmit the collision report 469 to one or more of the following: the scanner 8 or the NCS 24, 25, 26.

The TSB and position statement 470 can include a TSB related to a vehicle model determined by the processor 440 and related to POI damage and/or PRCD pertaining to the determined vehicle model. A TSB stored in the TSB and position statement 470 can include a TSB produced and/or received from an OEM vehicle manufacturer. The TSB from the OEM vehicle manufacturer can be tagged with tags for the processor 440 to determine that the TSB is related to the determined vehicle model and the POI damage and/or the PRCD.

In general, the CRPI 460 can include program instructions to perform functions described in this description as being performed by the server 9 or a component of the server 9. For example, the CRPI 460 can include program instructions to perform one or more or all of the functions of the set of functions 500 shown in FIG. 5A and/or one or more or all of the functions of the set of functions 725 shown in FIG. 18A. Some examples of some particular program instructions of the CRPI 460 (executable by the processor 440) are described in the following section.

6. Example CRPI

The CRPI 460 can include program instructions to cause the processor 440 to transmit or cause the network transceiver 441 to transmit a VDM to the vehicle 1, or to transmit to the scanner 8 a request for the scanner 8 to transmit a VDM to the vehicle 1. Those VDM can include any VDM described as being transmitted to a vehicle. The CRPI 460 can include program instructions to cause the processor 440 to receive a VDM transmitted by the vehicle 1 to the server 9.

The CRPI 460 can include program instructions to cause the processor 440 to transmit or cause the network transceiver 441 to transmit a communication onto the network 11. The CRPI 460 can include program instructions to cause the processor 440 to receive a communication transmitted over the network 11 to the server 9.

The CRPI 460 can include program instructions to store an image received from the scanner 8 as the image 464. The CRPI 460 can include program instructions to determine an image stored in the image library 465 and to transmit the determined image to the scanner 8 for displaying on the display 43. The CRPI 60 can include program instructions to determine a portion of a displayed vehicle grid 134 has been selected and the portion of vehicle shown in the determined portion of the vehicle grid was damaged in a collision. The CRPI 460 can include program instructions to perform optical character recognition (OCR) to identify characters in a captured image. The CRPI 460 can include program instructions to decode a bar code scanned received from the scanner 8.

The CRPI 460 can include program instructions to determine possible related collision data for a vehicle, such as a vehicle connected to the scanner 8. The server 9 can transmit the PRCD to the server 9. The server 9 can determine RCD for the vehicle by receiving, from the scanner 8, a communication indicating which PRCD was confirmed by the scanner 8. The server 9 can augment a collision report 469 with identifiers of the RCD confirmed by the scanner 8.

The program instructions to determine PRCD can include program instructions following a set of rules for determining PRCD. As an example, those rules can include determining one or more crash data parameters for the damaged vehicle that match and/or are within a range of similar crash data parameters obtained from one or more other vehicles. The one or more other vehicles can be the same vehicle model as the vehicle connected to the scanner. The program instructions can compare damage data associated with the crash data obtained from the one or more other vehicles to the damage data associated with the vehicle connected to the scanner 8, and determine damage data that is not included within the data damage associated with the vehicle connected to the scanner 8.

As an example, the processor 440 can receive the crash data 75 and the crash data 480 both pertain to vehicles associate with the vehicle model VM1 and that one or more crash data parameters of the crash data 75 match and/or are within a threshold of the same type of crash data parameters in the crash data 480. For instance, those parameters can include the pre-crash vehicle speed values being within five MPH of each other and the PDOF being within eight degrees (8°) of each other. In that case, the processor 440 can determine that the collision event #1 associated with the CADD 475 and the damage data 481 is to be compared to the damage data 77 in order to determine PRCD. Based on that comparison, the processor 440 can determine the PRCD includes: the right front brake set (e.g., brake shoes, brake rotor, and brake caliper), a vehicle battery and a coolant reservoir, as those component identifiers are not within the damage data 77 at the time of making the comparison. The processor 440 can compare the crash data 75 to crash data of multiple collision events to determine more than one collision event having similar crash data, and determine the PRCD from damage data associated with the multiple collision events determined to have similar crash data.

The CRPI 460 can include program instructions to augment damage data within CADD to include PRCD confirmed to be RCD in the vehicle associated with the CADD.

The CRPI 460 can include program instructions for generating a communication to send a collision report, such as the collision report 469, to an NCS, such as the NCS 24, 25, 26.

IV. Example Operation

Figure 5A:
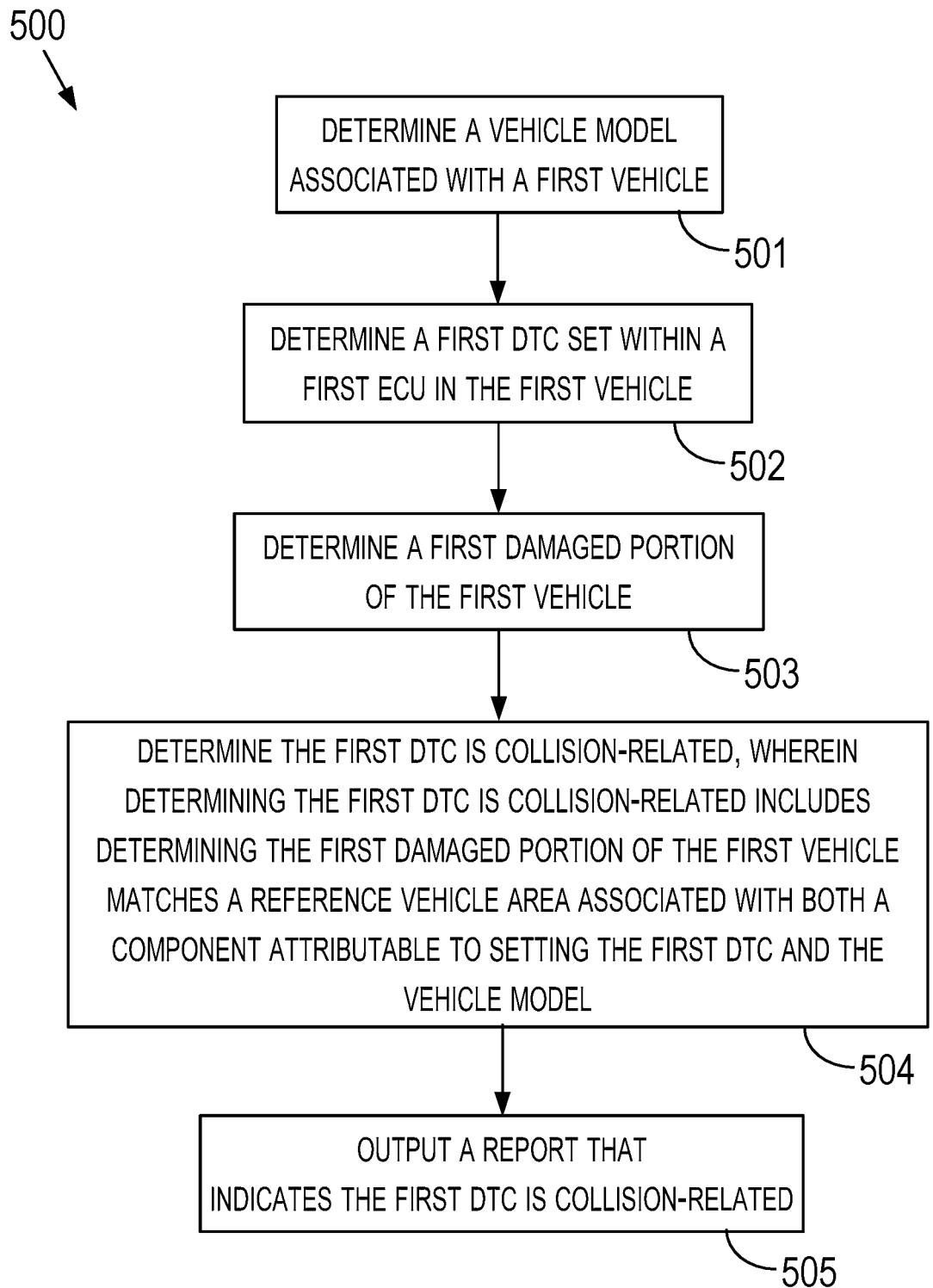
FIG. 5A is a flowchart depicting a set of functions that can be carried out in accordance with the example implementations.

Next, FIG. 5A shows a flowchart depicting a set of functions 500 (or more simply "the set 500") that can be carried out in accordance with the example implementations described in this description. The set 500 includes the functions shown in blocks labeled with whole numbers 501 through 505. The following description of the set 500 includes references to elements shown in other figures described in this description, but the functions of the set 500 are not limited to being carried out only by the referenced elements. A variety of methods can be performed using all of the functions shown in the set 500 or any proper subset of the functions shown in the set 500. Any of those methods can be performed with other functions such as one or more of the other functions described in this description. A processor can perform or cause a function of the set 500 to be performed. That processor can include one or more processors.

In some example implementations, a scanner, such as the scanner 8, can perform one or more of the functions of the set 500, and one or more of those functions performed by the scanner 8 can be performed by the processor 40. In at least some of those implementations, the scanner 8 can perform all of the functions of the set 500. The scanner 8 and the processor 40 can perform functions of the set 500 while the scanner 8 is operatively connected to the vehicle 1 via the VCL 10. The connection of the scanner 8 and the vehicle 1 can include a wired connection, a wireless connection, or a wired connection and a wireless connection.

In some other example implementations, the server 9 can perform one or more of the functions of the set 500, and the one or more of those functions performed by the server 9 can be performed by the processor 440. In at least some of those implementations, the server 9 can perform all of the functions of the set 500. The server 9 and the processor 440 can perform functions of the set 500 while the server 9 is operatively connected to the scanner 8 via the network 11. Furthermore, in some other example implementations, the scanner 8 and the server 9 can both perform one or more of the functions of the set 500. In at least some of those example implementations, the server 9 can provide the scanner 8 with a display screen to display on the display 43.

Figure 11A:
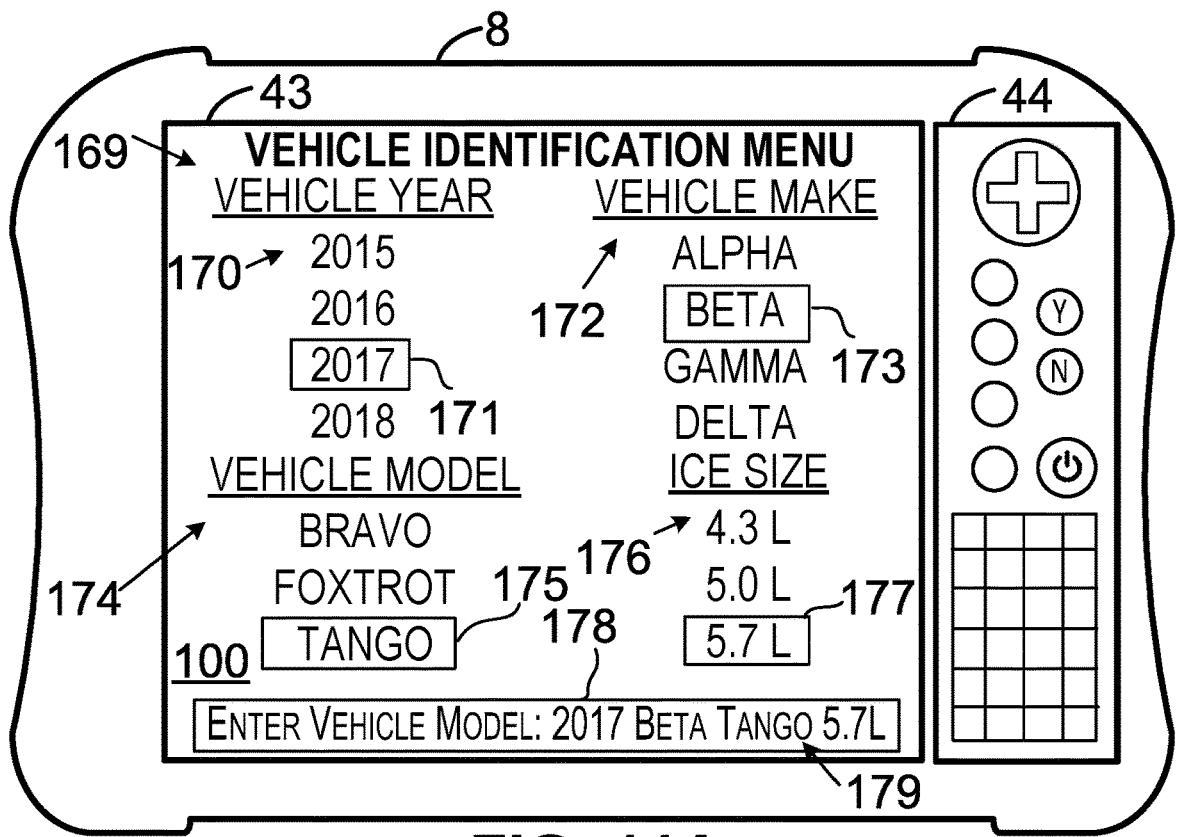
Figure 11B:
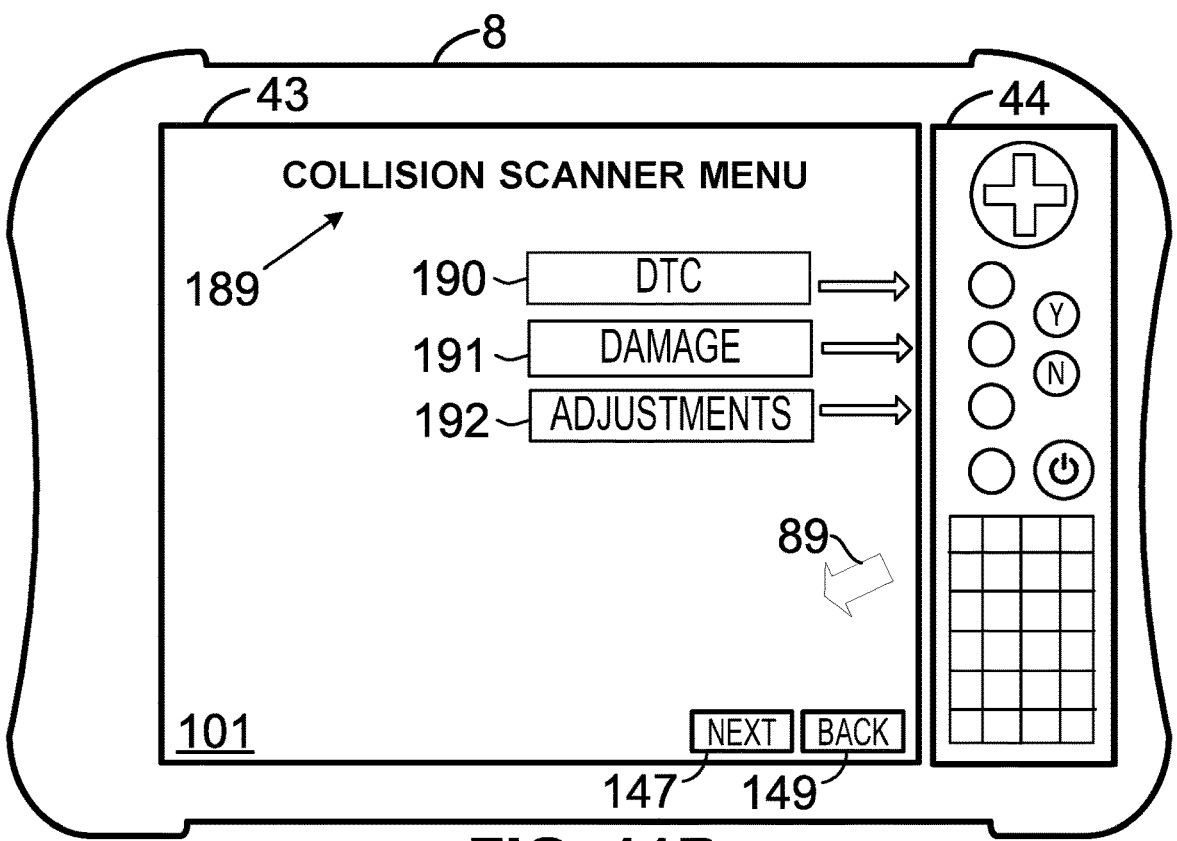

This description describes a "main scanner menu" applicable to at least some example implementations. The processor 40 can output a display screen that includes the main scanner menu to the display 43 while the scanner 8 is transitioning to a power-on state or in response to the scanner 8 transitioning to the power-on state. Additionally or alternatively, the display 43 can display the main scanner menu in other operating states of the scanner 8. Examples of a display screen including a main scanner menu are shown in FIG. 6A and FIG. 11B.

Block 501 includes determining, by one or more processors, a vehicle model associated with a vehicle. Determining the vehicle model can include the processor 40, 440 receiving vehicle model information indicative of the vehicle model. Determining the vehicle model can occur manually, automatically, or partially manually and partially automatically. Receiving the vehicle model information can occur manually, automatically, or partially manually and partially automatically.

Determining the vehicle model manually can occur in various ways. For example, determining the vehicle model manually can include the processor 40 outputting a display screen on the display 43 and receiving the vehicle model information in response to a user selecting the vehicle model information from the display screen using user interface components of the scanner 8 while the display screen is displayed. If the required vehicle model information is Y/M/M, the processor 40 can first output selectable years on the display screen, output the selectable make after a year selection is made via the display screen, and output the model after a vehicle make selection is made via the display screen. If the required vehicle model information is Y/M/M/E, the processor 40 can output the display screen as described above for Y/M/M and then output the selectable engine (i.e., ICE) on the display screen after a model selection is made via the display screen. FIG. 11A shows a vehicle identification menu 169 in which a Y/M/M/E has been selected via the vehicle identification menu 169.

As another example, determining the vehicle model manually can include the processor 40 receiving vehicle model information entered via use of the multi-button keypad 84 or a touch screen of the display 43. For instance, the keys of the multi-button keypad 84 or the touch screen could be pushed in a sequence to enter the alpha-numeric characters "2017 Beta Tango 5.7L" (an example Y/M/M/E). The display 43 can display the entered characters in a display segment, such as the display segment 178 shown in FIG. 11A. Determining the vehicle model manually can include the processor 40 determining the selector 117 (shown in FIG. 6B) is selected and causing the display 43 to display the display screen 100.

Determining the vehicle model manually can typically be performed without error, although not always. For example, a user entering vehicle model information manually can enter incorrect vehicle model information, such as by entering a VIN incorrectly or selecting an incorrect vehicle model attribute, such as an incorrect ICE identifier. Incorrectly entering vehicle model information can result misidentifying a vehicle or having to repeat at least part of the process of manually entering the vehicle model information. Determining the vehicle model automatically overcomes the problems that can arise from manually entering vehicle model information incorrectly.

In one respect, determining the vehicle model automatically can occur in response to the scanner 8 being operatively connected to the vehicle 1 with the scanner 8 operating in a power-on state, or in response to changing a power state of the scanner 8 from a power-off state to the power-on state while the scanner 8 is operatively connected to the vehicle 1. The display 43 can display the main scanner menu 109, 189 while the processor 40 is determining the vehicle model information automatically in response to the scanner 8 changing to the power-on state. In another respect, determining the vehicle model automatically can occur in response to the processor 40 receiving a selection to automatically identify the vehicle model. As an example, receiving that selection can include the processor 40 determining a selector 116 (shown in FIG. 6B) has been selected.

Automatically determining the vehicle model can include the processor 40 selecting a first VDM protocol and a first VDM message to transmit to the vehicle 1. The processor 40 can determine the first VDM message from the VDM 312 stored in the VRD 66. The processor 40 can cause the VCT 42 to transmit or attempt to transmit the first VDM message using the first VDM protocol to the vehicle 1. The VCT 42 can include a first integrated circuit (IC) chip configured for transmitting VDM onto the VCL 10 and receiving VDM transmitted on the VCL 10, in accordance with the first VDM protocol.

If the processor 40 receives a VDM including vehicle model information from the vehicle 1 in response to the first VDM message using the first VDM protocol, the processor 40 can determine the vehicle model of the vehicle 1 from the vehicle model information. For example, the vehicle model information in the VDM can indicate an attribute of the first vehicle, such as a VDM including at least a portion of a VIN associated with the first vehicle. In that case, the attribute can indicate a year, make, and model of the first vehicle. The processor 40 can store the determined vehicle model (regardless of how the processor 40 determines the vehicle model) and/or the vehicle model information in the vehicle model identifier 61. The processor 40 can determine the vehicle model of the first vehicle by determining an attribute of the vehicle model information in the VDM matches a stored attribute of the vehicle model. The stored attribute of the vehicle model can be stored as part of the VRD 66.

If the processor 40 does not receive vehicle model information in response to transmitting or attempting to transmit the first VDM message using the first VDM protocol, the processor 40 selects a next VDM message to transmit or attempt to transmit to the vehicle 1 to request vehicle model information. The next VDM message can be configured as a VDM message of the first VDM protocol or a second, different VDM protocol. The VCT 42 can include a second integrated circuit (IC) chip configured for transmitting VDM onto the VCL 10 and receiving VDM transmitted on the VCL 10, in accordance with the second VDM protocol. The processor 40 can repeat transmitting or attempting to transmit VDM messages to request vehicle model information from the vehicle 1 until the processor 40 receives a response from the vehicle 1 including vehicle model information or the processor 40 determines the scanner 8 cannot automatically determine the vehicle model of the vehicle 1. The processor 40 can determine the scanner 8 cannot automatically determine the vehicle model of the vehicle 1 by determining the processor 40 has transmitted each VDM of a set of vehicle model information request VDM stored in the VRD 66 and has not received the requested vehicle information from the vehicle 1.

Determining the vehicle model partially manually and partially automatically can occur in various ways. The processor 40 can determine a mode for determining the vehicle model partially manually and partially automatically by determining a selector from the display screen 91, such as the selector 118, 119, 120, was selected. The manual portion of determining the vehicle model can include using the capture device 45 to capture an image of the vehicle 1. The automatic portion of determining the vehicle model can include determining the captured image matches an image from the image 65, and determining the vehicle model from vehicle model information associated with the image from the image 65 that matches the captured image.

Figure 7A:
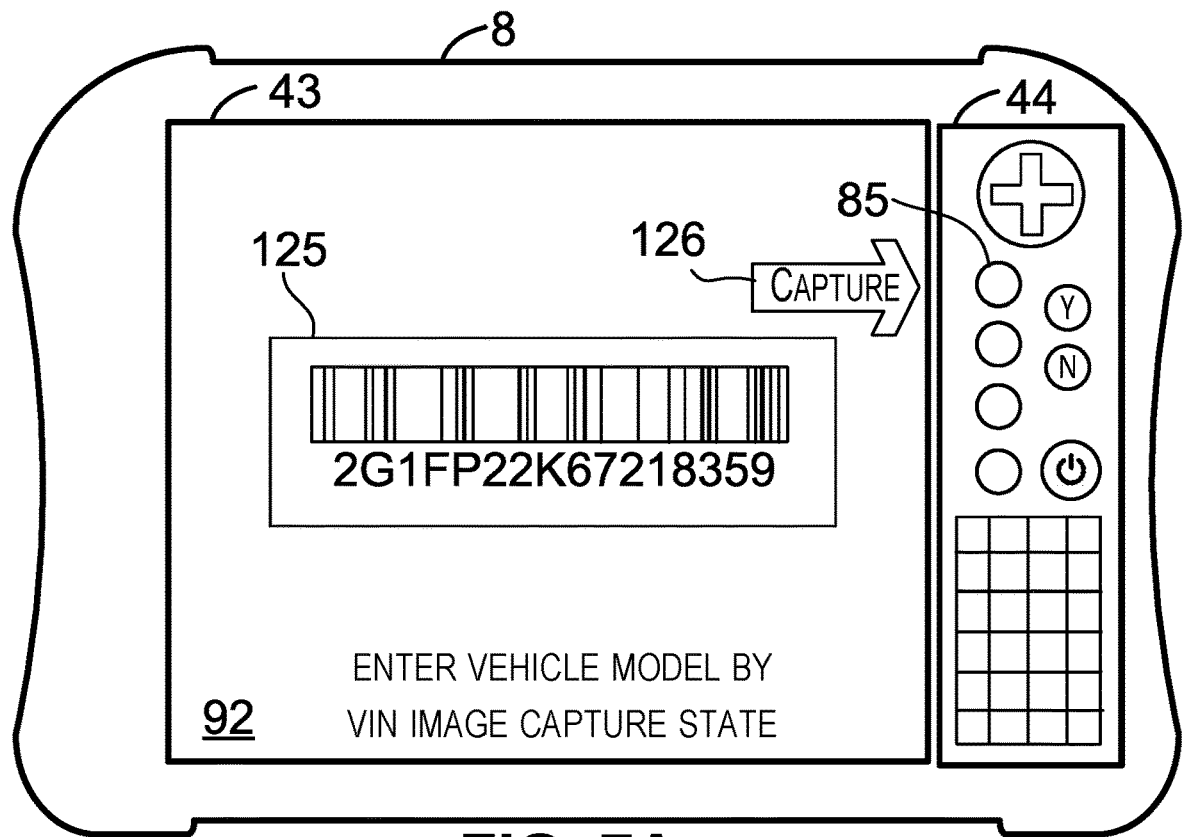

In response to determining the selector 118 was selected, the processor 40 can activate the capture device 45. The display 43 can display the display screen 92 as shown in FIG. 7A. The description of FIG. 7A discusses capturing an image of the VIN. The processor 40 can automatically determine the vehicle model by determining a portion of the VIN shown in the image of the VIN matches vehicle model information stored in the VRD 66.

Figure 7B:
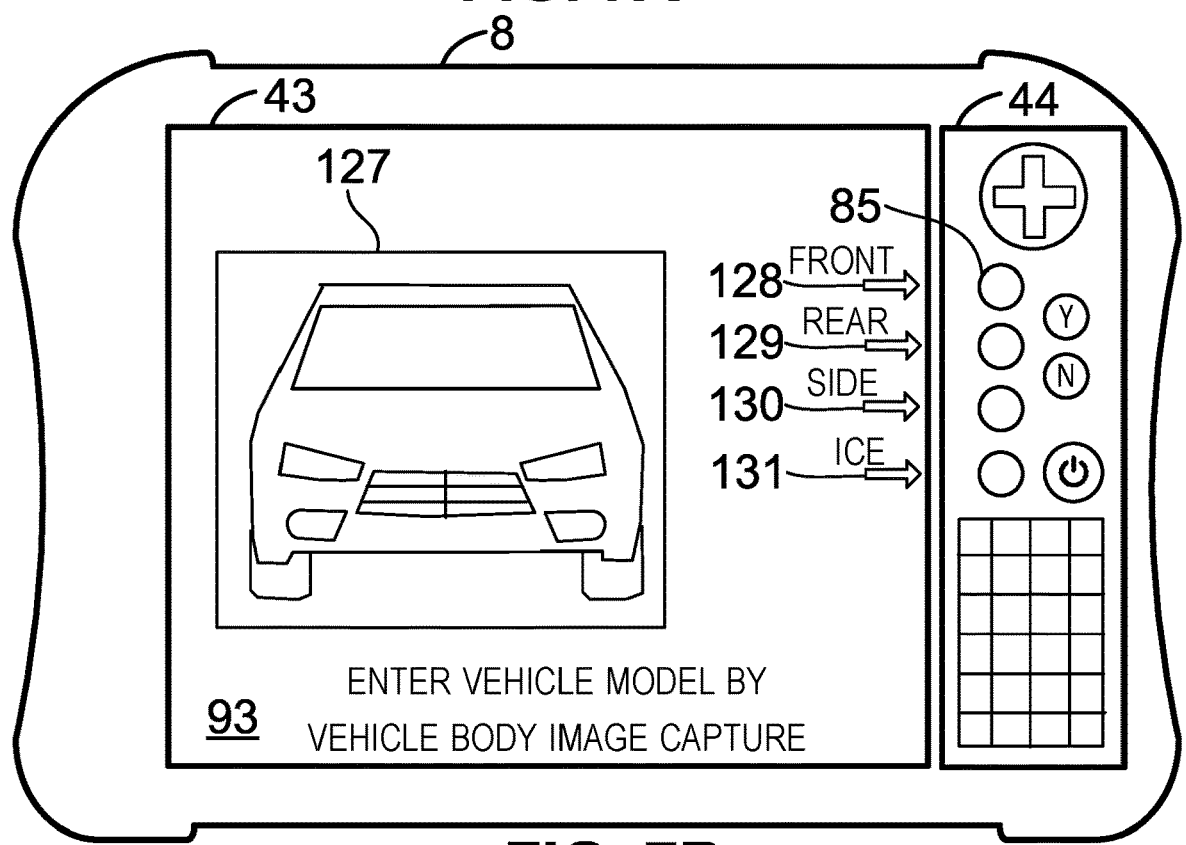

In response to determining the selector 119 was selected, the processor 40 can activate the capture device 45. The display 43 can display the display screen 93 as shown in FIG. 7B. The description of FIG. 7B discusses capturing an image of a vehicle and data identifying a view of the vehicle (e.g., front, rear, side or ICE). The processor 40 can automatically determine the vehicle model by determining the view of the vehicle shown in the image of the vehicle matches a view of a vehicle shown in an image stored and/or referenced in the VRD 66 and from vehicle model information associated with the image stored in the VRD 66. The processor 40 can cause the display 43 to display a prompt requesting capture of a particular view of the vehicle connected to the scanner for comparison to other images stored in the VRD 66. Selection of a virtual control and/or a key of the keypad 44 while the capture device 45 is active can cause the capture device to capture an image.

Figure 8A:
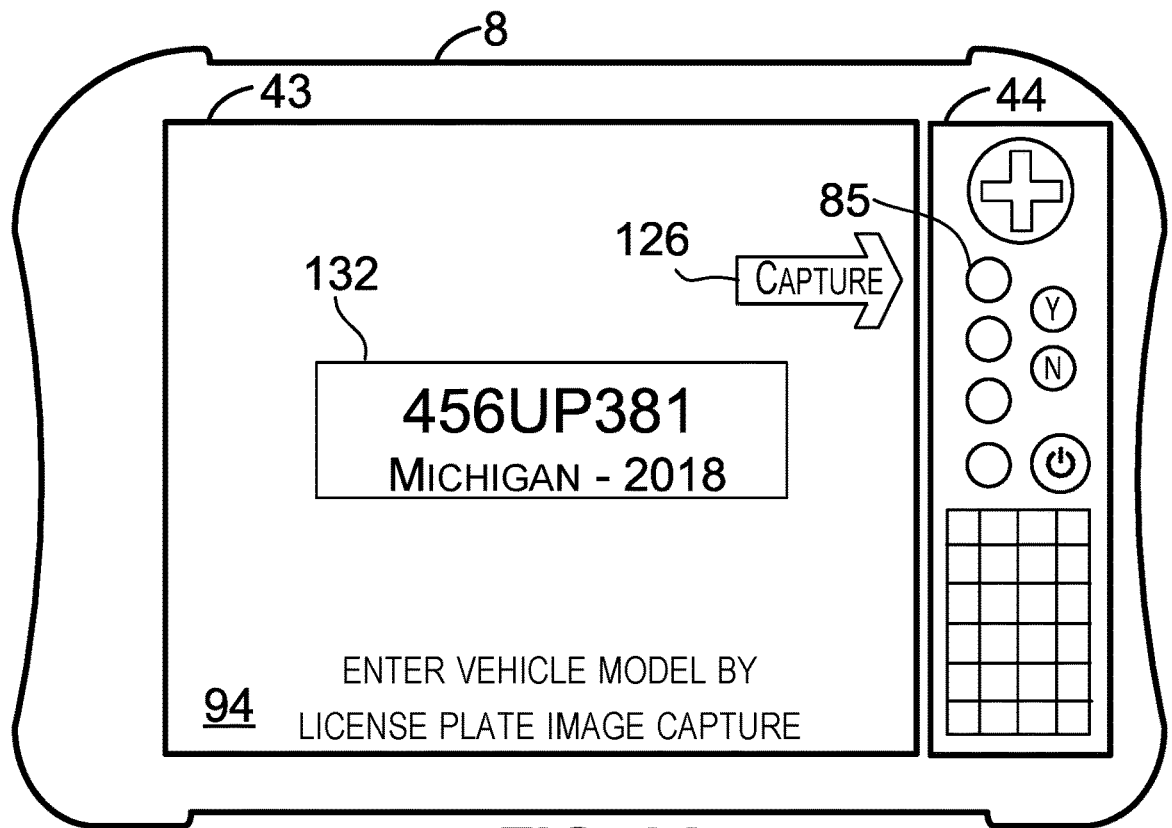

In response to determining the selector 120 was selected, the processor 40 can activate the capture device 45. The display 43 can display the display screen 94 as shown in FIG. 8A. The description of FIG. 8A discusses capturing an image of a license plate. The processor 40 can perform OCR on characters within the captured image. The processor 40 can automatically determine the vehicle model by determining information (e.g., a license plate number, a geo-political state or country identifier) on the license plate shown in the image of the license plate matches license plate information stored in the VRD 66, and determining vehicle model information stored in the VRD 66 is associated with the license plate information stored in the VRD 66.

The processor 440 can determine the vehicle model associated with the first vehicle. The scanner 8 can transmit to the server 9 a communication indicative of the vehicle model. This communication can include a vehicle model identifier that indicates the determined vehicle model. The server 9 can determine the vehicle model based on the communication from the scanner 8. The display 43 can display a display screen that shows the vehicle model identifier. Alternatively, the communication can include data indicative of the vehicle model, such as one or more image files of the first vehicle, from which the server 9 can determine the vehicle model.

Next, block 502 includes determining, by the processor, a first DTC set within a first ECU in the vehicle. Determining the first DTC set within the first ECU can include the processor 40 and/or the VCT 42 transmitting a VDM to request DTC data from the first ECU (e.g., the ECU 3). The VDM to request the DTC data from the first ECU can include physical addressing or functional addressing. The physically addressed VDM can include an OBD II VDM having a three byte header and a one byte mode number, where the first header byte identifies a priority of the VDM, the second header byte identifies a physical ID of the destination (i.e., the ECU 3), the third header byte identifies a physical ID of the source (e.g., $F1 to represent the scanner 8), and the mode number is $03. The ID of the ECU 3 can depend on the type of the system in which the ECU 3 is installed and/or the VDM protocol used by the ECU 3. The functionally addressed VDM can include a message using an eleven bit identifier, a data length code byte, a number of additional data bytes byte, and the mode number byte. Other examples of a VDM to request the DTC data are available.

Determining the first DTC set within the first ECU can include the processor 40 and/or the VCT 42 receiving a VDM including DTC data. The VDM including DTC data can include an identifier of the first ECU and an identifier of the first DTC. As an example, the DTC data can be arranged according to the OBD II DTC format, in which the DTC data represents a first character of the DTC as a letter selected from B, C, P, or U, and the last four characters of the DTC as decimal numerals 0 to 9. As another example, the DTC data can be arranged according to a vehicle manufacturer specific DTC format. The DTC data can include an identifier of one or more other DTC set by the first ECU.

The DTC data can, for some vehicle models, include drive cycle information indicating how many drive cycles of the vehicle have occurred with the vehicle since the first DTC was set within the first ECU. The drive cycle information can indicate a number of key cycles of the vehicle have occurred with the vehicle since the first DTC was set within the first ECU. The DTC data can include freeze-frame data stored in the first ECU. Freeze-frame data is data the ECU stores in response to setting a DTC. The freeze-frame data can include PIDs and PID values. The freeze-frame data can include data captured by the ECU prior to setting the DTC, data captured by the ECU at the time of setting the DTC, and/or data captured by the ECU after setting the DTC.

The processor 40 and/or the VCT 42 can request DTC data from multiple ECU with the vehicle 1. The processor 40 can determine which ECU are installed in the vehicle 1 based on the VRD 66. If the processor 40 cannot determine which ECU are installed in the vehicle 1 or otherwise, the processor 40 and/or the VCT 42 can transmit VDM with each potential ECU identifier and wait some amount of time for a response to each VDM to see if an ECU responds to the VDM request for DTC data. For example, if the vehicle 1 uses two byte physical addresses for its ECU, the processor 40 and/or the VCT 42 can transmit requests for DTC data with the physical address $00 to $FF.

The processor 40 can request DTC from all ECU within the vehicle that are configured to set a DTC in response to receiving a single selection of a read DTC selector displayed on the display 43, such as a read DTC selector 110 (shown in FIG. 6A) or a read DTC selector 190 (shown in FIG. 11B). The processor 40 can cause the VCT 42 to transmit a VDM to request codes from each ECU in the vehicle that sets DTC. In this way, a technician can determine DTC from multiple ECU in the vehicle without having to select each vehicle system on a vehicle scanner individually and then request the DTC stored in the ECU of that vehicle system, and repeat those selection steps until performed for each vehicle system. Providing the ability to determine DTC from multiple ECU in the vehicle via a single selector is an improvement over diagnostic tools that requiring selecting multiple vehicle systems individually to read DTC from multiple ECU in the vehicle.

The DTC data 62 can include each DTC identified in the received vehicle information. The DTC data 62 can include the other DTC data as well. The processor 40 can cause the identified DTC to be added to a collision report 68. Determining the first DTC can occur as part of the processor 40 performing a pre-repair scan of the vehicle as described elsewhere in this description.

The processor 440 can determine the first DTC set within the first ECU in the first vehicle. The scanner 8 can transmit to the server 9 a communication indicative of the first DTC. The server 9 can determine the first DTC based on the communication from the scanner 8.

Next, block 503 includes determining, by the processor, a first damaged portion of the vehicle damaged by a collision. The scanner 8 can transition to an operating state to determine the first damaged portion in response to any of a variety of trigger events. As an example, the trigger event that causes the scanner 8 to transition to the operating state to determine the first damaged portion can include the processor 40 determining a selector, such as the selector 113 of a main scanner menu 109 (shown in FIG. 6A) or a selector 191 of a main scanner menu 189 (shown in FIG. 11B) is selected. A main scanner menu can be a top-level menu in a hierarchy of menus. A display screen that includes a main scanner menu can be a main display screen. A main display screen can be a top-level display screen. A top-level menu or a top-level display screen can be referred to as a home menu or home display screen, respectively. The scanner 8 can display the main scanner menu while operating in a home display screen operating state.

In one or more implementations, the scanner 8 includes a single mode for identifying damaged portion(s) of a vehicle. In at least some of these implementations, the display 43 can display a display screen for entering data and/or a selection to identify the damage portion(s) of the vehicle in response to detecting the aforementioned trigger event. In one or more other implementations, the scanner 8 includes multiple modes for identifying damaged portion(s) of a vehicle. In at least some of these implementations, the display 43 can display a display screen having a damage selection menu from which a mode for identifying damage portion(s) of a vehicle can be selected.

As an example, the display 43 can display the display screen 104 including a damage selection menu 220 (shown in FIG. 13A) while operating in the operating state to identify the damaged portion(s) (e.g., the first damaged portion) of the vehicle. The processor 440 can cause the display screen 104 and/or the damage selection menu 220 to be transmitted to the scanner 8 for displaying on the display 43. The processor 40, 440 can determine a selection entered via the damage selection menu 220. As described below, the damage selection menu 220 includes the selectors 221 to 226. Each of the selectors 221 to 226 is associated with a different example mode for identifying damaged portion(s) of a vehicle.

Other example mode(s) for identifying damaged portion(s) of a vehicle in addition to or as an alternative to one or more of the example modes shown in the damage selection menu 220 are possible. Moreover, in some implementations, the damage selection menu 220 includes some, but not all, of the selectors 221 to 226, such as any one, any two, any three, any four, or any five of the selectors 221 to 226.

Next, a description of the example operating modes that can be entered by making a selection from the damage selection menu 220 is provided. In response to determining the selector 221 (shown in FIG. 13A) has been selected, the processor 40 can cause the display 43 to display the display screen 96 (shown in FIG. 9A), to receive a selection of a vehicle image 150, 151, 152, and to cause the display 43 to display a vehicle grid (such as the vehicle grid 134, 148 shown in FIG. 9B or 10A) showing the vehicle image 151, 152, 153 selected from the display screen 96. Under some circumstances, such as when the processor 40 has already identified the vehicle 1, the processor 40 can cause the display 43 to display a vehicle grid, such as the vehicle grid 134, 148 without receiving a selection of a vehicle image from the display screen 96. Under these example circumstances, the processor 40 can select an appropriate vehicle image from the image 65 to display in the vehicle grid 134, 148 based on the vehicle identification.

Figure 9A:
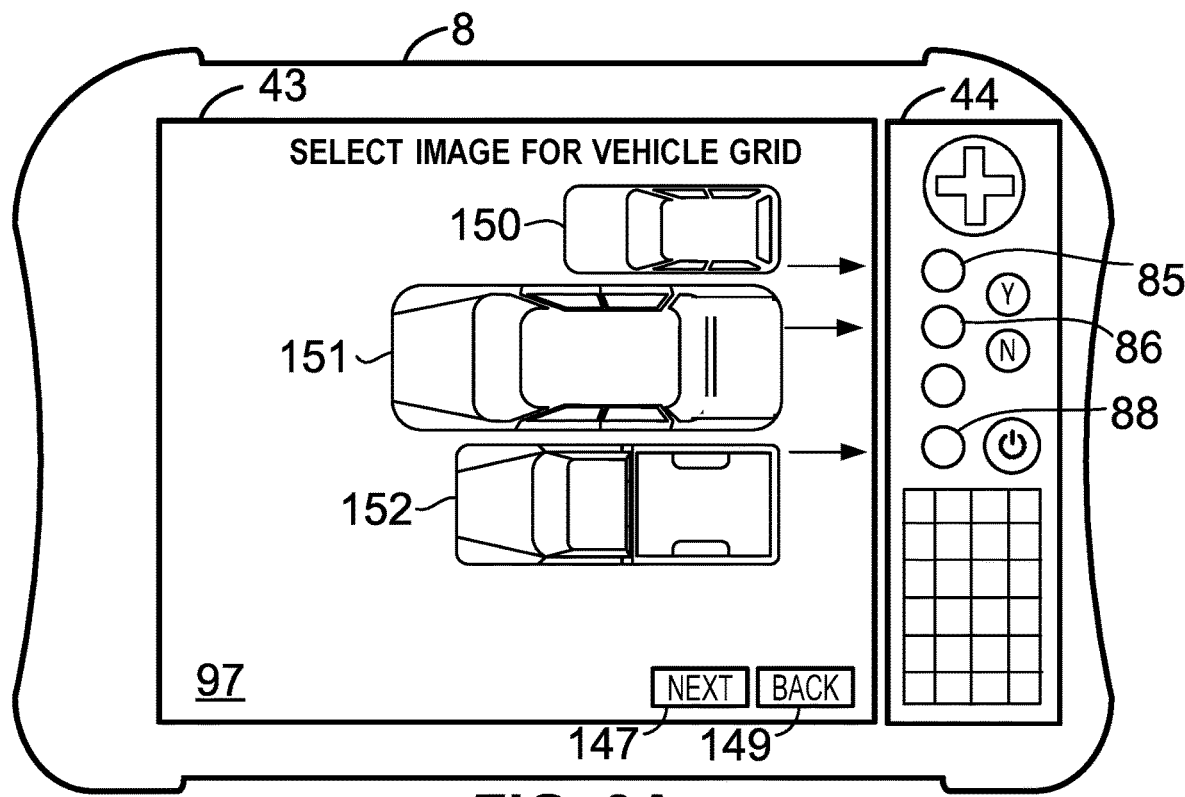

The vehicle image selected for determining a damaged portion of the vehicle can include an image associated with the vehicle model or an image of a generic vehicle (e.g., as discussed with respect to FIG. 9A). The image is divided into multiple selectable portions. Each selectable image portion corresponds to a reference vehicle portion of the vehicle model or the generic vehicle. Determining the first damaged portion of the vehicle can include receiving a selection of a selectable portion of the displayed image that corresponds to the first portion of the vehicle model or the generic vehicle. Receiving that selection can include determining that the touch screen of the display 43 displaying the image was touched at a location the selectable image is displayed. Additionally or alternatively, the cursor 89 and/or the keypad 44 could be used to select the selectable portion of the image. The processor can refer to the vehicle image data 313 (shown in FIG. 16A) to determine that the first portion is associated with the selected portion of the displayed image.

The processor can receive an input to switch vehicle images shown on the display 43. Switching the images can include the processor 40 outputting a different image of the vehicle model or the generic vehicle in response to receiving the input. As an example, in response to receiving the input to switch vehicle images while an image showing a first side of the vehicle model or the generic vehicle is being displayed, the processor can cause the display 43 to display an image showing a second side of the vehicle model or the generic vehicle instead of the image showing the first side of the vehicle model or the generic vehicle.

Switching images shown on the display 43 allows a user to enter inputs indicating damage to different portion(s) of the vehicle model or the generic vehicle. Selecting damaged portion(s) from an image showing a particular side of the vehicle can be critical as some vehicle components are only located on the particular side of the vehicle model or the generic vehicle. As an example, the first side of the vehicle 1 can be a front of the vehicle 1, a rear of the vehicle 1, the left side of the vehicle 1, a right side of the vehicle 1, a top side of the vehicle 1, or the bottom of the vehicle 1, and the second side of the vehicle 1 can be another of the front of the vehicle 1, the rear of the vehicle 1, the left side of the vehicle 1, the right side of the vehicle 1, the top side of the vehicle 1, or the bottom of the vehicle 1.

Determining damaged portion(s) of a vehicle by selecting portion(s) of a vehicle from a vehicle grid can be beneficial in that a user can select portion(s) of a vehicle using a touch screen display or keypad and/or the user can be confident that the processor is provided with correct selections of damage portion(s). Moreover, allowing a user to select damaged portion(s) of a vehicle allows the user to limit which damaged portion(s) of a vehicle are to be considered by the processor.

In response to determining the selector 222 (shown in FIG. 13A) has been selected, the processor 40 can activate the capture device 45 to capture an image that shows the damaged portion(s) of the vehicle. The processor 40 can cause the memory 47 to store the image showing the vehicle damage as part of the captured data 64 and/or the image 65. Capturing an image for use in determining damaged portion(s) of a vehicle can expedite the determination of the damaged portion(s) for at least one of the following reasons: a user does not need to select damaged portions from a vehicle grid, and/or the captured image showing damage to a portion of the vehicle 1 can be compared to another image, such as image showing the same portion of an identical vehicle model or an image showing damage to the same portion of an identical vehicle model. Moreover, determining vehicle damage using images can be more consistent than determining damage based on user-selected input because different users may enter different amounts of deflection for two similarly damaged vehicles, whereas images of the two similarly damaged vehicles are more likely to show the same amount of damage.

In response to determining the selector 223 (shown in FIG. 13A) has been selected, the processor 40 can download an image showing a damaged portion of a vehicle. The processor 40 can cause the network transceiver 41 to request and/or receive the image showing the damaged portion from a computing system, such as the server 9, or the NCS 24, 25, 26. The processor 40 can cause the memory 47 to store the downloaded image showing the vehicle damage as at least part of the image 65. In an alternative arrangement, the image showing the damaged portion can be downloaded by the processor 40 prior to determining the selector 223 has been selected. In this arrangement, determining the selector 223 has been selected can cause the processor 40 to locate and receive the downloaded image from the memory 47 for comparison to another image, such as an image of an undamaged portion of a vehicle associated with the vehicle model.

In response to determining an image showing vehicle damage has been captured, downloaded, or otherwise received, the processor can determine the first damaged portion based on the portion of the image showing the vehicle damage. The processor 40 can determine the first damaged portion by comparing the image showing the vehicle damage to an image of an undamaged vehicle associated with the vehicle model. The processor 40 can receive the image of the undamaged vehicle from the image 65 and/or the image library 465. If the image 65 does not include the image of the undamaged vehicle, the processor 40 can cause the network transceiver 41 to request the image of the undamaged vehicle from the server 9. The request for the image of undamaged vehicle can include vehicle model information indicative of the vehicle model associated with the vehicle 1. Upon or after receiving the image of undamaged vehicle, the processor 40 can cause the memory to store the image of undamaged vehicle in the image 65 along with metadata indicative of the vehicle model shown in the image of undamaged vehicle.

The processor 40 can cause the network transceiver 41 to transmit the captured image showing vehicle damage to the server 9 in a request for determining the first damaged portion of the vehicle damaged by a collision. The server 9 can determine the first damaged portion and transmit a communication including data indicative of the first damaged portion to the network transceiver 41. Accordingly, the processor 40 can determine the first damaged portion from the communication sent by the server 9. As an example, determining damaged portion(s) of a vehicle from a downloaded image can be beneficial in situations in which the damaged vehicle is not in proximity to the scanner 8.

In response to determining the selector 224 (shown in FIG. 13A) has been selected, the processor 40 can cause the network transceiver 41 to request and receive a repair order regarding the vehicle 1 from a computing system, such as the server 9, or the NCS 24, 25, 26, and read the repair order to determine the damaged portion of the vehicle 1. The repair order can, for example, describe the first damaged portion textually and/or graphically. The processor 40 can cause the memory 47 to store the repair order. In some implementations, the processor 40 can perform OCR on the repair order to determine the first damaged portion from a textual description of the damaged location of the vehicle. In another implementation, the processor 40 can read the RO, such as an RO in the form of an XML, file. In some implementations, the processor 40 can determine markings made to a vehicle image on the repair order by comparing the image on the repair order to an unmarked vehicle image and determine the first damaged portion pertains to a portion of the vehicle image on the repair order marked with the marking. The repair order can include an estimate pertaining to the first vehicle and the collision. Alternatively, the processor 40 can cause the network transceiver 41 to request and receive the estimate (separate from a repair order) regarding the vehicle and the collision from the NCS 24, 25, 26. The processor 40 can perform OCR on the estimate to determine the first damaged portion from a textual description of the damaged location of the vehicle. As an example, determining damaged portion(s) of a vehicle from a repair order can be beneficial in situations in which the damaged vehicle is not in proximity to the scanner 8.

Determining a damaged portion of a vehicle from an RO can include the processor 40 comparing terms retrieved from the RO to one or more taxonomies of terms. As an example, a taxonomy of terms can include spatial terms to indicate different portions of the vehicle 1. As an example, a term "passenger side" and "driver side" can indicate either the left side or the right side of the vehicle, depending on where the vehicle was built and/or where the vehicle is being driven. As another example, a taxonomy of terms can include component terms to indicate different components of the vehicle 1, such as "door", "bumper", "window", "quarter panel," among others.

In response to determining the selector 225 (shown in FIG. 13A) has been selected, the processor 40 can display a text field for entering text describing a damaged portion of a vehicle via the keypad 44 or the touch screen of the display 43. As an example, the display 43 can display a menu that includes spatial terms selectable via the keypad 44 as or to form the first vehicle portion identifier. As another example, the display 43 can display a field in which text describing the first vehicle portion identifier can be entered by pushing multiple buttons of the multi-button keypad 84.

In response to determining the first damaged portion, the processor 40 can cause the memory 47 to store first damaged portion as the vehicle portion identifier 63 and/or to send to the server 9 a communication including data indicative of the first damaged portion of the vehicle 1.

Depending on the extent of damage a vehicle sustained and how portions of a vehicle are shown in a vehicle grid, determining a damaged portion of the vehicle can include determining multiple damaged portions of the vehicle from the vehicle grid.

In response to selecting the selector 226 (shown in FIG. 13A), the processor 40 can determine measurements of the vehicle 1 using one or more laser transmitters and receivers. The processor 40 can generate an outline of the vehicle 1 based on the measurements using the laser transmitters and receivers and compare the outline of the vehicle 1 to one or more images stored in the image 65. Differences between the outline of the vehicle 1 and the one or more images showing similar portions of vehicle 1 can indicate deflection of vehicle 1. The processor 40 can be configured to identify a deflected portion of a vehicle as a damaged portion of the vehicle. In an example implementation, the capture device 45 can include the one or more laser transmitters and receivers. The processor 40 can output a display screen showing damaged portions of a vehicle, identified based on the measurements using the laser transmitters and receiver. The display screens 735, 736 are examples of the vehicle grid 148 displaying damage areas 737, 738 that can be determined based on measurements using the laser transmitters and receivers.

Once the processor 40 determines a damaged portion of vehicle 1, the processor 40 can, but need not necessarily, determine PIDs to request from the vehicle 1, request and receive PID parameters for those determined PIDs, and use the PIDs and PID parameters when making a determination of whether the first DTC is collision-related.

Next, block 504 includes determining, by the processor, the first DTC is collision-related. Determining the first DTC is collision-related can include determining, by the processor, the first damaged portion of the vehicle matches a reference vehicle portion associated with both a component attributable to setting the first DTC and the vehicle model. Determining whether a DTC is collision-related can provide for an improved user interface for documenting evidence related to repairing a damaged vehicle.

Moreover, determining whether a DTC is collision-related can provide the processor with information to determine which diagnostic procedure of multiple diagnostic procedures should be followed for diagnosing the DTC more quickly. For example, if the DTC is determined to be collision-related, then the processor can select a diagnostic procedure that is initially focused on diagnosing components located in the damaged portions of the vehicle 1. On the other-hand, if the DTC is determined to be non-collision-related, then the processor can select a diagnostic procedure to diagnose the procedure that is initially focused on non-damaged portions of the vehicle.

The VRD 66 can include reference data indicative of a vehicle reference portion associated with a vehicle model and a DTC. If the memory 47 does not include that reference data for the vehicle model associated with the first vehicle, the processor 40 can transmit to the server 9 a request for reference data that can be used by the processor 40 to determine whether the first DTC is collision-related or non-collision-related. As an example, the request for reference data can include the vehicle model information of the vehicle 1 such that the server 9 can provide the scanner 8 with reference data for making a collision-related determination regarding any DTC settable within the vehicle 1. As another example, the request for reference data can include the vehicle model information of the vehicle 1 and information regarding a damaged portion of the vehicle (such as the first damaged portion) such that the server 9 can provide the scanner 8 with reference data for making a collision-related determination regarding the DTC settable within the vehicle 1 and a component attributable to setting the DTC settable within the vehicle 1.

The component attributable to setting the first DTC can include to one of the following vehicle components: an ECU, an input to an ECU, an output of an ECU, a sensor, a solenoid, a wire, a fiber optical cable, a connector, a connector pin, an electrical ground circuit, an electrical power line, a motor, a switch, or a signal line (e.g., a wire configured to carry an electrical signal to or from an electrical vehicle component). Other examples of the component attributable to setting the first DTC are available.

A determination that a DTC is collision-related or non-collision-related may be made with a probability of less than one hundred percent. The processor can make other determinations (e.g., a collision-related determination) in order to increase the probability of correctly determining a DTC is collision-related or non-collision-related. Examples of other collision-related determinations are described below.

Another collision-related determination can include a determination of whether a difference in a first parameter from the vehicle 1 indicative of the first DTC setting within the first ECU and a second parameter pertaining to a current operating state of the vehicle 1 is within a threshold range. In one example, the first and second parameters are both indicative of a distance the vehicle 1 has been driven. In another example, the first and second parameters are both indicative of a number of driving cycles. In yet another example, the first and second parameters are both indicative of a time. The processor can obtain the parameters indicating the distances, the numbers of driving cycles, or the times by transmitting a parameter request including a PID associated with the distance, the number of driving cycles, or the time. The threshold range can be a number of miles for the distance parameters, a number of drive cycles for the drive cycle parameters, and a time for the time parameters.

Another collision-related determination can include a determination of whether a PID parameter for a PID associated with the first DTC indicates setting of the first DTC is collision-related. The scanner 8 can determine the PID parameter from the vehicle 1. As an example, for an occurrence in which the first DTC is P0095, the scanner 8 can determine parameter values $08, $78, $11, $5E, and $88 were stored for PID1, PID2, PID3, PID4, and PID5, respectively, at or in proximity to a time the collision occurred. The scanner 8 can request parameter values for those PID since the PID parameter data 361 indicates those PID are associated with the DTC P0095. The processor can compare the parameter values determined from the vehicle 1 to PID parameter data 361. If all or most of the PID parameter values determined from the vehicle 1 are close in proximity to the mean operating values for the associated PID, then the processor can be configured to determine the DTC is not collision-related, but rather is set from a prior condition of the vehicle 1, such as normal wear of the vehicle 1.

Figure 5B:
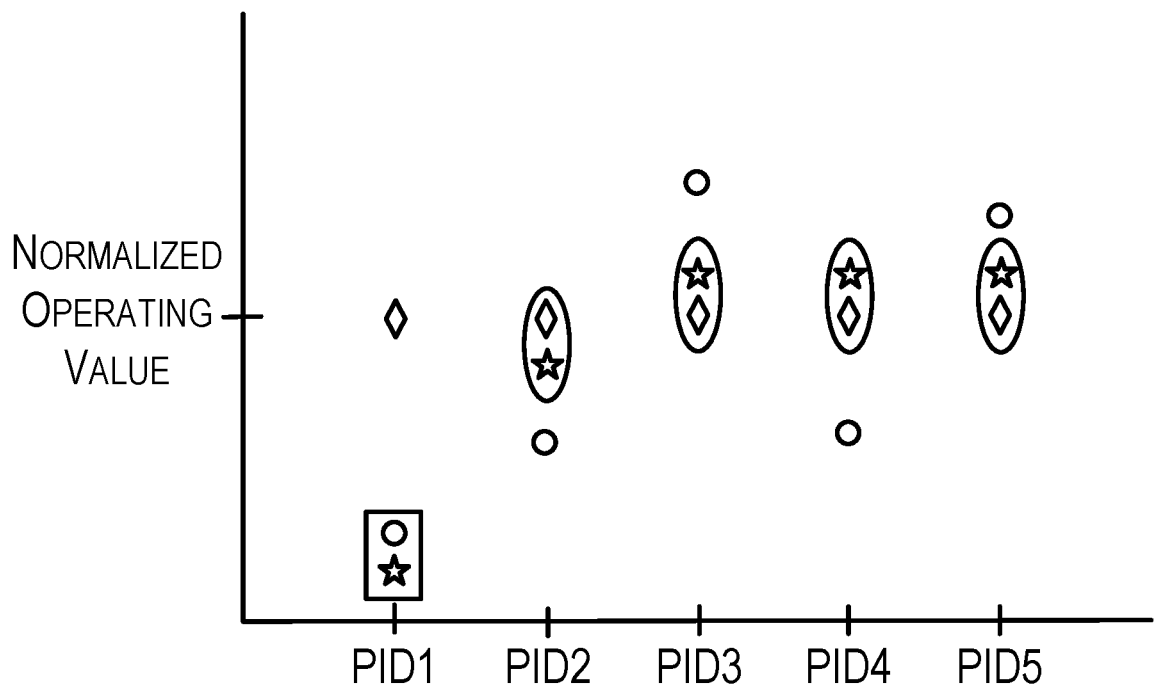
FIG. 5B is a graph illustrating parameter value comparisons in accordance with the example implementations.

FIG. 5B is a graph illustrating parameter value comparisons based on the PID parameter data 361 and the example parameter values for PID1, PID2, PID3, PID4, PID5. The PID parameter values are shown in FIG. 5B as having been normalized. FIG. 5B shows that PID deviates greatly with respect to the mean operating parameter value for PID1. This tends to show that the DTC (e.g., P0095) associated with the group of PIDs shown in FIG. 5B is collision-related since the parameter values have not aged equally. In particular, a vehicle component (e.g., a sensor) associated with the PID1 may have been damaged during a collision since the PID1 parameter value received from the vehicle 1 deviates greatly from the mean operating parameter value for PID1. On the other hand if all or most the PID parameter values shown in FIG. 5B deviated from the mean operating parameter values for those PIDs and are proximate the fault values for those PIDs, then the DTC would more likely not be collision-related.

An aged PID is a PID associated with PID parameters that indicate a component associated with the PID needs to be replaced or otherwise serviced and/or performance of the component has degraded to a point outside a normal operating range. As an example, the component may be worn and/or have accumulated material such that the component cannot operate within a normal (non-malfunctioning) operating range. In particular, the component associated with an aged PID can include an idle-air control valve, an exhaust gas recirculation (EGR) valve, a fuel injector, an oxygen sensor, or a mass air flow sensor. In one respect, an aged PID may directly indicate the component. For example, the parameters of a PID that indicates signal values of an oxygen sensor may indicate the oxygen sensor needs to be replaced or otherwise serviced. In another respect, an aged PID may indirectly indicate the component. For example, the parameters of a PID that indicate signal values of an oxygen sensor may indicate the EGR valve needs to be replaced or otherwise serviced. The indirect indication can arise from comparing parameters from multiple PIDs as shown in FIG. 5B.

If the vehicle 1 does not output a parameter for a requested PID or outputs a parameter value for the requested PID that is at its maximum or minimum value and does not change over multiple requests for the PID parameter, the processor 40 can be configured to determine that a vehicle component (e.g., a sensor) associated with the PID and/or a circuit in between the vehicle component and an ECU is damaged, and potentially collision-related.

Another collision-related determination can include a determination of whether the vehicle collision occurred before the first DTC was set. The processor could make this determination by comparing a time or vehicle mileage when the first DTC was set to a time or vehicle mileage, respectively, when the first vehicle was involved in a collision.

Another collision-related determination can include a determination of whether a time the first DTC was set and a time the vehicle collision occurred are within a threshold amount of time. A determination that the first DTC set within the threshold amount of time can indicate a higher probability of the first DTC setting as a result of the vehicle collision. A determination that the first DTC did not set within the threshold amount of time can indicate a lower probability of the first DTC setting as a result of the vehicle collision. The threshold amount of time can depend upon various factors, such as the ECU that sets the DTC and/or the DTC itself. For instance, the threshold amount of time can be greater for DTC set by a powertrain ECU as compared to a DTC set by a body control ECU. As an example, the threshold amount of time can be an amount of time between zero and sixty seconds or a threshold amount of time between zero and three hundred seconds. Moreover, the threshold amount of time can be increased for vehicle collisions involving multiple collisions, such as a first vehicle hitting a rear end of a second vehicle, and the rear end of the first vehicle being hit by a third vehicle thirty seconds after the first vehicle hit the second vehicle. The threshold amount of time can include the amount of time between collisions plus a default threshold amount of time. Other examples of the threshold amount of time are available.

Another collision-related determination can include a determination of whether or not the first DTC is rarely set in vehicles associated with the determined vehicle model. As an example, a DTC that sets in less than 0.05% of instances of servicing the vehicles of the determined vehicle model can be considered to be rarely set. As another example, a DTC that sets in 15.0% of instances of servicing the vehicles of the determined vehicle model can be considered to be set often. The percentages of instances of the DTC setting can be based on mileage in the vehicle. Accordingly, the processor can refer to a percentage of the DTC setting that is associated with a vehicle mileage matching the vehicle mileage of the damaged vehicle or being within a vehicle mileage range including the vehicle mileage of the damaged vehicle. A DTC that is set in the damaged vehicle, but rarely sets in vehicles of the determined vehicle model is more likely to be a DTC caused by the vehicle collision. A DTC that is set in the damage vehicle, but sets often in vehicles of the determined vehicle model can be considered as less likely to be a DTC caused by the vehicle collision. The processor 40 can determine the percentages of a DTC setting from the server 9. The server 9 can determine the percentages of the DTC setting based on repair orders.

The processor can determine a second DTC is set in the vehicle 1. The second DTC can be set by the same ECU that set the first DTC or by a different ECU in the vehicle. The processor can determine whether the second DTC is collision-related or non-collision-related. As an example, the processor can determine the second DTC is non-collision-related by determining that the second DTC was set prior to the collision. As another example, the processor can determine the second DTC is non-collision-related by determining the first damaged portion of the vehicle 1 is not associated with any vehicle component associated with setting the second DTC. The collision report 68 can include an identifier of the second DTC, such as the non-collision-related DTC data 520 shown in FIG. 17.

Next, block 505 includes outputting, by the processor, a collision report that indicates the first DTC is collision-related. The processor 40 can generate and store the collision report in the memory 47 as the collision report 68.

The collision report 68 can be output to a variety of devices. For example, outputting the collision report 68 can include the processor 40 outputting the collision report 68 to one or more of the following: the network transceiver 41, the display 43, the server 9, the NCS 24, 25, 26, the collision service provider 17, the insurance company 18, 19, 20, or a printer (e.g., other computing systems 670 shown in FIG. 19). A collision report output to the network transceiver 41 can be output by the network transceiver 41 to the network 11 for transmission to one or more of the following: the network transceiver 41, the display 43, the server 9, the NCS 24, 25, 26, the collision service provider 17, the insurance company 18, 19, 20, or a printer (not shown). A collision report output to the display 43 can be displayed by the display 43.

Another function that can be performed by the processor 40 in combination with a described method that includes performing the set 500 includes the processor 40 performing a pre-repair scan of the vehicle 1 to determine which DTC are set in the vehicle 1 prior to a portion of the vehicle damaged by the collision being repaired. The processor 40 can cause the DTC determined by the pre-repair scan to be stored as part of the DTC data 62 and/or the collision report 68. The pre-repair scan can occur after the processor 40 determines the vehicle model. The pre-repair scan can occur automatically upon the processor 40 determining the vehicle model associated with the vehicle while the scanner is connected to the vehicle and the vehicle is powered on. The DTC determined during a pre-repair scan can be included in the collision report 68 output by the processor 40.

Another function that can be performed by the processor 40 in combination with a described method that includes performing the set 500 includes the processor 40 performing a post-repair scan of the vehicle 1 to determine which DTC are set in the vehicle 1 after the portion of the vehicle damaged by the collision was repaired. The processor 40 can cause the DTC determined by the post-repair scan to be stored as part of the DTC data 62 and/or the collision report 68. The post-repair scan can occur after the processor 40 determines the vehicle model. The post-repair scan can occur in response to receiving a request to perform the post-repair scan while the scanner is connected to the vehicle and the vehicle is powered on. The DTC determined during a post-repair scan can be included in the collision report 68 output by the processor 40.

Performing the pre-repair scan and the post-repair scan is beneficial because the processor 40 can compare the DTC determined during the pre-repair scan to the DTC (if any) determined during the post-repair scan to determine if any DTC set are sent in the vehicle after the pre-repair scan. DTC set in the vehicle after the pre-repair scan can indicate that some repair was performed incompletely or incorrectly (e.g., a DTC can be indicative of an electrical connector in the vehicle being disconnected).

Another function that can be performed by the processor 40 in combination with a described method that includes performing the set 500 includes the processor 40 determining a warning regarding repairing the vehicle, outputting the warning to the display, and the display 43 displaying the warning. Determining the warning can include the processor 40 determining the warning is mapped to the reference portion associated with the vehicle model, such as the warning 360 mapped to the reference portions LRQ, RRQ, LR, and RR.

Figure 12A:
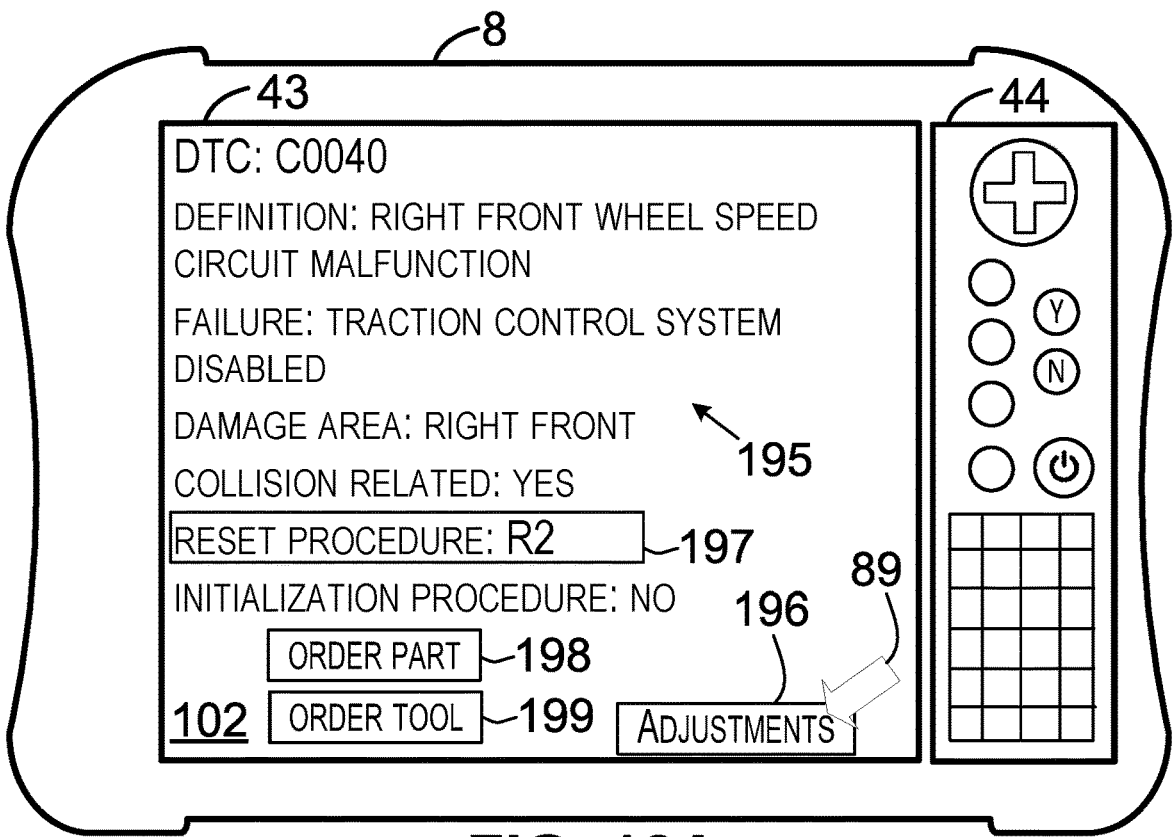

Another function that can be performed by the processor 40 in combination with a described method that includes performing the set 500 includes the processor 40 receiving an input indicative of a vehicle adjustment selector (e.g., the selector 192 shown in FIG. 11B) being selected. In response to receiving that input, the processor 40 can output and the display 43 can display vehicle adjustment function information and a vehicle adjustment function selector. FIG. 12A shows an example of vehicle adjustment function information regarding a DTC C0040. FIG. 13B shows an example of vehicle adjustment function information including multiple vehicle adjustment function selectors. The processor 40 can receive an input indicative of a vehicle adjustment function selector being selected and outputting a signal or communicating to perform a vehicle adjustment corresponding to the selected vehicle adjustment function selector. As an example, the vehicle adjustment includes one or more of the following: programming a vehicle component in the first vehicle, initializing a vehicle component in the first vehicle, calibrating a vehicle component in the first vehicle, or resetting a vehicle component in the first vehicle.

Another function that can be performed by the processor 40 in combination with a described method that includes performing the set 500 includes the processor 40 receiving an input indicative of a DTC (e.g., a DTC in the list of DTC 133 shown in FIG. 8B) being selected. In response to receiving that input, the processor 40 can output and the display 43 can display additional information regarding a DTC set in the ECU 3 in the vehicle 1. For instance, the additional information regarding a DTC can include the DTC information 195 pertaining to the DTC C0040 shown in FIG. 12A if the DTC C0040 was selected from the list of DTC 133.

Another function that can be performed by the processor 40 in combination with a described method that includes performing the set 500 includes the processor 40 determining that a DTC set in the vehicle is a DTC indicative of a fault and/or deployment of a deployable vehicle safety restraint system (SRS) component, such as an air bag or a seat belt retractor pre-tensioner. The processor 40 can be configured to add such DTC to the collision report 68 even though the deployable SRS component may not located in proximity to the vehicle's point-of-impact.

V. Example Collision Report

Next, FIG. 17 shows example information that can be included within the collision report 68. As shown in FIG. 17, the collision report 68 includes a shop identifier 510, a technician identifier 511, a vehicle model identifier 512, a customer name 513, a customer insurance company identifier 514, repair date(s) 515, a collision date 516, a collision time 517, a collision-related DTC data 518, a DTC set time 519, a non-collision-related DTC data 520, a DTC set time 521, repair part cost information 522, collision images 523, labor rate and time information 524, and a cost estimate 525 (e.g., a sum of the repair part cost information 522 and labor cost based on the labor rate and time information 524). The time 519 is indicative of when the first DTC was set with respect to the collision time 517. The processor 40 can receive the collision time 517 from a VDM the processor 40 requests and receives from an SRS ECU. The processor 40 can receive the DTC set time 519 from a VDM the processor 40 requests and receives from the ECU that set the first DTC.

Figure 15A:
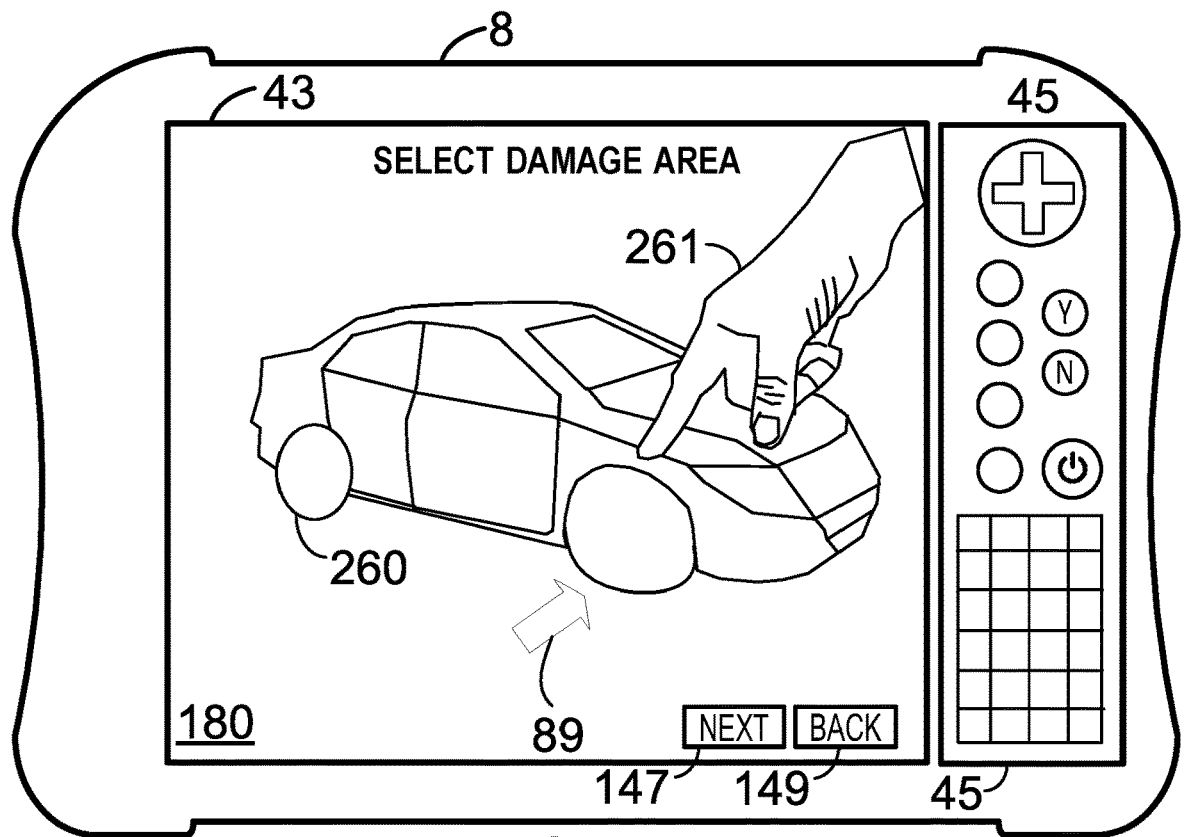
Figure 15B:
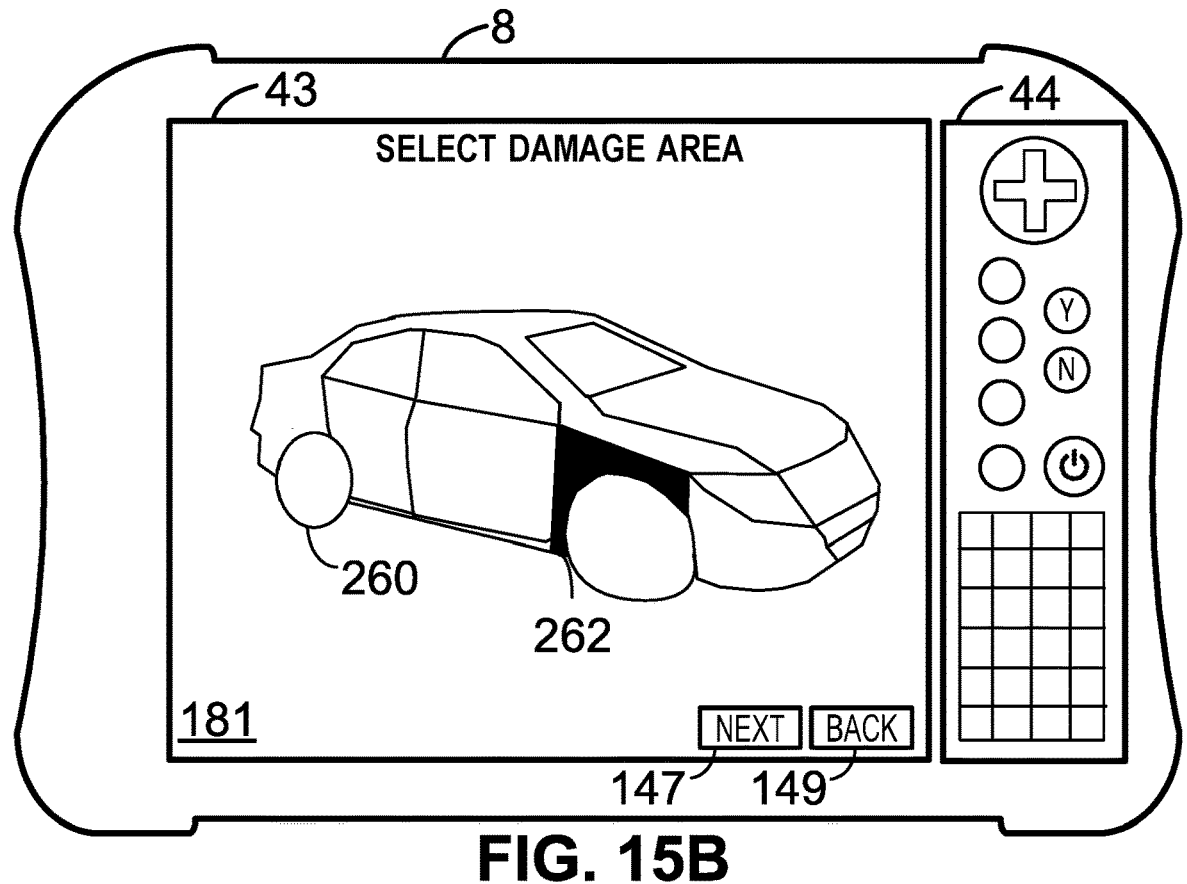
Figure 15C:
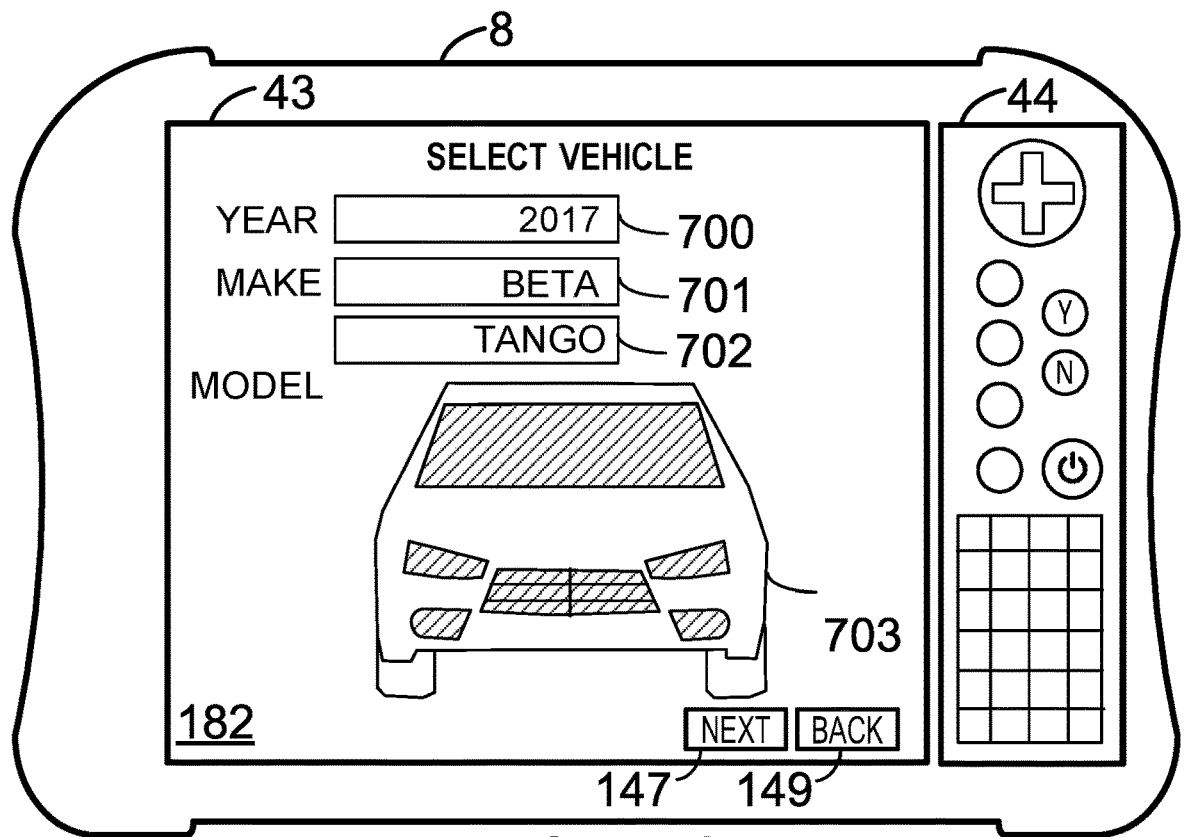
Figure 15D:
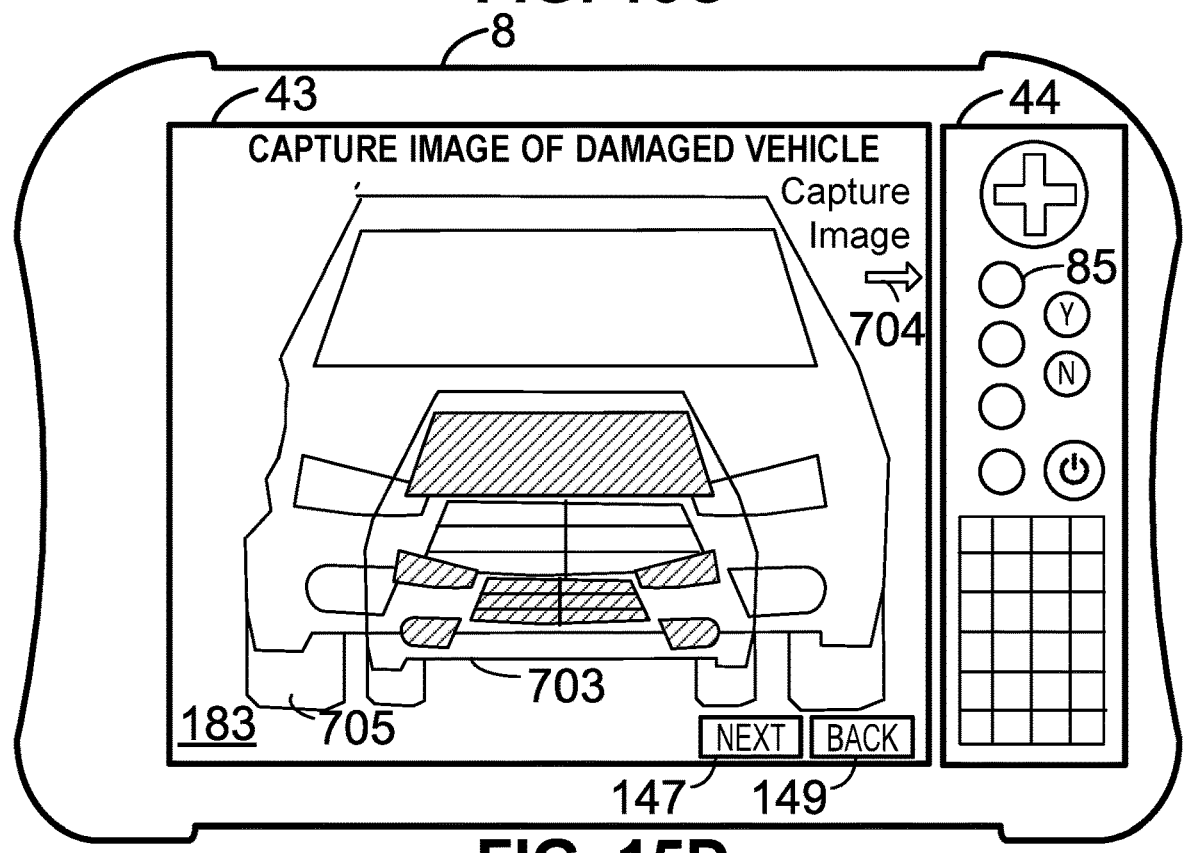
Figure 15E:
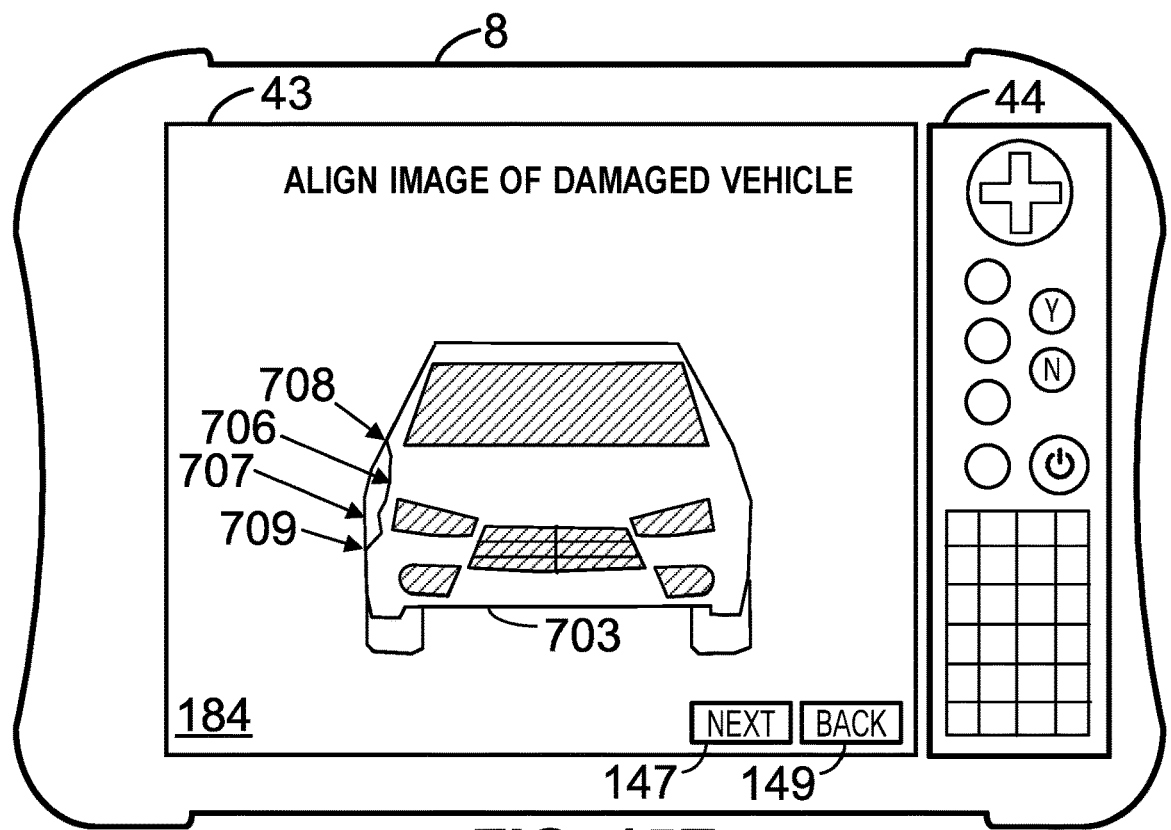
Figure 15F:
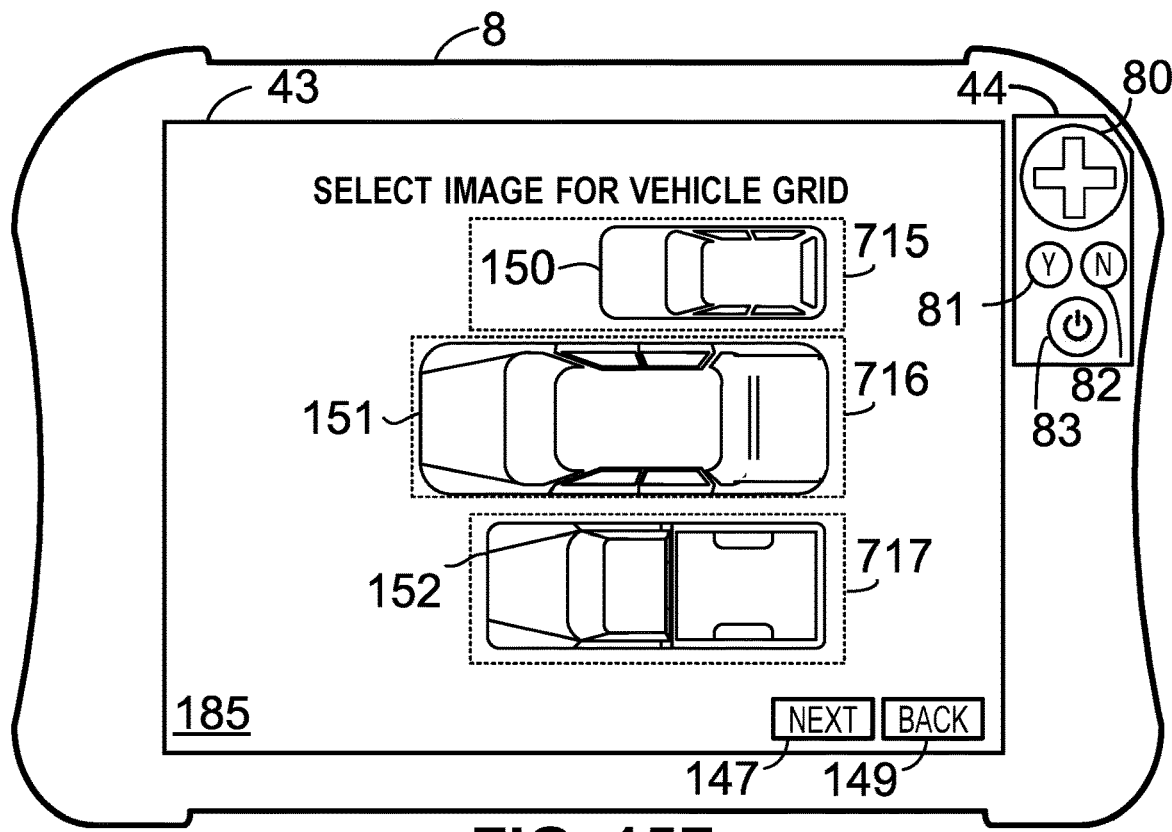
Figure 15G:
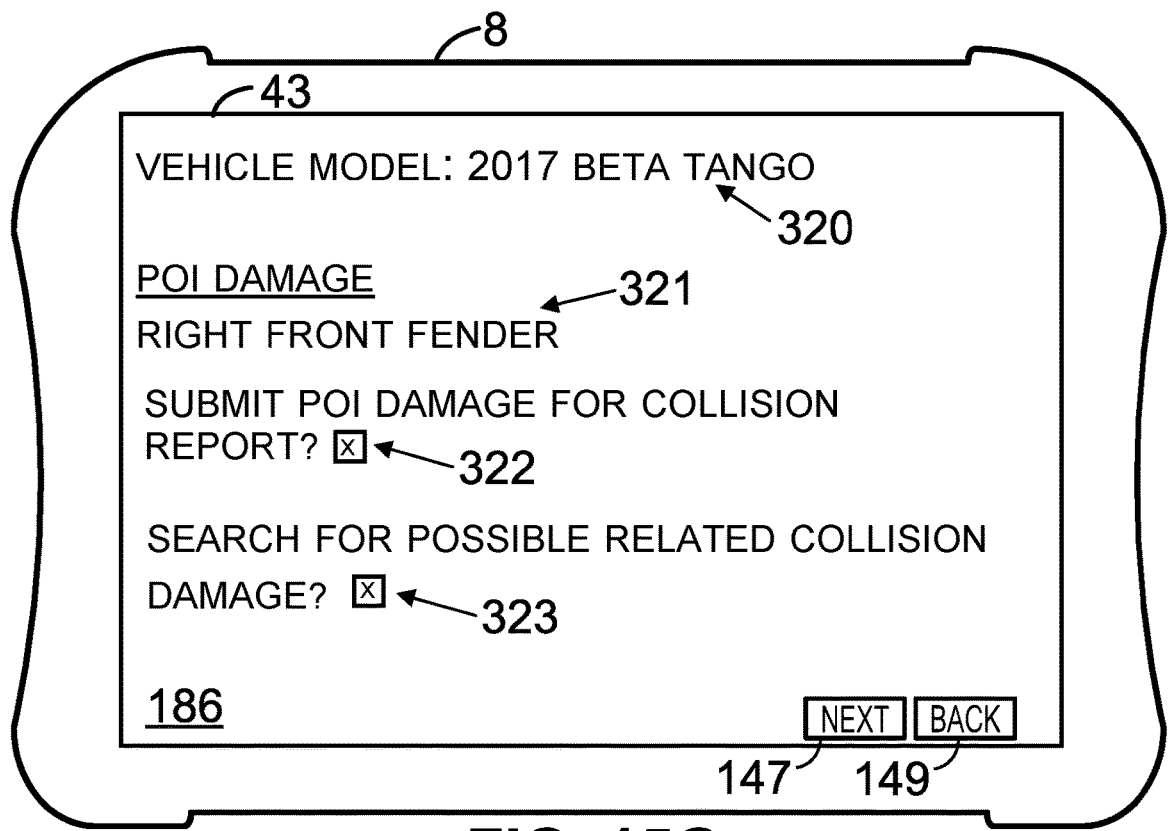
Figure 15H:
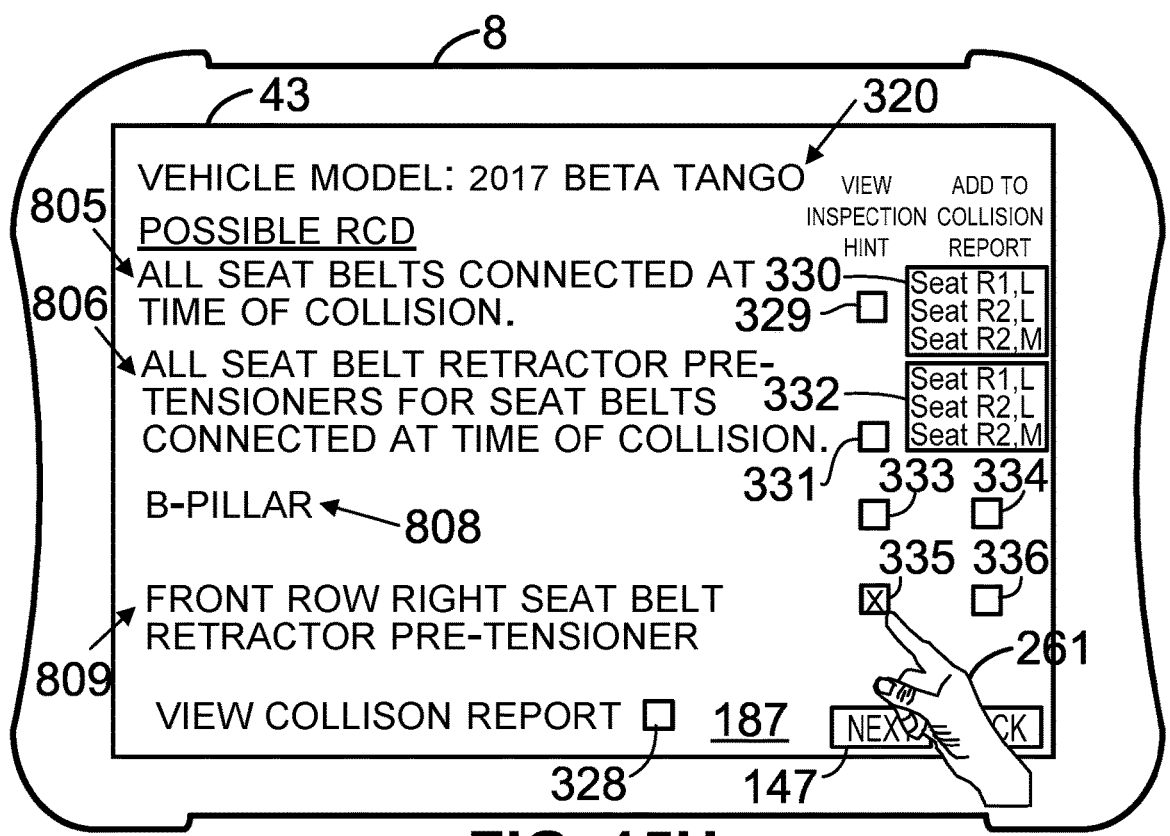
Figure 15I:
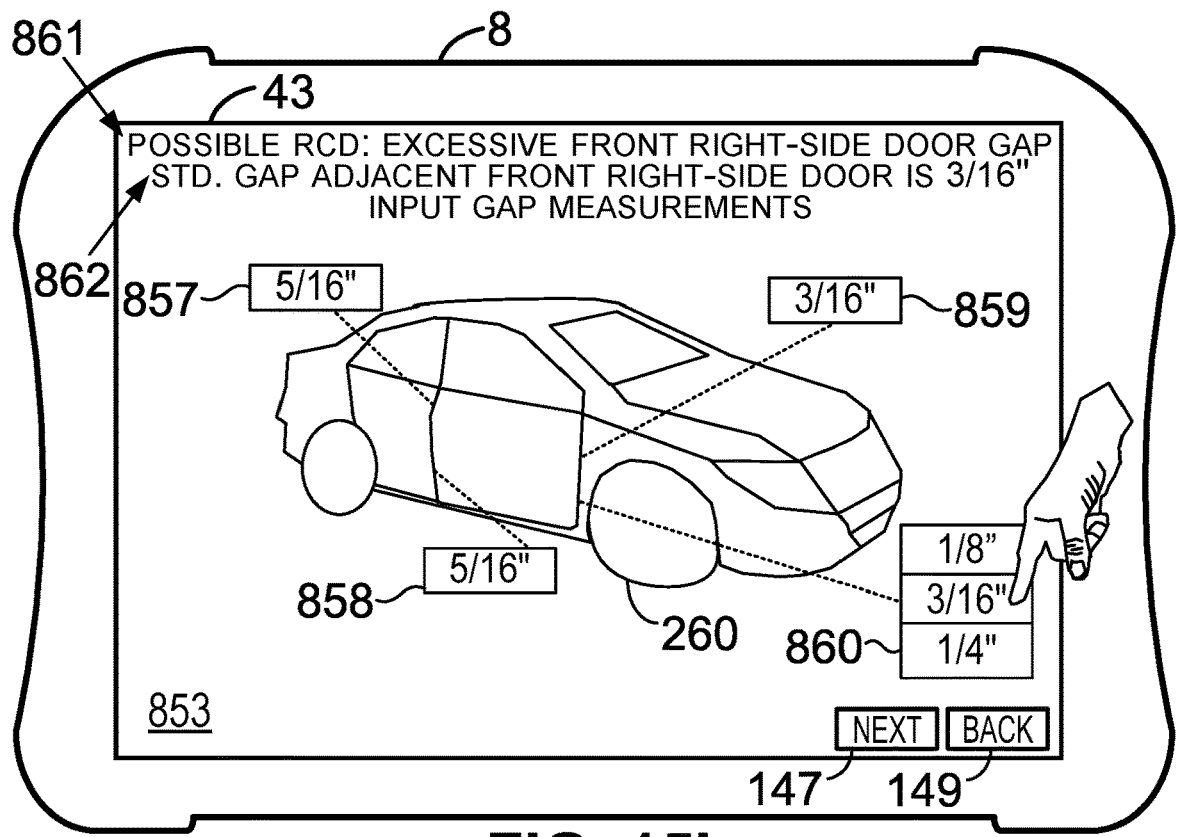
Figure 15J:
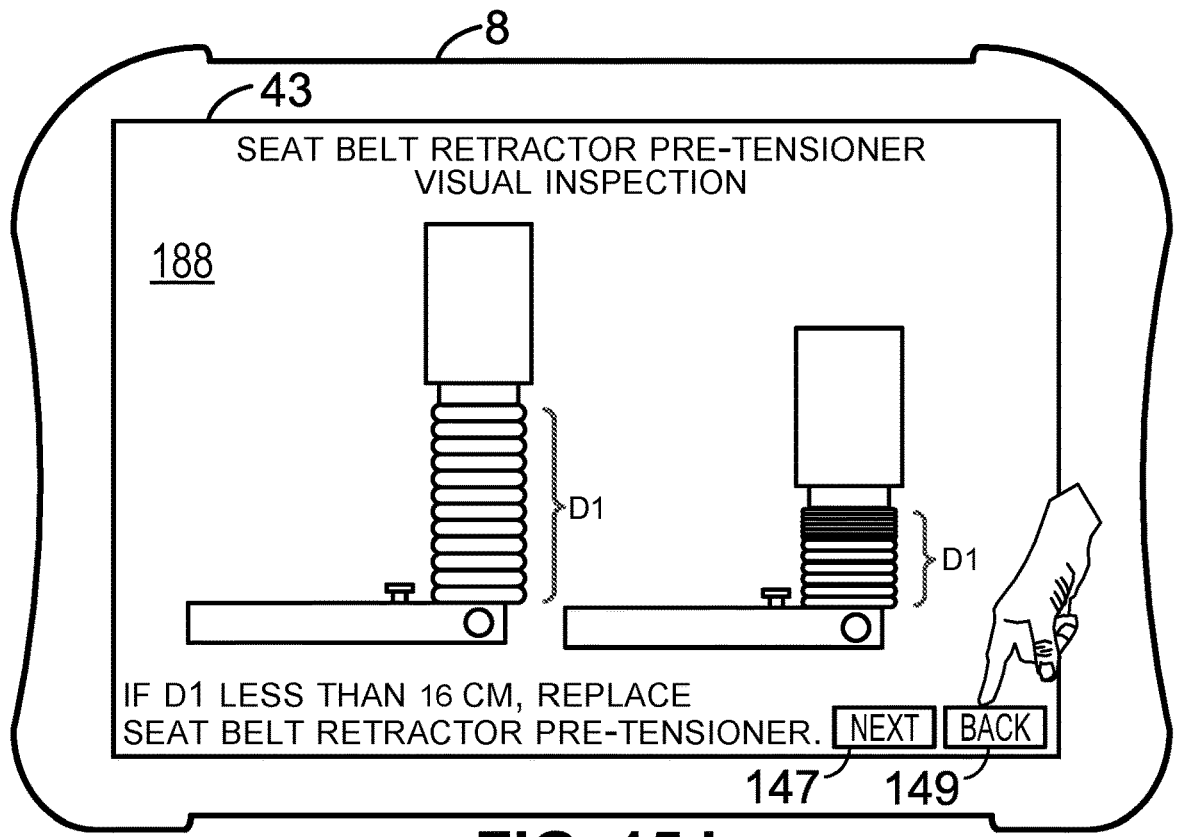
Figure 15K:
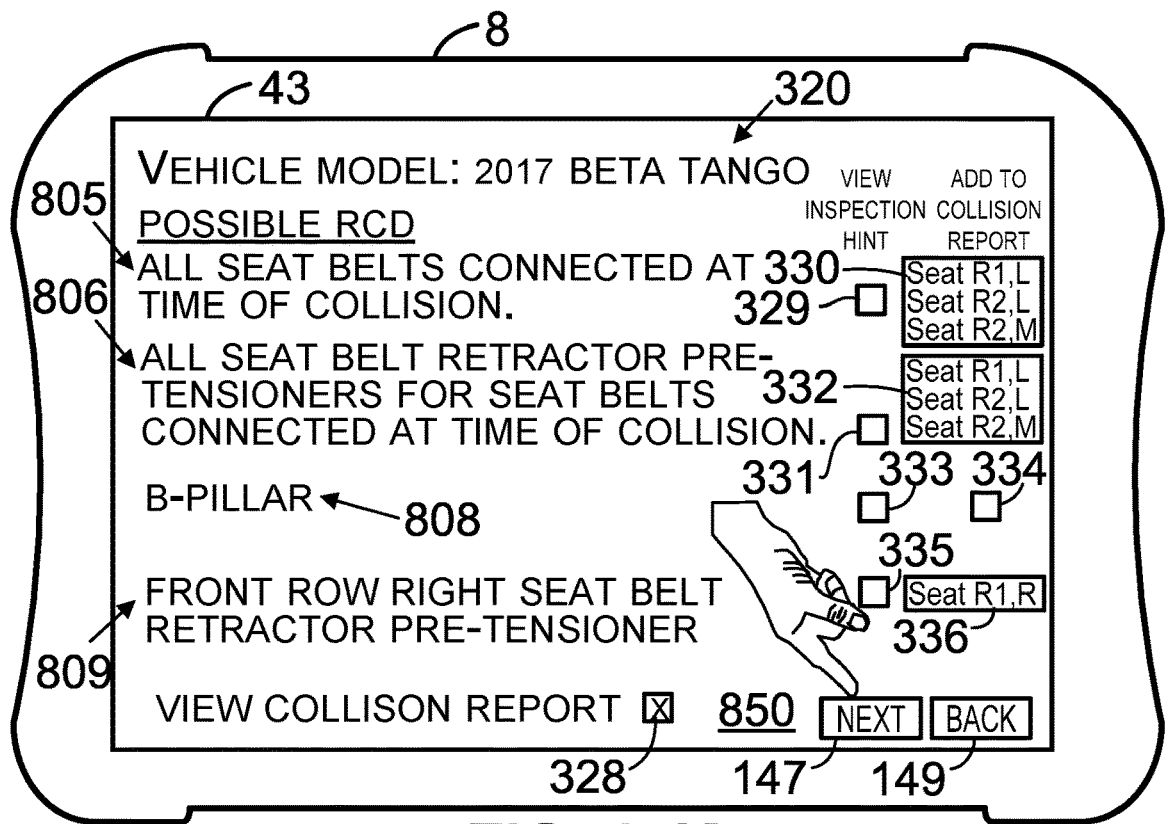

The repair part cost information 522 can include part information based on a selection made via a display screen, such as the display screen 850 shown in FIG. 15K. The processor 40, 440 can, but need not necessarily, determine a price for a vehicle component from the VRD 66, 466.

Furthermore, some portion or an entirety of the collision report 68 can be formatted according to an industry standard. As an example, some portion or an entirety of the collision report 68 can be formatted based on an industry standard defined by CIECA (Collision Industry Electronic Commerce Association), Northbrook, Ill., such as the CIECA Business Message Suite (BMS), version 5.6.0, October 2017, which is incorporated herein by reference. In particular, the collision report 68 can, but need not necessarily, include an SGML (standard generalized markup language) or XML (extensible markup language) tag and associated data defined by that CIECA BMS. As another example, the industry standard upon which the collision report or some portion of the collision report 68 is based can, but need not necessarily, include (1) the CIECA Repair Order Folder Service XML Implementation Guide, Appendix C, Business Usage FAQs, Release 2009R2, October 2009, which is incorporated herein by reference, (2) CIECA Attachment XML Service, XML Implementation Guide, Appendix C, Business Use Cases and Standard XML Implementation Examples, Release 2004R2, November 2004, which is incorporated herein by reference, (3), CIECA Scan Services XML Implementation Guide, Release 2017R2, October 2017, which is incorporated herein by reference, and/or (4) CIECA SCAN Messages, XML Implementation Guide, Appendix C, Business Usage FAQs, Release 2017R2, October 2017, which is incorporated herein by reference.

Furthermore still, some portion or an entirety of the collision report 68 can be forwarded to an NCS, such as the NCS 24. As an example, a portion of the collision report 68 including part numbers can include the part numbers formatted according to the industry standard.

VI. Example Display Screens and Keypad

Next, FIG. 6A to FIG. 15N depict example implementations of the scanner 8, the display 43, and the keypad 44. The display 43 can include a touch screen, such as a capacitive, resistive, or infrared touch screen. The capacitive touch screen can be surface capacitive or projective capacitive. The processor 40 can provide a display screen to the display 43. The display 43 can display the display screen received by the display 43. Examples of a display screen are shown in FIG. 6A to FIG. 15N. In some implementations, the scanner 8 receives a display screen from the server 9 and the display 43 displays the display screen received from the server 9 using a browser application. In other implementations, the processor 40 generates the display screen and provides the display screen to display 43.

The processor 40 can detect an input or selection entered using the touch screen. For instance, the processor 40 can detect a touch screen input such as a tap input (e.g., one finger touching the touch screen), a pinching input (e.g., two fingers touching the touch screen being brought closer to each other), a spreading input (e.g., two fingers touching the touch screen moved farther apart from each other), or a swiping input (e.g., one finger moving from one point to a second point on the touch screen). Other examples of touch screen inputs are available. The processor 40 can also detect an input or selection entered using the keypad 44.

In some implementations of the keypad 44, such as the implementations shown in FIG. 6A to FIG. 15E, the keypad 44 can include a directional keypad 80 for selecting up, down, left and right movements or selections, a yes button 81 selectable to signify a selection of yes, a no button 82 selectable to signify a selection of no, a power button 83, a multi-button keypad 84, and buttons 85, 86, 87, and 88. The multi-button keypad 84 can include a set of numeric keys, alpha-numeric keys, alphabet keys, or keys for entering some other combinations of letters, numbers, or symbols (e.g., punctuation symbols). A button, such as the button 85, 86, 87, 88, can be a reconfigurable button conditioned on a selector displayed on the display 43 in proximity to the button.

In other implementations of the keypad 44, such as the implementation of the scanner 8 and the keypad 44 shown in FIG. 15F, the keypad 44 has fewer keys as compared to the implementation of the keypad 44 shown in FIG. 6A to FIG. 15E. In FIG. 15F, the keypad 44 include the direction keypad 80, the yes button 81, the no button 82, and the power button 83. The touch screen of the display 43 can be used to input a selection or input described as being performed by selection of a button 85, 86, 87, 88 or the multi-button keypad 84. Moreover, the display 43 could be configured with portions of the touch screen to represent (a) selections of up, down, left and right movements or selections similar to those selectable using the directional keypad 80, (b) a selection of yes similar to the selection selectable using the yes button 81, or (c) a selection of no similar to the selection selectable using the no button 82. Any display screen shown in FIG. 6A to FIG. 15E can be displayed using a touch screen within the implementation of the scanner 8 shown in FIG. 15F.

Returning to FIG. 6A, this figure also depicts a display screen 90 displayed on the display 43. A cursor 89 is displayed by the display 43 in FIG. 6A and in other figures. The cursor 89 can be positioned by use of the directional keypad 80, for example. The cursor 89 can be positioned on a selector displayed on the display 43. A button on the keypad 44, such as the button 85, can be pushed while the cursor 89 is positioned on or in proximity to the selector to indicate the selector has been selected.

The display screen 90 includes the main scanner menu 109. The processor 40 can output the main scanner menu 109 in response to a variety of events, such as powering on the scanner 8 via the power button 83 or a selection to return to the main scanner menu 109 while the display 43 is displaying a different display screen. The main scanner menu 109 includes the read DTC selector 110 (shown as "READ DTC") selectable to cause the scanner 8 to transition to an operating state in which the scanner 8 operates to determine DTC set by the ECU 3 in the vehicle 1. The processor 40 can determine whether a DTC set by the ECU 3 is collision-related. The main scanner menu 109 includes a selector 111 (shown as "COLLISON ESTIMATOR") selectable to cause the scanner 8 to transition to an operating state in which the scanner 8 operates to determine data for preparing a collision estimate and/or to determine a collision estimate. The main scanner menu 109 includes a selector 112 (shown as "COLLISON PROCEDURES") selectable to cause the scanner 8 to transition to an operating mode in which the scanner 8 obtains and displays a collision procedure. The main scanner menu 109 includes a selector 113 (shown as "DAMAGE IDENTIFICATION") selectable to cause the scanner 8 to transition to an operating state in which the scanner 8 determines information regarding a damaged vehicle, such as a damaged portion at which the vehicle is damaged. The main scanner menu 109 includes the squib status selector 114 (shown as "SQUIB STATUS") selectable to cause the scanner 8 to programmatically check the status of an SIR system squib.

Figure 6B:
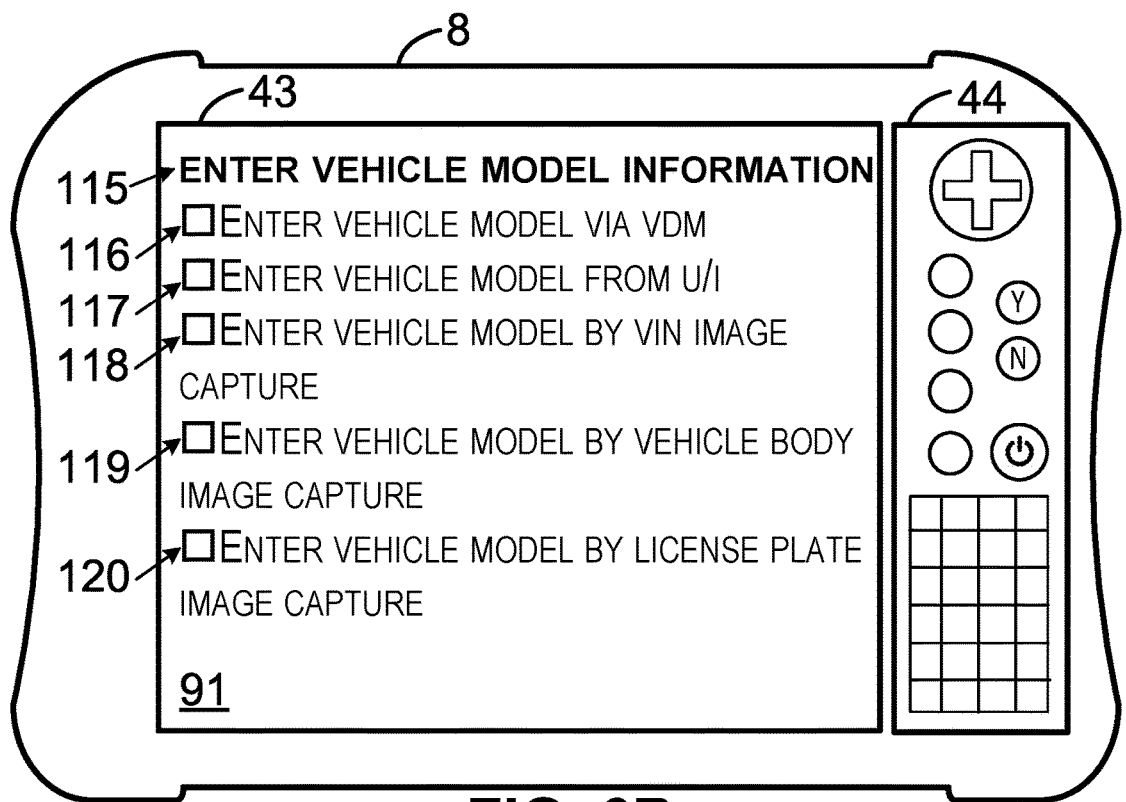

Next, FIG. 6B also depicts a display screen 91 displayed on the display 43. The display screen 91 includes an enter vehicle model information menu 115. The processor 40 can output the enter vehicle model information menu 115 in response to a variety of events, such as selection of the read DTC selector 110 or selector 111, 112, 113. As an example, the enter vehicle model information menu 115 includes a selector 116 selectable to cause the scanner 8 to transition to an operating state in which the scanner 8 determines vehicle model information regarding the vehicle 1 by transmitting and/or receiving a VDM including data indicative of the vehicle model or data from which the vehicle model can be derived. The ECU 3 can transmit a VDM including data indicative of the VIN or at least a part of the VIN associated with the vehicle 1. As another example, the enter vehicle model information menu 115 includes a selector 117 selectable to cause the scanner 8 to transition to an operating state in which the scanner 8 determines vehicle model information regarding the vehicle 1 from user interface components (e.g., the display 43 and the keypad 44) of the scanner 8. As another example, the enter vehicle model information menu 115 includes a selector 118 selectable to cause the scanner 8 to transition to an operating state in which the scanner 8 determines vehicle model information regarding the vehicle 1 via capturing an image of the vehicle's VIN. As another example, the enter vehicle model information menu 115 includes a selector 119 selectable to cause the scanner 8 to transition to an operating state in which the scanner 8 determines vehicle model information regarding the vehicle 1 by capturing an image showing at least a portion of the vehicle's body. As another example, the enter vehicle model information menu 115 includes a selector 120 selectable to cause the scanner 8 to transition to an operating state in which the scanner 8 determines vehicle model information regarding the vehicle 1 by capturing an image of the vehicle's license plate.

Next, FIG. 7A also depicts a display screen 92 displayed on the display 43. The display screen 92 shows a VIN label 125 displayed on the display 43. The display screen 92 can be displayed in response to selection of the selector 118 shown in FIG. 6B. The capture device 45 can provide the processor 40 and/or the display 43 the data representing light sensed by an image sensor of the capture device 45. The button 85 can be configured as a shutter button for the capture device 45 when the display screen 92 is displayed. The display screen 92 is shown displaying a reconfigurable button label 126 indicating that a current configuration of the button 85. Pressing the button 85 can cause the processor 40 to store an image of the VIN label 125 within the captured data 64. The processor 40 can be configured to determine the VIN represented by the VIN label 125, for example, by performing optical character recognition of the characters shown on the VIN label 125 or by decoding the bar code shown on the VIN label 125. The determined VIN can be stored as the vehicle model identifier 61.

Next, FIG. 7B also depicts a display screen 93 displayed on the display 43. The display screen 93 shows a vehicle and reconfigurable button labels 128, 129, 130, and 131 indicating current configurations of the buttons 85, 86, 87, and 88. The buttons 85, 86, 87, and 88 can be configured as shutter buttons for the capture device 45 when the display screen 93 is displayed. The display screen 93 can be displayed in response to selection of the selector 119 shown in FIG. 6B. Pressing the button 85 can cause the processor 40 to store (within the captured data 64 for identifying the vehicle model) an image of the vehicle 127 displayed on the display 43 and data indicating that stored image shows a front of the vehicle 1. Pressing the button 86 can cause the processor 40 to store (within the captured data 64 for identifying the vehicle model) an image of the vehicle 127 displayed on the display 43 and data indicating that stored image shows a rear of the vehicle 1. Pressing the button 87 can cause the processor 40 to store (within the captured data 64 for identifying the vehicle model) an image of the vehicle 127 displayed on the display 43 and data indicating that stored image shows a side (e.g., right side or left side) of the vehicle 1. Pressing the button 88 can cause the processor 40 to store (within the captured data 64 for identifying the vehicle model) an image of the vehicle 127 displayed on the display 43 and data indicating that stored image shows an ICE of the vehicle 1.

Next, FIG. 8A also depicts a display screen 94 displayed on the display 43. The display screen 94 shows a license plate 132 displayed on the display 43. The display screen 94 can be displayed in response to selection of the selector 120 shown in FIG. 6B. The capture device 45 can provide the processor 40 and/or the display 43 the data representing light sensed by an image sensor of the capture device 45. The button 85 can be configured as a shutter button for the capture device 45 when the display screen 94 is displayed. The display screen 94 is shown displaying a reconfigurable button label 126 indicating that a current configuration of the button 85. Pressing the button 85 can cause the processor 40 to store an image of the license plate 132 within the captured data 64. The processor 40 can be configured to determine a vehicle model associated with the license plate 132, for example, by performing optical character recognition of the characters shown on the license plate 132 and performing a query of a database of vehicle models and license plate information. The vehicle model determined from the license plate 132 can be stored as the vehicle model identifier 61.

Figure 8B:
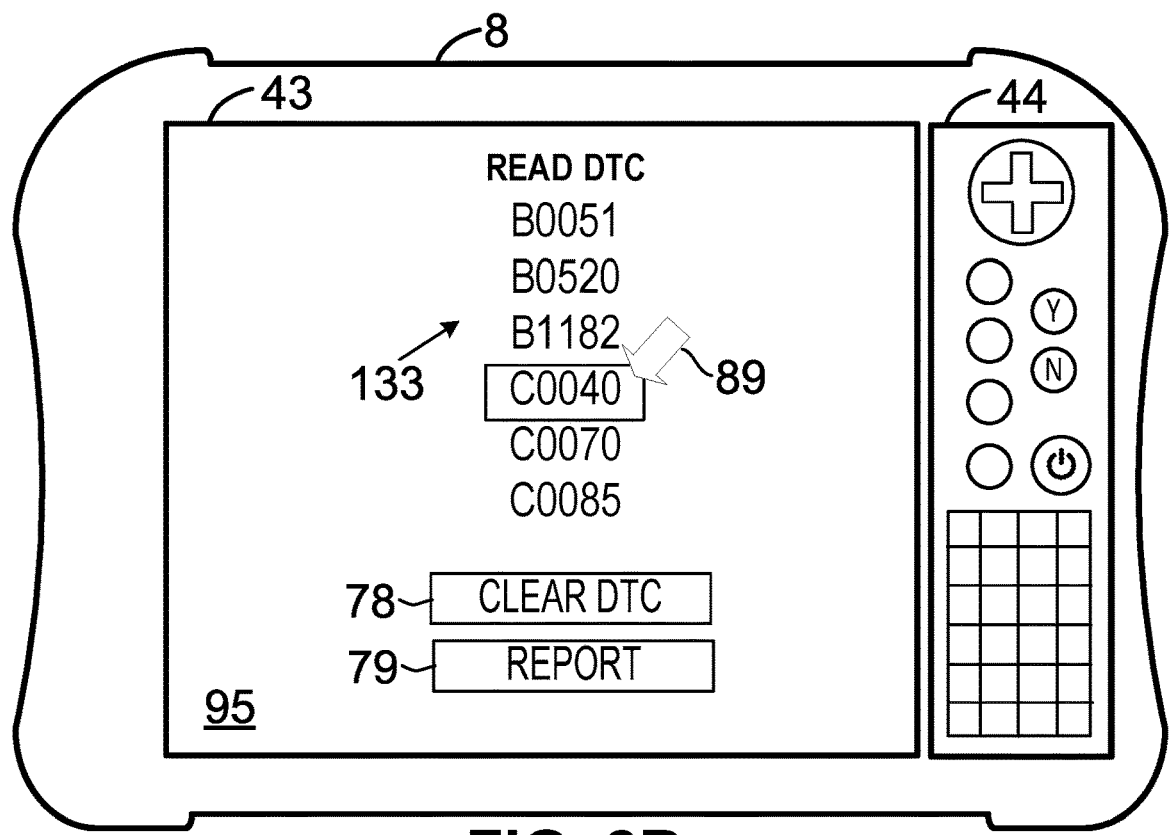

Next, FIG. 8B also depicts a display screen 95 displayed on the display 43. The display screen 95 includes a list of DTC 133 set in the vehicle 1. The list of DTC 133 can indicate all DTC currently set within the vehicle 1. At a time the list of DTC 133 is displayed, the processor 40 may not have determined whether or not each DTC in the list of DTC 133 is collision-related. The display screen 95 can be displayed after the processor 40 determines the vehicle model associated with the vehicle 1. The processor 40 can refer to the VRD 66 to determine a VDM protocol for communicating with the ECU 3 and an identifier of the ECU 3. The processor 40 can transmit a VDM or cause the VCT 42 to transmit a VDM to request DTC data from the ECU 3. The processor 40 and/or the VCT 42 can receive a VDM including DTC data from the ECU 3.

The DTC within the list of DTC 133 include a letter prefix, such as B for body system DTC and C for chassis system DTC. Other letter prefixes that could be used include P for powertrain DTC and U for network DTC. The DTC within the list of DTC 133 include four numbers after the letter prefix. In other examples, a DTC may not include a letter prefix, In particular, DTC B0051 represents an air bag deployment commanded DTC, DTC B05020 represents a rear discharge temperature sensor malfunction DTC, the DTC C0040 represents a right front wheel speed circuit malfunction DTC, the DTC C0070 represents a right front ABS solenoid #1 circuit malfunction DTC, the B1182 DTC represents a TPMS right front malfunction, and the DTC C0085 represents a left rear ABS solenoid #2 circuit malfunction DTC. In other examples, a DTC may include a different number of numbers to designate a DTC. In still other examples, a DTC can be indicated by some other manner. The list of DTC 133 includes a textual description of each of the DTC included in the list of DTC 133.

The display screen 95 includes a selector 78 selectable to cause the processor 40 and/or the VCT 42 to transmit a VDM to the ECU 3 requesting the ECU 3 to clear the DTC (e.g., erase the DTC within the ECU 3). If the list of DTC 133 includes DTC set by more than one ECU, selecting the selector 78 can cause the processor 40 and/or the VCT 42 to transmit a VDM to each ECU within the vehicle 1 requesting that ECU to clear its DTC or to transmit a VDM to each ECU within the vehicle that is represented in the list 133 as having a DTC set.

The display screen 95 includes a selector 79 selectable to cause the processor 40 to add the DTC determined for the list of DTC 133 to the collision report 68 regarding the vehicle 1. If the collision report 68 has not been generated yet, the processor 40 generates the collision report 68 including the DTC determined for the list of DTC 133.

Next, FIG. 9A also depicts a display screen 96 displayed on the display 43. The display screen 96 shows vehicle images 150, 151, and 152 selectable for displaying in one or more vehicle grids to select a damaged portion indicative of a spatial location on a vehicle damaged by a collision. The vehicle images 150, 151, and 152 are selectable by pushing button 85, 86, 88, respectively. The vehicle images 150, 151, and 152 can be stored in the image 65. The vehicle images 150, 151, and 152 can be generic vehicle images representing a particular body style, such as a two door car, a four door car, a two door pickup truck, a four door pickup truck, or a passenger van. As an example, the vehicle image 150 can be displayed to represent two door cars, the vehicle image 151 can be displayed to represent four door cars, and the vehicle image 152 can be displayed to represent two door pickup trucks. The vehicle images 150, 151, 152 can include rotatable images such that other views of the vehicle can be displayed, such as a front view, a rear view, a left side view and a right side view.

The two door vehicle shown in the vehicle image 150 most closely resembles the vehicle 1. Accordingly, the processor 40 can output a vehicle grid including the vehicle image 150 in response to determining the button 85 is pressed while the display screen 96 is displayed. The vehicle image displayed in the grid can be a top view of the generic vehicle or another view of the generic vehicle. Other examples of a generic vehicle that can be represented by a vehicle image for displaying in a grid are available. Additionally or alternatively, the vehicle images 150, 151, 152 can be images of particular vehicle models.

Figure 9B:
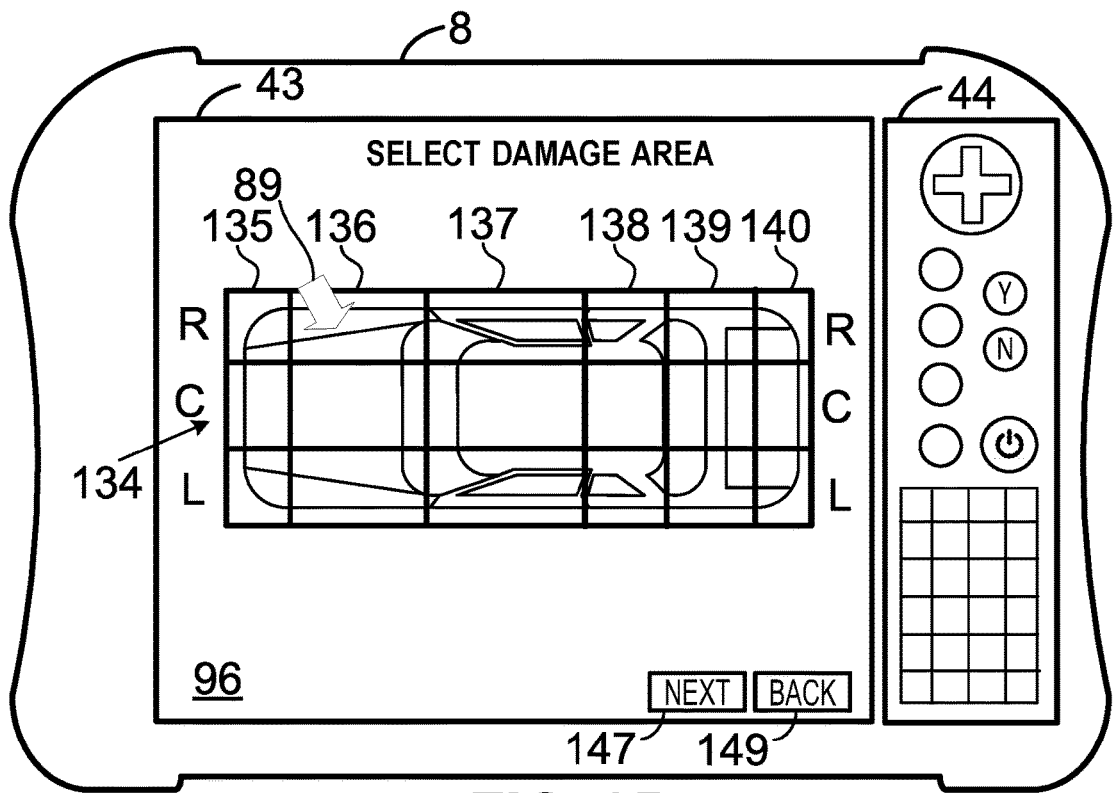

Next, FIG. 9B also depicts a display screen 97 displayed on the display 43. The display screen 97 includes a vehicle grid 134 showing a vehicle. The processor 40 can output the display screen 97 to allow a user to select a portion of a vehicle damaged by a collision. In one respect, the vehicle grid 134 shows a generic vehicle image that represents multiple vehicle models including and similar to the vehicle model associated with the vehicle 1. The generic vehicle image can, for example, include an image of a 2-door car (see, the vehicle image 150 in FIG. 9A), a four-door car (see, the vehicle image 151 in FIG. 9A), or a pickup truck (see, the vehicle image 152 in FIG. 9A). In another respect, the vehicle grid 134 shows an image of a vehicle of the vehicle model associated with the vehicle 1. A vehicle image shown in the vehicle grid 134 can, for example, include a wireframe image or a photographic image. The vehicle image shown in the vehicle grid 134 can include a two-dimensional image or a three-dimensional image.

Any example display screen shown in the drawings can, but need not necessarily, include a next selector 147 to advance to a next display screen and/or a back selector 149 to return to a prior display screen. Selection of the next selector 147 can include the processor 40, 440 processing any inputs made via another selector from that display screen prior to selection of the next selector 147. For clarity of the drawings, the next selector 147 and the back selector 149 are not shown in all of the drawings. The next selector 147 shown on the display screen 97 can be configured to indicate that selecting a damaged portion is complete.

The vehicle grid 134 includes multiple vehicle grid locations. Table 2 shows example names of damaged portions associated with example vehicle grid locations shown in FIG. 9B. The cursor 89 can be positioned on a vehicle grid location, such as the vehicle grid location 136, and a button, such as the Yes button 81 can be pressed to select the vehicle grid location to identify a portion of the vehicle damaged by a collision. If the display 43 includes a touch screen, the processor 40 can determine the portion of the vehicle damaged by a collision by determining the vehicle grid location (associated with the damaged portion) displayed on the display 43 is touched. The keypad 44 can include a button (e.g., the directional keypad 80) to rotate the vehicle grid 134 along multiple axes. In FIG. 9B, the vehicle grid 134 shows a plan view of the vehicle. Rotation of the vehicle grid 134 can result in the vehicle grid showing a different view of the vehicle, such as a front view, back view, right side view left side view, or underside view.

TABLE 2

| Vehicle Grid Location | Vehicle portion | Vehicle Component | DTC | Symptom | Image |
|---|---|---|---|---|---|
| 135R | Right Front | Null | Null | Null | VM1_135R.jpg |
| 136R | Right Front Quarter | RF WSS<br>RF TMPS | C1164<br>C1264 | ABS RF inop.<br>TPMS RF inop. | VM1_136R.jpg |
| 137R | Right A to B Pillar | RF window motor | B0211 | RF window inop. | VM1_137R.jpg |
| 138R | Right B to C Pillar | RR window motor | B0212 | RR window inop. | VM1_139R.jpg |
| 139R | Right Rear Quarter | RR WSS<br>RR TMPS | C1165<br>C1265 | ABS RR inop.<br>TPMS RR inop. | VM1_135R.jpg |
| 140R | Right Rear | Rt. tail light | Null | Rt. tail light inop. | VM1_140R.jpg |
| 135C | Center Front | SIR sensor #1 | C0333 | Null | VM1_135C.jpg |
| 136C | Center Front Quarter | Radiator, cooling fan, Fuel injectors # 1-6, spark plugs # 1-6, intake manifold, electric starter flywheel, coil pack, | P0118<br>P0201<br>P0202<br>P0203<br>P0204<br>P0205<br>P0206 | Leaking coolant, engine overheating, Engine misfire cylinders # 1-6, engine does not start | VM1_136C.jpg |
| 137C | Center A to B Pillar | Null | Null | Null | VM1_137C.jpg |
| 138C | Center B to C Pillar | Null | Null | Null | VM1_139C.jpg |
| 139C | Center Rear Quarter | CHMSL | Null | CHMSL inop. | VM1_135C.jpg |
| 140C | Center Rear | License plate lights | Null | License plate lights inop. | VM1_140C.jpg |
| 135L | Left Rear | Lt. tail light | Null | Lt. tail light inop. | VM1_135L.jpg |
| 136L | Left Rear Quarter | LR WSS<br>LR TMPS | C1166<br>C1266 | ABS LR inop.<br>TPMS LR inop. | VM1_136L.jpg |
| 137L | Left B to C Pillar | LF window motor | B0213 | LF window inop. | VM1_137L.jpg |
| 138L | Left A to B Pillar | LR window motor | B0214 | LR window inop. | VM1_139L.jpg |
| 139L | Left Front Quarter | LF WSS<br>LF TMPS | C1167<br>C1267 | ABS LF inop.<br>TPMS LF inop. | VM1_135L.jpg |
| 140L | Left Front | Null | Null | Null | VM1_140L.jpg |

In at least some implementations, a vehicle grid displayed on the display 43 can show one or more vehicle grid locations as being selected prior to a user selecting a vehicle grid location (i.e., pre-selected). As an example, the processor 40 can determine that DTC C1165 and DTC P0118 are set in the vehicle 1. Advantageously, by referring to vehicle reference data, such as vehicle reference data shown in FIG. 2, the processor 40 can determine that vehicle grid location 139R is associated with DTC C1165 and the vehicle grid location 136C is associated with DTC P0118 and responsively show vehicle grid locations 136C and 139R as being selected. A user can confirm whether or not vehicle damage exists at the selected vehicle grid locations. For example, the user can enter a selection indicating that the portion of the vehicle shown in the vehicle grid location 136C is not damaged. The processor 40 can use such selection to classify DTC P0118 as not being collision related. As another example, the user can enter a selection indicating that the portion of the vehicle shown in the vehicle grid location 139R is damaged. The processor 40 can use such selection to classify DTC C1165 as being collision related.

Figure 10A:
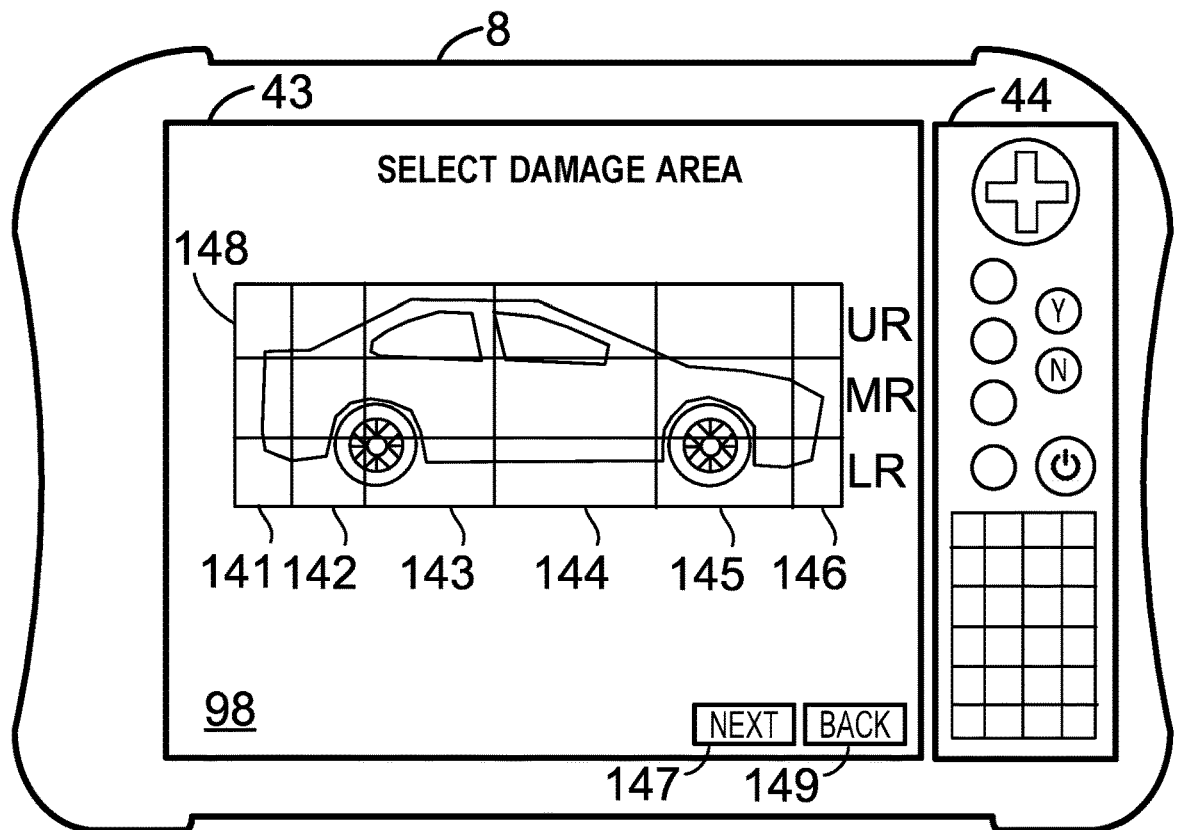

Next, FIG. 10A also depicts a display screen 98 displayed on the display 43. The display screen 98 shows a vehicle grid 148. The vehicle grid 148 shows a right side of the vehicle 1 and additional grid locations. Table 3 shows example damaged portion names associated with example vehicle grid locations shown in FIG. 10A. A vehicle grid positon of the vehicle grid 148 can be selected using the display 43 and/or the keypad 44. Some grid locations, such as the grid location 146 UR, may not include any portion of the vehicle image. The other views of a vehicle, such as the front view, the back view, the left side view, and the underside view can also be shown on the display 43 within a grid.

TABLE 3

| Vehicle Grid Location | Vehicle portion |
|---|---|
| 141 UR | Upper Right Front |
| 141 MR | Middle Right Front |
| 141 LR | Lower Right Front |
| 142 UR | Upper Right Front Quarter |
| 142 MR | Middle Right Front Quarter |
| 142 LR | Lower Right Front Quarter |
| 143 UR | Upper Right A to B Pillar |
| 143 MR | Middle Right A to B Pillar |
| 143 LR | Lower Right A to B Pillar |
| 144 UR | Upper Right B to C Pillar |
| 144 MR | Middle Right B to C Pillar |
| 144 LR | Lower Right B to C Pillar |
| 145 UR | Upper Right Rear Quarter |
| 145 MR | Middle Right Rear Quarter |
| 145 LR | Lower Right Rear Quarter |
| 146 UR | Upper Right Rear |
| 146 MR | Middle Right Rear |
| 146 LR | Lower Right Rear |

As another example, each vehicle grid location can be associated with a separate body panel of the vehicle 1. For a four door automobile, the body panels can include a hood (sometime referred to as a bonnet), a left front wing, a right front wing, a left front door, a right front door, a left rear door, a right rear door, a left back wing, a right, and a right back wing, and a tailgate. For a two door automobile, the body panels can include a hood, a left front wing, a right front wing, a left door, a right door, a left back wing, a right, and a right back wing, and a tailgate.

Figure 10B:
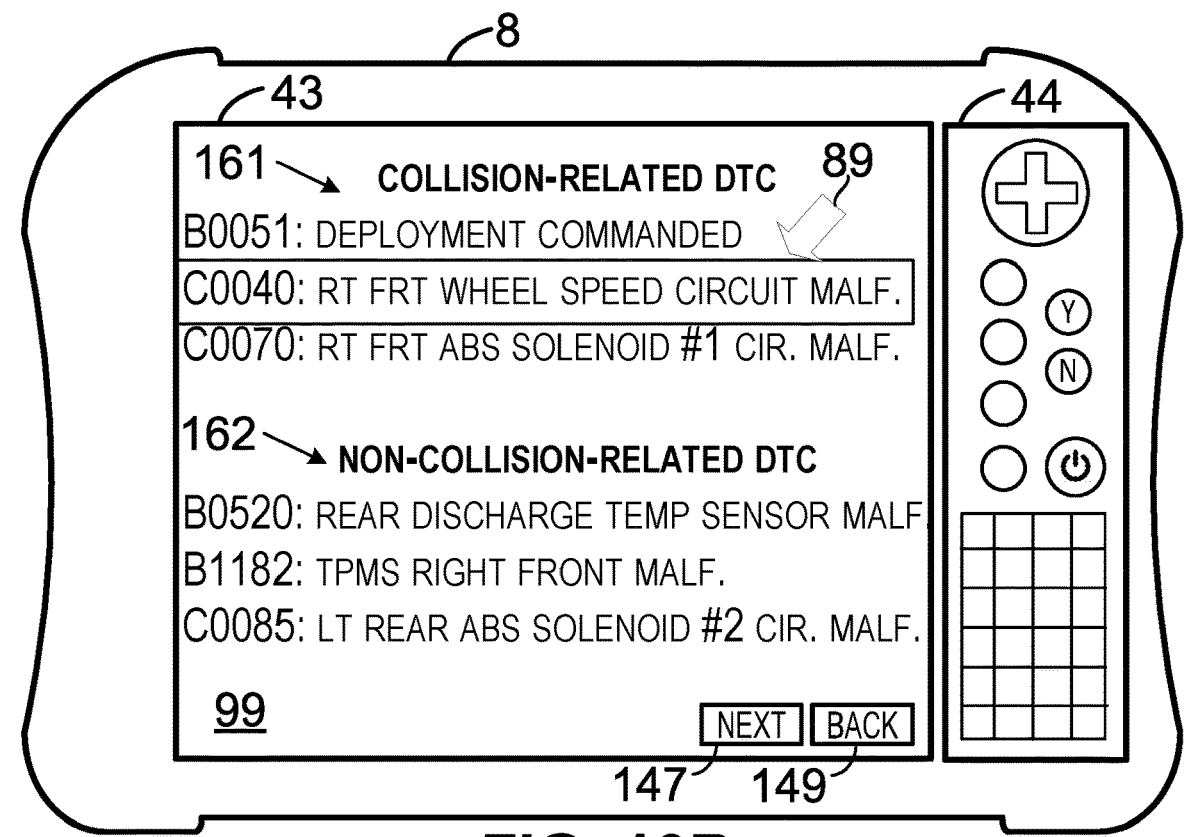

Next, FIG. 10B also depicts a display screen 99 displayed on the display 43. The display screen 99 shows a list of collision-related DTC 161 and a list of non-collision-related DTC 162. Those lists can be displayed in response to the processor 40 determining the selector 79 was selected. The DTC shown in the list of collision-related DTC 161 and the list of non-collision-related DTC 162 can be selected individually or as a combination of two or more DTC to cause the scanner 8 to display further details regarding the selected DTC(s). FIG. 12A shows a display screen 102 that displays further details regarding the DTC C0040.

Next, FIG. 11A also depicts a display screen 100 displayed on the display 43. The display screen 100 shows a vehicle identification menu 169. The processor 40 can output the vehicle identification menu 169 in response to determining the selector 117 (shown in FIG. 6B) was selected. The vehicle identification menu 169 can provide sub-menus from which a variety of vehicle model attributes are selectable. FIG. 11A shows a sub-menu 170 for selecting a vehicle model year attribute and the vehicle model year attribute 171 indicative of an example model year "2017" being selected. FIG. 11A shows a sub-menu 172 for selecting a vehicle make attribute and the vehicle make attribute 173 indicative of an example vehicle make "Beta" being selected. The content of the sub-menu 172 can be conditioned on the vehicle model year attribute selected from the sub-menu 170. FIG. 11A shows a sub-menu 174 for selecting a vehicle model attribute and the vehicle model attribute 175 indicative of an example vehicle model "Tango" being selected. The content of the sub-menu 174 can be conditioned on the vehicle make attribute selected from the sub-menu 172 and on the vehicle model year attribute selected from the sub-menu 170. FIG. 11A shows a sub-menu 176 for selecting an ICE attribute and the ICE attribute 177 indicative of an example ICE "5.7 L" being selected. The content of the sub-menu 176 can be conditioned on the vehicle model selected from the sub-menu 174, the vehicle make attribute selected from the sub-menu 172, and on the vehicle model year attribute selected from the sub-menu 170. The cursor 89 can be used select options from the vehicle identification menu 169 and the sub-menus 170, 172, 174, and 176. The vehicle identification menu 169 can include sub-menus for selecting other vehicle model attributes. FIG. 11A shows a display segment 178 displaying the vehicle model identifier 179 entered manually. The vehicle model identifier 179 in the display segment 178 can appear as a result of selecting vehicle model attributes from the sub-menus 170, 172, 174, and 176 or in response to pushing a sequence of keys on the multi-button keypad 84. The display segment 178 can display a vehicle model attribute, such as the vehicle year, prior to receiving all vehicle model attributes that make up the vehicle model identifier 179.

Next, FIG. 11B also depicts a display screen 101 displayed on the display 43. The display screen 101 includes a main scanner menu 189. The processor 40 can output the main scanner menu 189 in response to a variety of events, such as powering on the scanner 8 via the power button 83 or a selection to return to the main scanner menu 189 while the display 43 is displaying a different display screen. The main scanner menu 189, as well as the main scanner menu 109, can be displayed by the display 43 to provide a relatively simple display screen for a vehicle body repair person.

As an example, the main scanner menu 189 includes the read DTC selector 190 (shown as "DTC") selectable to cause the processor 40 to transmit a VDM to request DTC from an ECU in the vehicle 1. The processor 40 can transmit a VDM to request DTC from each ECU capable of setting DTC within the vehicle 1. The processor 40 can determine DTC set in the vehicle 1 from each VDM from the vehicle 1 reporting any DTC set in the ECU that sent the VDM. After determining the DTC set in the vehicle 1, the processor 40 can cause the display 43 to display a list of the DTC, such as the list of DTC 133 (shown in FIG. 8B).

As still yet another example, the main scanner menu 189 includes a selector 191 (shown as "DAMAGE") selectable to cause the scanner 8 to transition to an operating state in which the scanner 8 operates to determine information regarding a damaged vehicle, such as a damaged portion at which the vehicle is damaged. The processor 40 can respond to determining the selector 191 was selected in the same way in which the processor 40 responds to determining the selector 113 (shown in FIG. 6A) was selected.

As another example, the main scanner menu 189 includes a selector 192 (shown as "ADJUSTMENTS") selectable to cause the display 43 to display a vehicle adjustment menu, such as the vehicle adjustment menu 240 shown in FIG. 13B.

Next, FIG. 12A also depicts a display screen 102 displayed on the display 43. The display screen 102 includes DTC information 195 pertaining to the DTC C0040 selected from the list of DTC 133. At least some of the DTC information 195 shown in the display screen is selectable. For example, a reset procedure selector 197 for a reset procedure "R2" is selectable. In response to determining the reset procedure selector 197 is selected, the processor 40 can cause the display screen 103 shown in FIG. 12B to be displayed. Other information selectors displayed as part of information pertaining to a DTC that are selectable can include one or more of the following: an initialization selector, a program selector, or a calibration selection. The display screen 102 includes an adjustment selection 196 selectable to cause the processor 40 to cause the display 43 to display the display screen 105 (shown in FIG. 13B). The display screen 102 includes an order part selector 198 selectable to cause the processor 40 to cause the display 43 to display the display screen 106 (shown in FIG. 14A). The display screen 102 includes an order tool selector 199 selectable to cause the processor 40 to cause the display 43 to display the display screen 107 (shown in FIG. 14B).

Figure 12B:
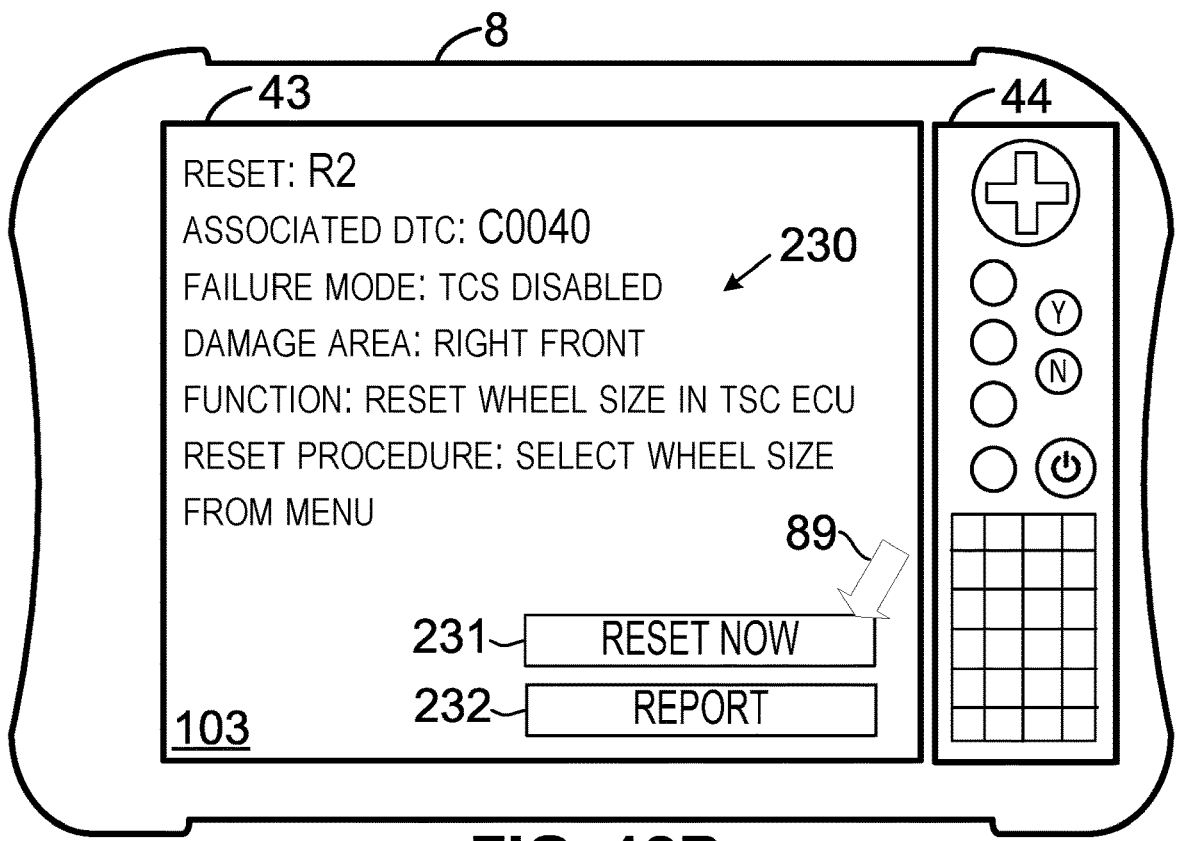

Next, FIG. 12B also depicts a display screen 103 displayed on the display 43. The display screen 103 includes information 230 pertaining to the reset "R2" selected from the DTC information 195 shown in FIG. 12A. The display screen 103 includes a reset selector 231 selectable to cause the processor 40 and/or the VCT 42 to transmit one or more VDM to the ECU 3 in the vehicle 1 to perform the reset "R2". The display screen 103 includes a report selector 232 selectable to cause the processor 40 to transmit add to the collision report 68 data regarding performance of the reset "R2." The data regarding performance of the reset "R2" can, for example, include data indicating the reset "R2" was performed to the vehicle 1, and an outcome of performing the reset "R2," such as reset performed successfully, reset preformed partially, reset performed unsuccessfully.

Figure 13A:
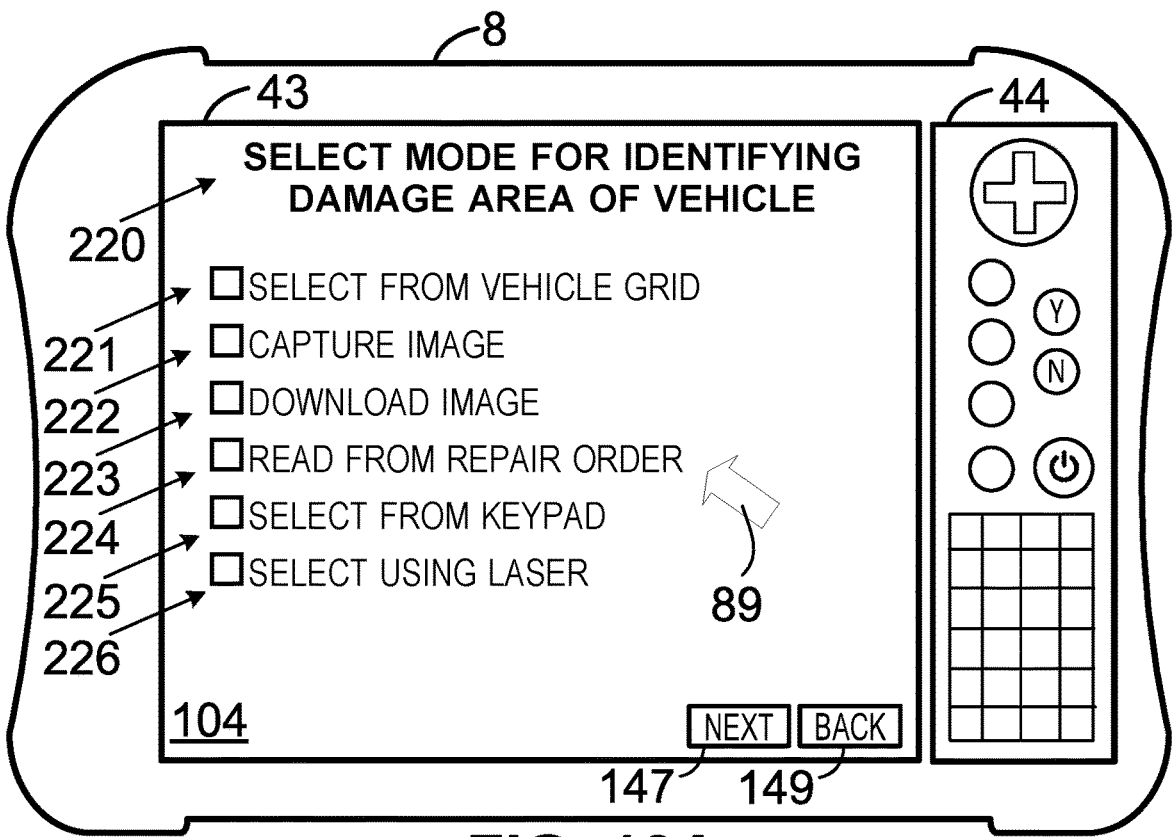
Figure 13B:
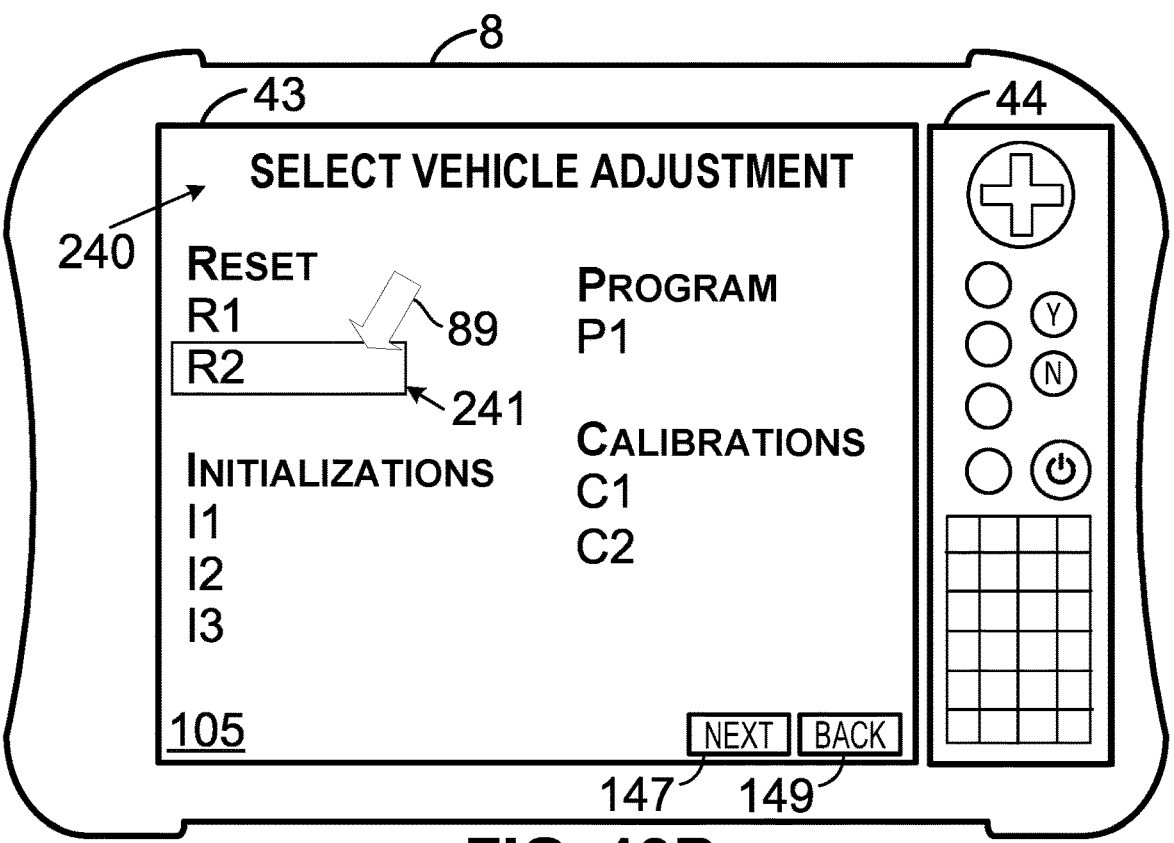
Figure 14A:
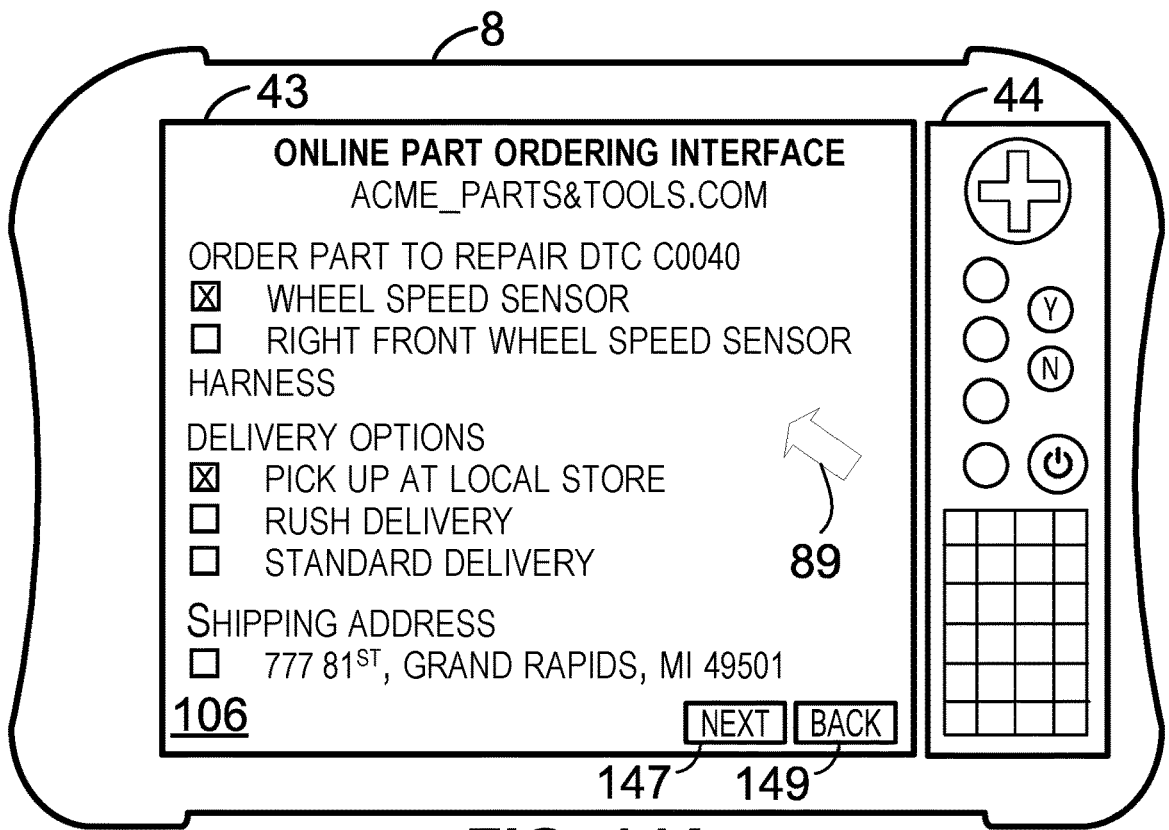
Figure 14B:
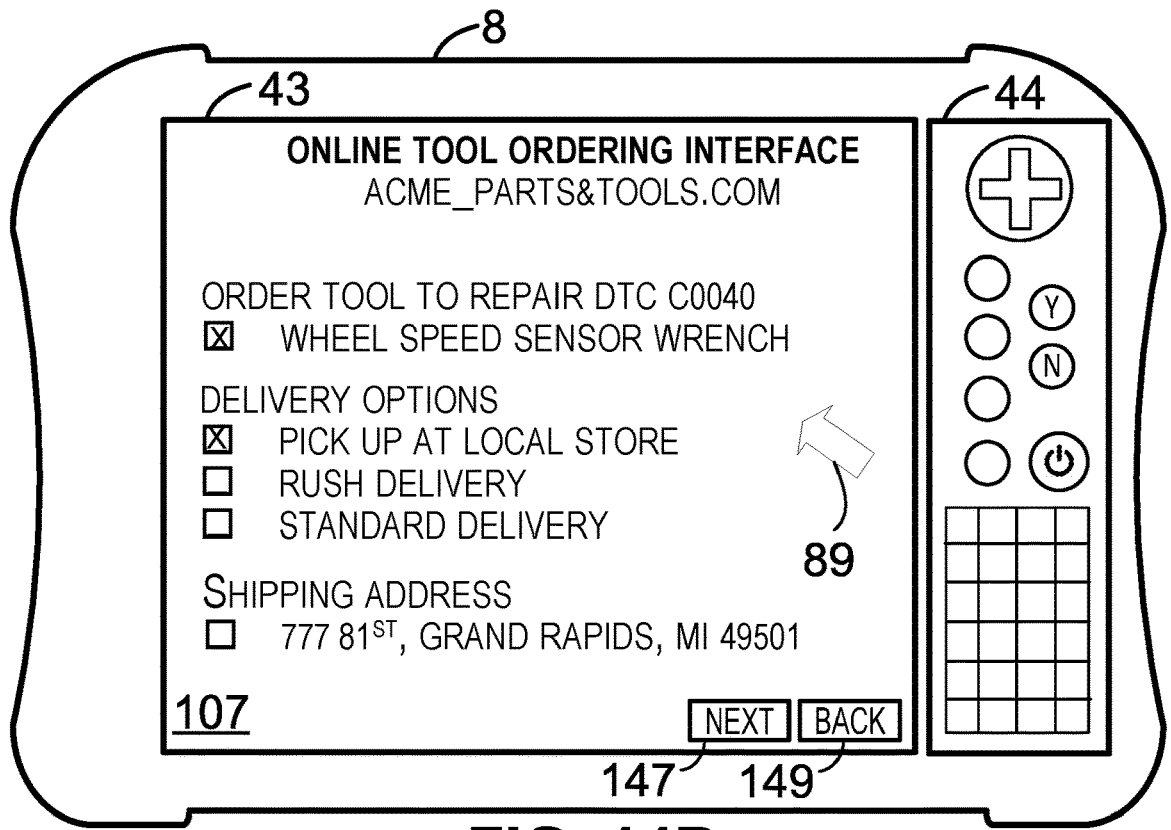

Next, FIG. 13A also depicts a display screen 104 displayed on the display 43. The display screen 104 includes a damaged selection menu 220. The processor 40 can output the damaged selection menu 220 in response to a variety of events, such as determining a selection from a scanner menu (e.g., the main scanner menu 109,189) has been selected, such as the selector 113 (shown in FIG. 6A) or the selector 191 (shown in FIG. 11B). As an example, the damage selection menu 220 includes a selector 221 selectable to cause the scanner 8 to display a vehicle grid for selecting a damaged portion of a vehicle. As another example, the damage selection menu 220 includes a selector 222 selectable to cause the scanner 8 to activate the capture device 45 for capturing an image that shows the damaged location of the vehicle. As yet another example, the damage selection menu 220 includes a selector 223 selectable to cause the scanner 8 to download an image showing a damaged portion of a vehicle. The processor 40 can cause the network transceiver 41 to request and/or receive the image showing the damaged portion from the server 9 or an NCS, such as the NCS 24, 25, 26. As still yet another example, the damage selection menu 220 includes a selector 224 selectable to cause the scanner 8 to read a repair order regarding the vehicle to determine the damaged portion of a vehicle. The processor 40 can cause the network transceiver 41 to request and/or receive the repair order from the server 9 or an NCS, such as the NCS 24, 25, 26. As still yet another example, the damage selection menu 220 includes a selector 225 selectable to cause the processor 40 to display a text field for entering text describing a damaged portion of a vehicle via the keypad 44.

Next, FIG. 13B also depicts a display screen 105 displayed on the display 43. The display screen 105 includes a select vehicle adjustment menu 240. The vehicle adjustment menu 240 can include one or more vehicle adjustment selectors, such as a reset selector, an initialization selector, a program selector, or a calibration selector. An adjustment selector can, but need not necessarily, pertain to the ECU 3, a DTC, a component in the vehicle 1, or a system in the vehicle 1. The adjustment selectors in the vehicle adjustment menu 240 can be associated with adjustments performable to vehicle components or vehicle systems by the scanner 8. FIG. 13B shows the vehicle adjustment menu 240 with adjustment selectors for resets "R1" and "R2," initializations "I1," I2," and "I3," programming "P1," and calibrations "C1" and "C2."

The processor 40 can cause the display 43 to display the vehicle adjustment menu 240 in response to determining the selector 192 (shown in FIG. 11B) was selected, determining the adjustment selection 196 (shown in FIG. 12A) was selected, or in response to another selection selected via the display 43 and/or the keypad 44. A selection from the vehicle adjustment menu 240 can be selected using the display 43 and/or the cursor 89 and the keypad 44.

Selecting a selectable reset, initialization, program, or calibration can cause the processor to output a display screen associated with the selected reset, initialization, program, or calibration. As an example, the selectable reset "R2" 241 can be selected to cause the display to display the display screen 103 shown in FIG. 12B. Each of those display screens can include a selector selectable to cause the processor 40 and/or the VCT 42 to transmit one or more VDM to the ECU 3 to perform the reset, initialization, program, or calibration.

Next, FIG. 14A also depicts a display screen 106 displayed on the display 43. The display screen 106 includes an online part ordering interface. The display screen 106 can be displayed in response to selecting a selector within another display screen shown on the display 43, such as the order part selector 198 from the display screen 102 (shown in FIG. 12A). The cursor 89 and keypad 44 and/or the display 43 can be used to select any part to be ordered, a delivery option, and a shipping address if applicable.

Next, FIG. 14B also depicts a display screen 107 displayed on the display 43. The display screen 107 includes an online tool ordering interface. The display screen 107 can be displayed in response to selecting a selector within another display screen shown on the display 43, such as the order tool selector 199 from the display screen 102 (shown in FIG. 12A). The cursor 89 and keypad 44 and/or the display 43 can be used to select any tool to be ordered, a delivery option, and a shipping address if applicable.

Next, FIG. 15A also depicts a display screen 180 displayed on the display 43. The display screen 180 includes a vehicle image 260. A portion of the vehicle image 260 can be selected in various ways to identify a damaged portion of the vehicle. For example, the cursor 89 could be used to select a portion of the vehicle image 260. As another example, a user hand 261 can touch the display 43 to select a portion of the vehicle image 260. The next selector 147 shown on the display screen 180 can be configured to indicate that selecting a damaged portion is complete. A touch screen input to the display 43 can rotate the vehicle image 260 so that a portion of the vehicle not currently displayed can be selected.

Next, FIG. 15B also depicts a display screen 181 displayed on the display 43. The display screen 181 shows the vehicle image 260 after selection of a portion 262 (e.g., the right rear quarter). The processor 40 can cause the portion 262 to be highlighted in some fashion to identify the portion has been selected. The next selector 147 shown on the display screen 181 can be configured to indicate that selecting a damaged portion is complete.

Next, FIG. 15C also depicts a display screen 182 displayed on the display 43. The display screen 182 shows selector boxes 700, 701, 702 configured for entering selections of a vehicle year, make, and model, respectively. The processor 40, 440 can determine a vehicle model based on the selections made via the selector boxes 700, 701, 702 and cause the display 43 to show the vehicle model on a display screen. The processor 40 can select, from the image 65, an image 703 of a vehicle associated with the entered year, make, and model. The processor 40 can output the image 703 on the display 43. The image 703 shows at least a portion of an undamaged vehicle. For purposes of this application, the image 703 includes shade lines to distinguish the image 703 from an image that will be captured by the scanner 8. The display 43 and/or the keypad 44 can be used to rotate the image 703 so that a different portion of the vehicle (such as the left side of the vehicle) is displayed on the display 43. A user may rotate the image 703 for a circumstance in which a portion of a damaged vehicle to be compared to the image 703 is not represented by the view of the image 703 currently displayed by the display 43. As an example, a swirl input onto the display 43 could be used to rotate the image 703. As another example, a swipe input onto the display 43 could be used to rotate the image 703. Other touch screen inputs, such as a pinching input or a spreading input, applied to the display 43 can cause the processor 40, 440 to resize an image 703, 705 to align with the other image.

Next, FIG. 15D also depicts a display screen 183 displayed on the display 43. The display screen 183 shows the image 703 of the undamaged vehicle and the button label 704 associated with the button 85. The button 85 or some other user interface component on the scanner 8 can be configured to capture an image, such as the image 705 of a damaged vehicle, while the image 703 is displayed on the display 43. The processor 40, 440 can cause the image 703 or the image 705 to be overlaid upon the other.

As shown in FIG. 15D, the image 703 displays the undamaged vehicle at a scale smaller than a scale at which the image 705 displays the damaged vehicle. A user interface component of the scanner 8 can be user to change the scale of one or more of the image 703 or the image 705 so that scale of the images 703, 705 is identical or at least substantially identical. A user interface component of the scanner 8 can be used to align one or more of the images 703, 705 so that one of the images 703, 705 is overlaid upon the other. Additionally or alternatively, the processor 40, 440 can change the scale of the image 703 or the image 705 to align the images 703, 705. The alignment can be based on aligning edges of the vehicle shown in the images, such as an edge representing a roofline of the vehicle shown in the images 703, 705.

Next, FIG. 15E depicts a display screen 184 displayed on the display 43 after the images 703, 705 have been aligned. The image 705 of the damaged vehicle can be overlaid upon the image 703. Alternatively, the image 703 of the undamaged vehicle can be overlaid upon the image 705 of the damaged vehicle. Aligning the images 703, 705 can include capturing the image 705 while a vehicle displayed on the display 43 is aligned with the image 703. A user may adjust a zoom setting on the scanner 8 so that the displayed image is at the same scale as the image 703 when capturing the image 705. Additionally or alternatively, a user can move the scanner 8 closer to or farther away from the damaged vehicle in order to capture the image 705 with the same scale as the image 703. Furthermore, the processor 40, 440 can scale the images 703, 705. For instance, the processor 40 can be configured to increase or decrease a size of the image 703, 705 to change the scale of image 703, 705. Furthermore still, the processor 40, 440 can align the images 703, 705. For instance the processor 40, 440 can reposition an image 703, 705 until edge lines of the vehicles shown in one of the images 703, 705 is overlaid or under an edge line of a similar portion of the vehicle shown in the other image.

After alignment of the images 703, 705, the processor 40 can subsequently determine a portion of the damaged vehicle shown in the image 705 that is damaged. The processor 40 can compare edge lines of the vehicle shown in the images 703, 705 to determine edge lines that do not match. The edge lines of the image 705 that do not match the edge lines of the image 705 may be indicative of the damaged portion. For example, FIG. 15E shows an edge line 707 between arrows 708, 709 of the undamaged vehicle shown in the image 703 and an edge line 706 between the arrows 708, 709 of the damaged vehicle shown in the image 705. The processor 40, 440 can thus determine that the damaged portion of the damaged vehicle is located at a portion of the vehicle represented by the edge line 706 between the arrows 708, 709. As another example, the processor 40,440 can determine a gap between two body components (e.g., a door and a fender) shown in the image of the damaged vehicle is greater than a gap between the same two body components in the reference image of the vehicle.

Next, FIG. 15F depicts a variation of the scanner 8 that differs from the variation of the scanner 8 shown in FIG. 6A to FIG. 15E. In this variation, the scanner includes the display 43, but fewer hardware keys than the variation of the scanner shown in FIG. 6A to FIG. 15E. For instance, the scanner 8 includes the direction keypad 80, the yes button 81, the no button 82, and the power button 83 as hardware keys, but not the buttons 85, 86, 87, 88 and the multi-button keypad 84. Similar to the display 43 shown in FIG. 6A to FIG. 15E, the display 43 can include a touch screen display, such as a capacitive touch screen display. In the implementation shown in FIG. 15F, the display 43 is shown to indicate that some functions selectable by hardware buttons, such as the buttons 85, 86, and 88, can be selected using a touch screen display. For instance, the display 43 is shown as displaying a display screen 185 that includes the vehicle images 150, 151, 152 shown in FIG. 9A. For the scanner shown in FIG. 15F, the vehicle image 150, 151, 152 can be selected by touching a selector box 715, 716, 717, respectively, on the display 43.

Next, FIG. 15G to FIG. 15N depict a variation of the scanner 8 that differs from the variations of the scanner 8 shown in FIG. 6A to FIG. 15F. In this variation, the scanner 8 includes the display 43 (e.g., a touch screen display), but does not include any hardware keys. In this implementation, a touch screen input to the display 43 can cause the scanner 8 to (1) change power states from a sleep mode to a power-on mode, (2) make a selection, such as any selection (described in this description) as being made via the scanner 8, (3) change power states from a power-on mode to a sleep mode, and/or (4) display any display screen shown in FIG. 6A to FIG. 15E. As an example, the scanner 8 configured without any hardware keys can minimize battery usage by the scanner 8, such as by turning off a backlighting for the display 43, during the sleep mode. The scanner 8 that includes one or more hardware keys can also implements the power-on and sleep modes.

FIG. 15G also depicts the display 43 displaying a display screen 186 including the vehicle model identifier 320, an identifier of POI damage 321, a selector 322 configured for causing the processor 40, 440 to include content regarding the POI damage onto a collision report, and a selector 323 configured for causing the processor 40, 440 to determine PRCD based on the POI damage indicated by the identifier of the POI damage 321 and/or based on the vehicle identified by the vehicle model identifier 320. The processor 40 can be configured to notify the processor 440 of the selector 322 being selected so that the processor 440 includes content regarding the POI damage onto a collision report. The processor 40 can be configured to notify the processor 440 of the selector 323 being selected so that the processor 440 determines RCD based on the POI damage indicated by the identifier of the POI damage 321 and/or based on the vehicle identified by the vehicle model identifier 320. The processor 40, 440 can determine the vehicle model identifier 320 as described elsewhere in this description.

Next, FIG. 15H depicts the display 43 displaying a display screen 187 that can, but need not necessarily, be shown in response to selection of the selector 323 and then the next selector 147 while the display screen 186 (shown in FIG. 15G) is displayed. The display screen 187 shows the vehicle model identifier 320, and PRCD data 805, 806, 808, 809. The PRCD data 805, 806 can be applicable multiple vehicle models (as shown in FIG. 16B). The PRCD data 808, 809 can be applicable to a single vehicle model (i.e., the vehicle model VM1). Other vehicle models may likewise be associated with RCD that matches the PRCD data 808 or 809. Furthermore, the display screen 187 includes a selector 328 to view a collision report, and selectors 329, 331, 333, 335 selectable to indicate an inspection hint regarding the PRCD data 805, 806, 808, 809, respectively, is selected. Furthermore still, the display screen 187 can include selectors 330, 332, 334, 336 selectable to indicate the PRCD data 805, 806, 808, 809, respectively, is selected for adding to a collision report. Moreover, a selector within the selectors 330, 332, 334, 336 can include a quantity selector to indicate a quantity of RCD to be added to the collision report and a location for each RCD. As shown in FIG. 15H, quantities and locations of three different seat belts and seat belt retractor pre-tensioners have been entered for the selectors 330, 332, respectively.

Next, FIG. 15I depicts the display 43 displaying a display screen 853 that can, but need not necessarily, be shown in response to selection of the selector 323 and then the next selector 147 while the display screen 186 (shown in FIG. 15G) is displayed. The display screen 853 shows a PRCD identifier 861 (i.e., Excessive driver door gap), an inspection hint 862 (i.e., a standard gap adjacent the right-side driver door is ³⁄₁₆"), and measurement fields 857, 858, 859, 860 in which a measurement of a gap between the right side door and an adjacent vehicle component in proximity to the lines leading from the measurement fields 857, 858, 859, 860. As shown in FIG. 15I, a measurement field 860 can include a menu from which a measurement can be selected using a touch screen of the display 43 or the keypad 44. Other measurement fields on displayed on the display can include appropriate menus for selecting a measurement.

Next, FIG. 15J depicts the display 43 displaying a display screen 188 that can, but need not necessarily, be shown in response to selection of the selector 335 while the display screen 187 (shown in FIG. 15H) is displayed. The display screen 188 shows an inspection hint regarding a seat belt retractor pre-tensioner. The next selector 147, back selector 149 can be selected to cause the processor 40, 440 to output a different display screen. As an example, selection of the next selector 147 while the display screen 188 is shown could cause another inspection hint regarding the seat belt retractor pre-tensioner. As another example, selection of the back selector 149 while the display screen 188 is shown could cause the display 43 to show the display screen 187 shown in FIG. 15H.

Next, FIG. 15K depicts the display 43 displaying a display screen 850 that can, but need not necessarily, be shown in response to selection of the back selector 149 while the display screen 188 (shown in FIG. 15J) is displayed. The display screen 850 shown in FIG. 15K is the same as the display screen shown in FIG. 15H except that a quantity and location have been entered into the selector 336 and the view collision report selector 328 has been selected. Selecting the next selector 147 while the display screen 850 shown in FIG. 15K is shown can cause the processor 40, 440 to display a collision report on the display 43.

Figure 15L:
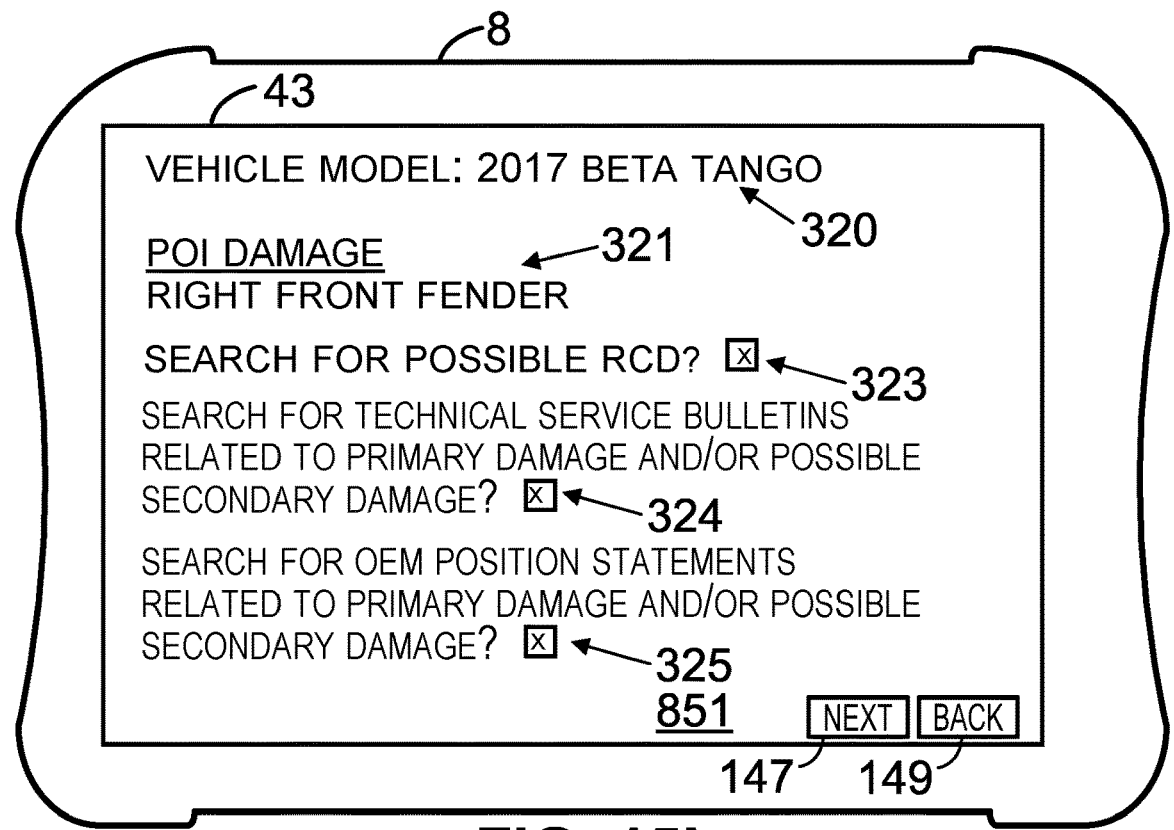

Next, FIG. 15L depicts the display 43 displaying a display screen 851 that can, but need not necessarily, be shown in response to the processor 40, 440 determining POI damage for a vehicle identified as the vehicle model VM1. The display screen 851 includes the vehicle model identifier 320, the identifier of the POI damage 321, the selector 323 (discussed with respect to FIG. 15G), a selector 324 selectable to cause the processor 40, 440 to determine a technical service bulletin related to the determined POI damage and/or the PRCD, and a selector 325 selectable to cause the processor 40, 440 to determine a position statement by an OEM (e.g., a vehicle OEM or a vehicle component OEM) related to the determined POI damage and/or the PRCD. The processor 40, 440 can determine the related bulletins and/or position statements from the TSB and position statement 70, 470.

Figure 15M:
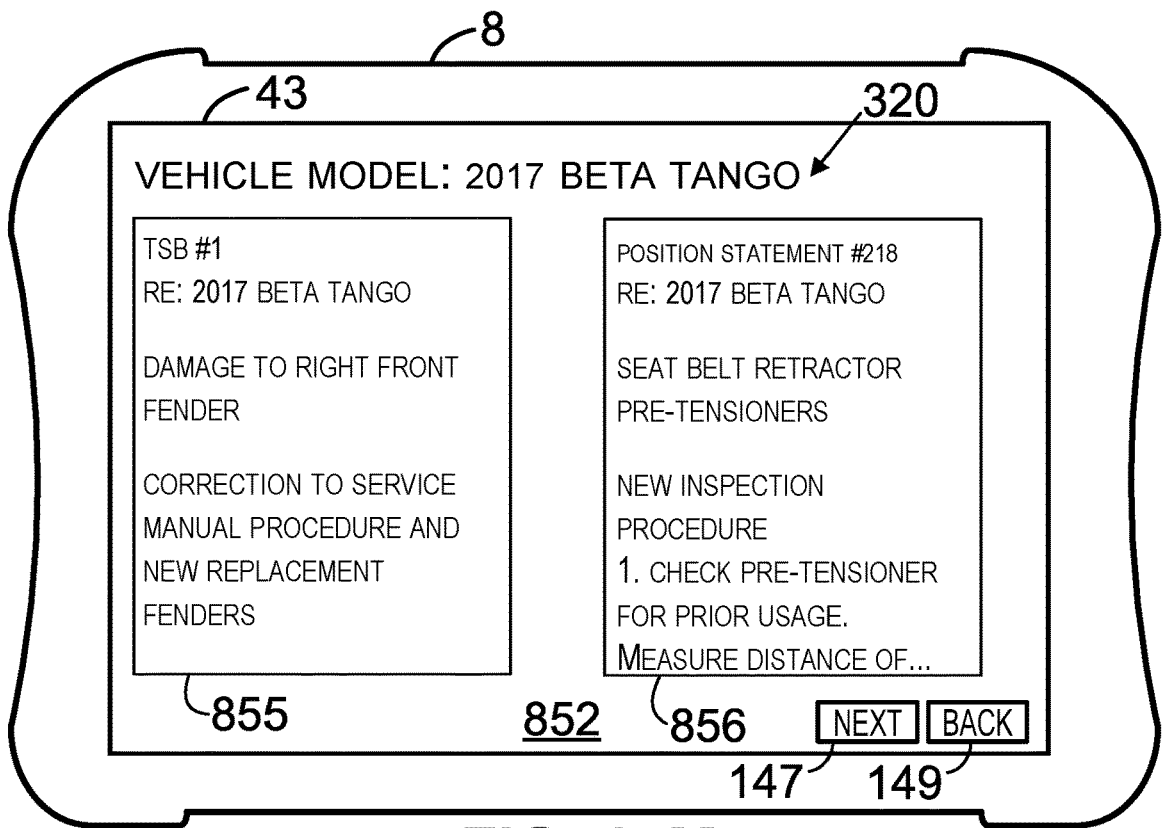

Next, FIG. 15M depicts the display 43 displaying a display screen 852 that can, but need not necessarily, be shown in response to selection of the next selector 147 while the display screen 851 (shown in FIG. 15L) is displayed. The display screen 852 includes the vehicle model identifier 320, a TSB 855, and a position statement 856. The TSB 855 and the position statement 856 can be stored within the TSB and position statement 70, 470.

Figure 15N:
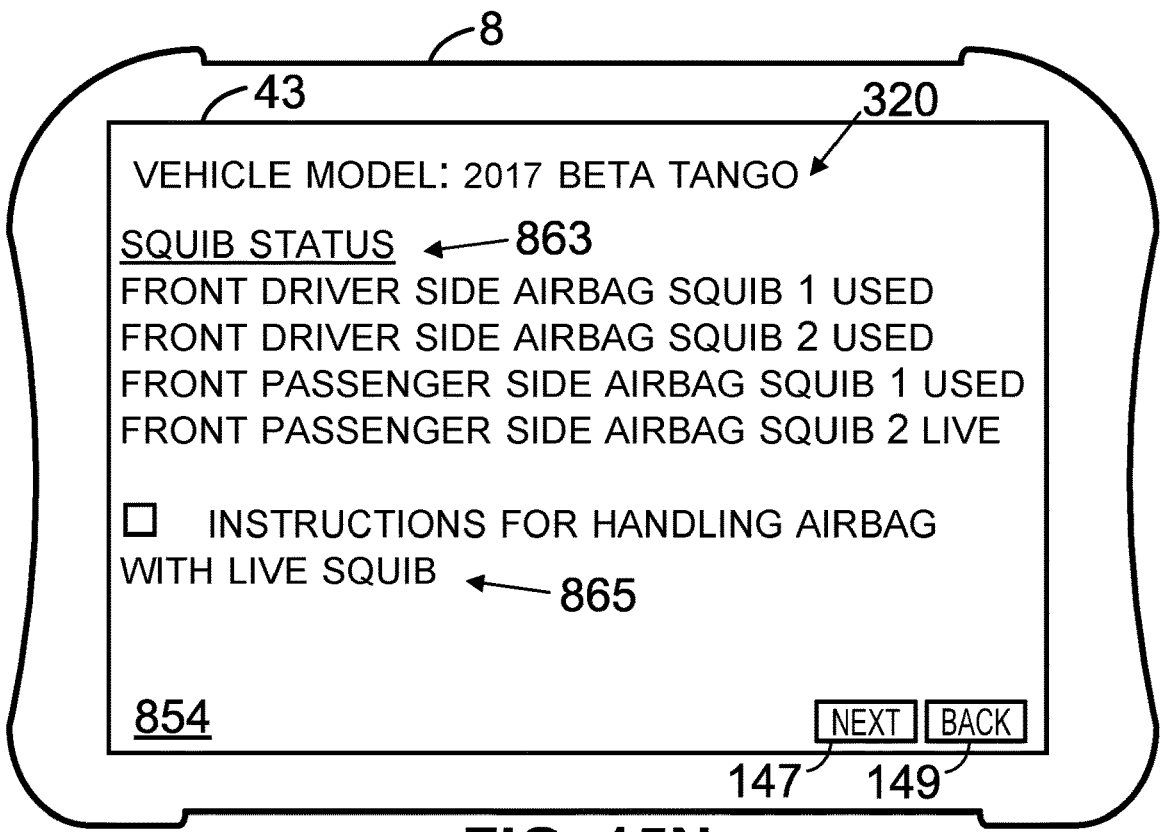

Next, FIG. 15N depicts the display 43 displaying a display screen 854 that can, but need not necessarily, be shown in response to selection of the squib status selector 114 while the display screen 90 (shown in FIG. 6A) is displayed. The display screen 854 includes the squib status information 863 determined by the processor 40. As shown in the display screen 854, the squib status for the vehicle identified by the vehicle model identifier 320 is "used" for both driver side air bag squibs and squib #1 associated with a front passenger side air bag, and "live" for squib #2 associated with the front passenger side air bag. The display screen 854 also includes an instruction selector 865 to cause the processor 40 to output instructions for handing an air bag with a live squib.

Figure 15O:
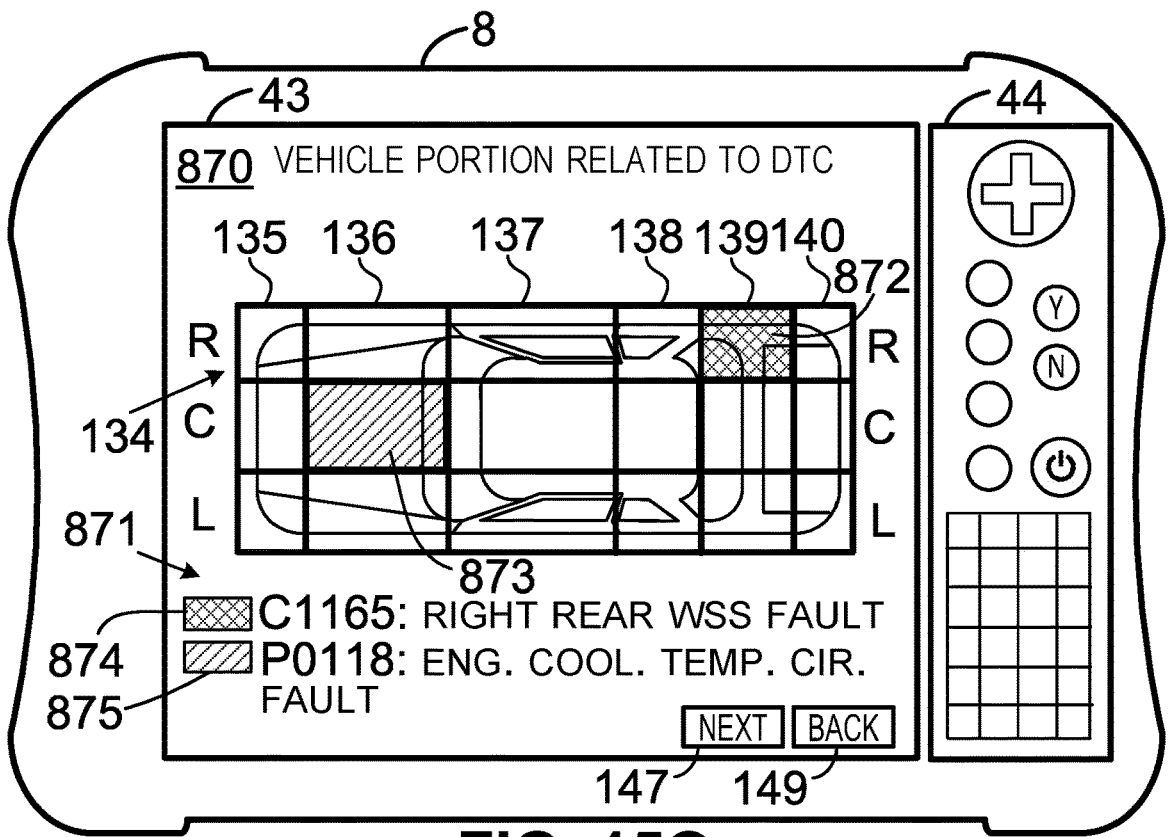

Next, FIG. 15O depicts the display 43 displaying a display screen 870 that can, but need not necessarily, be shown in response to selection of the read DTC selector 110, 190. The display screen 870 includes the vehicle grid 134 and a grid legend 871. The vehicle grid 134 includes an image of a vehicle. The processor 40 can obtain the image shown in the vehicle grid 134 from the image 65. The grid legend 871 includes an indicator 874 that pertains to highlighting 872 within vehicle grid location 139R. The grid legend 871 includes an indicator 875 that pertains to highlighting 873 within vehicle grid location 136C. The highlighting 872, 873 provides an indication of where vehicle component(s) associated with the DTC C1165 and the DTC P0118, respectively, are located on the vehicle 1. Selection of a vehicle grid location of a vehicle grid can cause the processor 40 to output a vehicle grid showing another image of a portion of the vehicle 1 represented by the portion of the image shown in the selected vehicle grid location. The other image can show details not shown in the image within the selected vehicle grid location. As an example, the other image may show details behind a vehicle body panel, such as a vehicle hood covering an engine compartment.

Figure 15P:
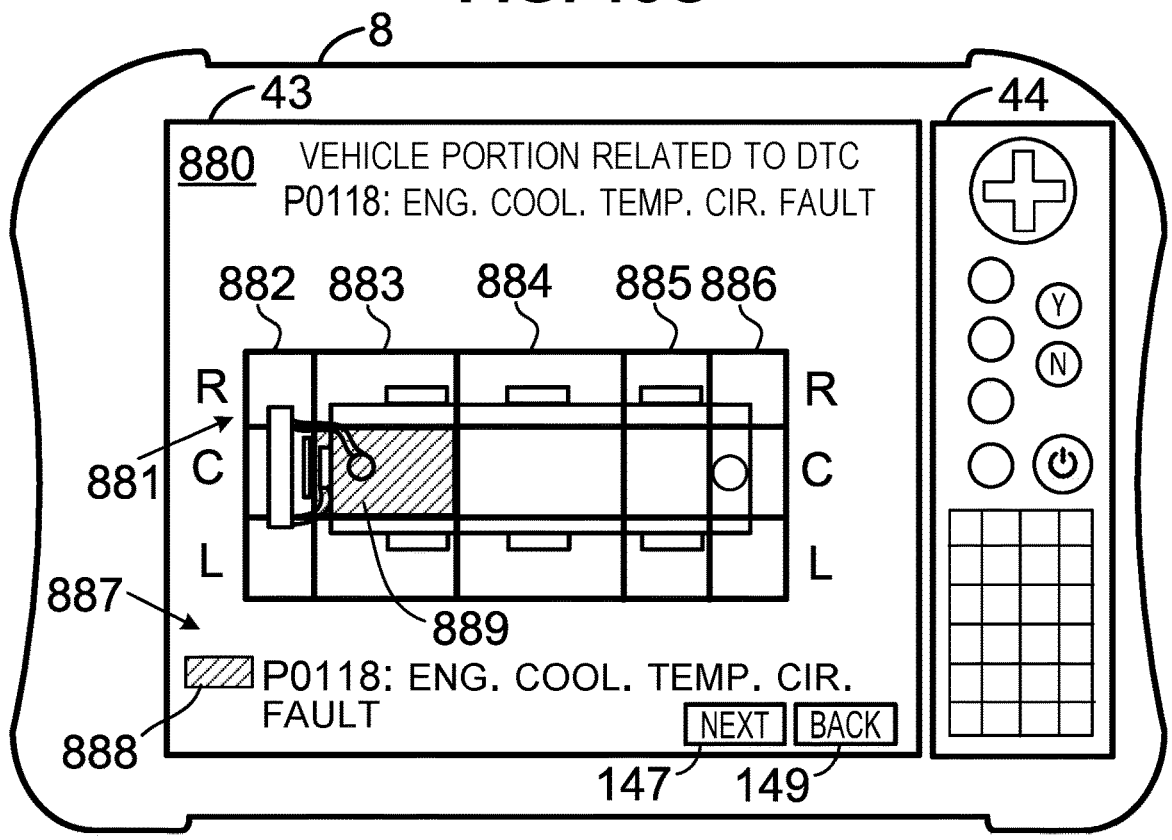

Next, FIG. 15P depicts the display 43 displaying a display screen 880 that can, but need not necessarily, be shown in response to selection of the vehicle grid location 136C while the display 43 is displaying the display screen 870. The display screen 880 includes a vehicle grid 881 with vehicle grid columns 882, 883, 884, 885, 886, each of which corresponds to a right, center, and left grid position. The vehicle grid 881 includes an image of an engine compartment of the vehicle 1. The processor 40 can obtain the image shown in the vehicle grid 881 from the image 65 as the memory 47 can store data that indicates the image shown in the vehicle grid 881 is associated with a portion of the vehicle 1 represented by the portion of the image shown in the selected vehicle grid location 136C. Referring to Table 2, the image displayed on the display screen 880 is an image named VM1_136C.jpg. The display screen 880 includes a grid legend 887 having an indicator 888 that pertains to highlighting 889 within the center position of vehicle grid column 883. The highlighting 889 provides an indication of where vehicle component(s) associated with the DTC P0118 are located on the vehicle 1.

TABLE 4

| Vehicle Grid Location | Vehicle Component | DTC | Symptom |
| --- | --- | --- | --- |
| 882R | Radiator | Null | Leaking coolant, engine overheating |
| 882C | Radiator, cooling fan | Null | Leaking coolant, engine overheating |
| 882L | Radiator | Null | Leaking coolant, engine overheating |
| 883R | Fuel injector #2, spark plug #2 | P0202 | Engine misfire - cylinder #2 |
| 883C | Engine coolant temperature sensor, water pump | P0118 | Leaking coolant, engine overheating |
| 883L | Fuel injector #1, spark plug #1 | P0201 | Engine misfire - cylinder #1 |
| 884R | Fuel injector #4, spark plug #4 | P0204 | Engine misfire - cylinder #4 |
| 884C | Intake manifold | Null | |
| 884L | Fuel injector #3, spark plug #3 | P0203 | Engine misfire - cylinder #3 |
| 885R | Fuel injector #6, spark plug #6 | P0206 | Engine misfire - cylinder #6 |
| 885C | Intake manifold | Null | |
| 885L | Fuel injector #5, spark plug #5, electric starter | P0205 | Engine misfire - cylinder #5, engine does not start |
| 886R | Null | Null | Null |
| 886C | Flywheel, coil pack | | |
| 886L | Null | Null | Null |

Figure 15Q:
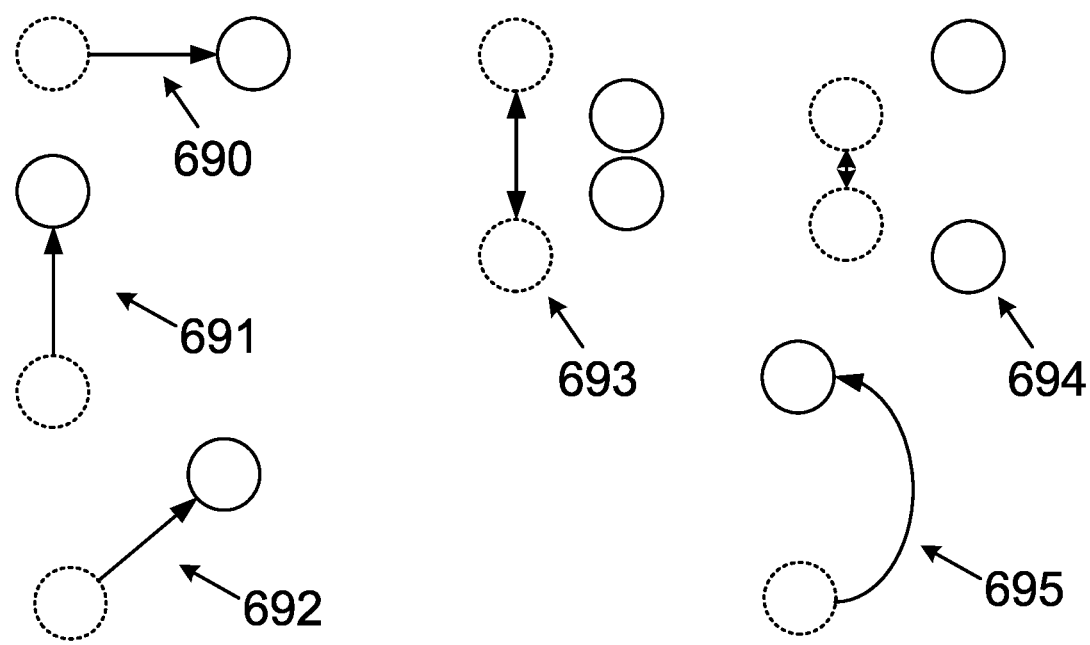
FIG. 15Q is a diagram depicting example touch screen display inputs in accordance with the example implementations.

Next, FIG. 15Q illustrates some example inputs (i.e., touch screen inputs) 690, 691, 692, 693, 694, 695 that can be entered onto a touch screen display. The processor 40 can detect a touch screen input and perform a function associated with the touch screen input. The function can further be associated with the content currently displayed on the display 43 while the touch screen input is occurring. The example touch screen inputs are shown with one or two dashed circle(s) to represent a starting point of one or two digit(s) (e.g., finger and/or thumb). The arrows between the circles represent example directions of movement. The directions of movement for touch screen inputs 690, 691, 692, 695 can occur in an opposite direction. The touch screen input 690 is a horizontal swipe input (when the display 43 is in a portrait or landscape orientation). The touch screen input 691 is a vertical swipe input (when the display 43 is in a portrait or landscape orientation). The touch screen input 692 is a diagonal swipe input (when the display 43 is in a portrait or landscape orientation). The touch screen input 693 is a pinch input. The touch screen input 694 is an expand input. The touch screen input 691 is a swirl input. The touch screen inputs 693, 694 are shown as vertical inputs, but can alternatively be entered horizontally and/or diagonally. Other examples of touch screen inputs are available.

VII. Additional Example Operation

Figure 18A:
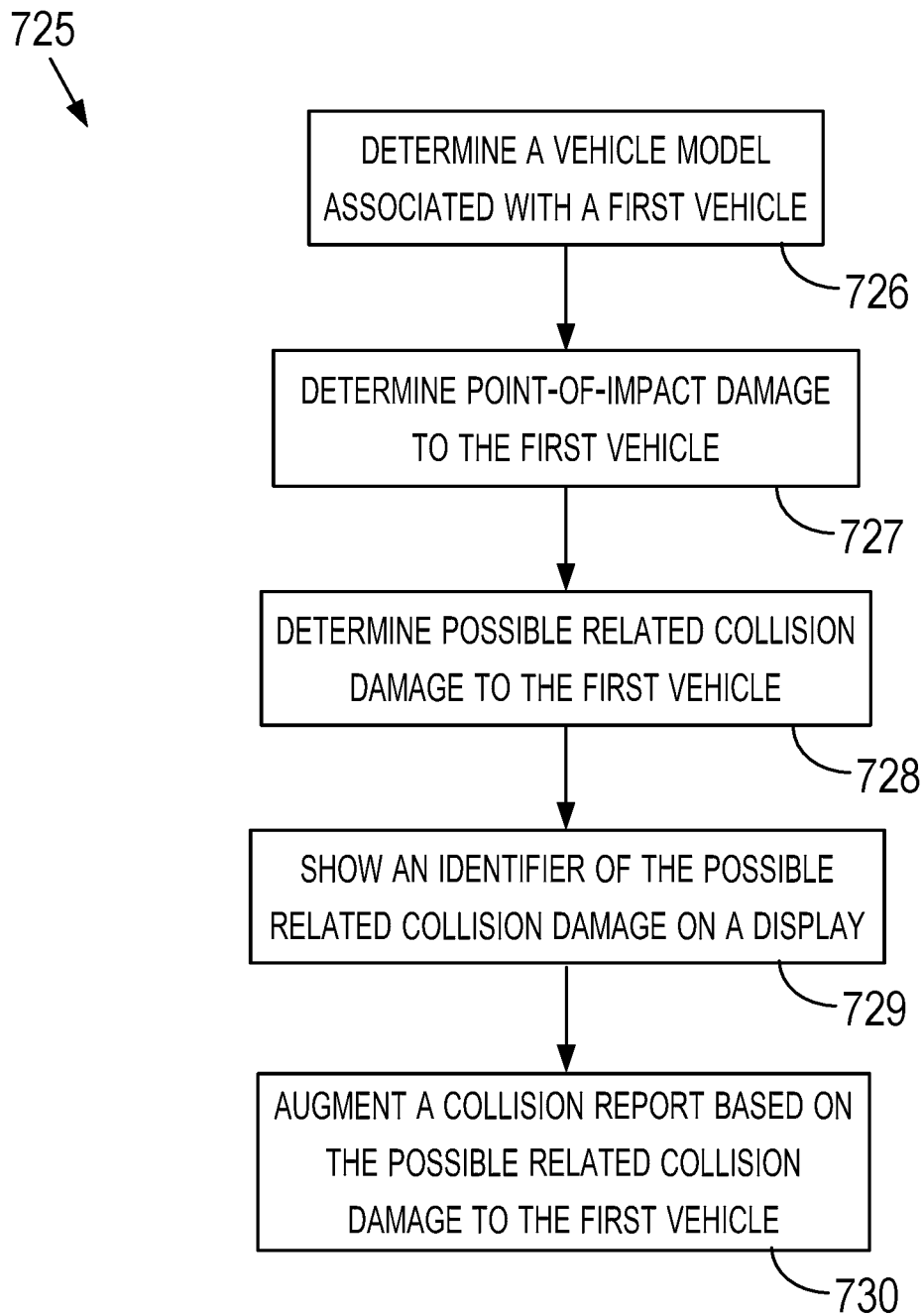
FIG. 18A is another flowchart depicting a set of functions that can be carried out in accordance with the example implementations.

Next, FIG. 18A shows a flowchart depicting a set of functions 725 (or more simply "the set 725") that can be carried out in accordance with the example implementations described in this description. The set 725 includes the functions shown in blocks labeled with whole numbers 726 through 730. The description of the set 725 includes references to elements shown in other figures described in this description, but the functions of the set 725 are not limited to being carried out only by the referenced elements. A variety of methods can be performed using all of the functions shown in the set 725 or any proper subset of the functions shown in the set 725. Any of those methods can be performed with other functions such as one or more of the other functions described in this description. A processor can perform or cause a function of the set 725 to be performed.

In some example implementations, the scanner 8 can perform one or more of the functions of the set 725, and one or more of those functions performed by the scanner 8 can be performed by the processor 40. In at least some of those implementations, the scanner 8 can perform all of the functions of the set 725. The scanner 8 and the processor 40 can perform functions of the set 725 while the scanner 8 is operatively connected to the vehicle 1 via the VCL 10.

In some other example implementations, the server 9 can perform one or more of the functions of the set 725, and the one or more of those functions performed by the server 9 can be performed by the processor 440. In at least some of those implementations, the server 9 can perform all of the functions of the set 725. The server 9 and the processor 440 can perform functions of the set 725 while the server 9 is operatively connected to the scanner 8 via the network 11 or to a vehicle, such as the vehicle 1. Furthermore, in some other example implementations, the scanner 8 and the server 9 can both perform one or more of the functions of the set 725. In those example implementations, the server 9 can provide the scanner 8 with a display screen to shown on the display 43.

Block 726 includes determining a vehicle model associated with a first vehicle. The processor 40, 440 can determine the vehicle model as described elsewhere in this description. The description of block 501, shown in FIG. 5A, describes examples of determining the vehicle model. For implementations in which the server 9 determines the vehicle model, the server 9 can determine the vehicle model based on a communication sent to the server 9 from the scanner 8. That communication can include an identifier of the vehicle.

Next, block 727 includes determining POI damage to the first vehicle. The processor 40, 440 can determine the POI damage as described elsewhere in this description. The description of FIG. 9A, FIG. 9B, FIG. 10A, FIG. 13A, and FIG. 15A to FIG. 15F describes examples of determining a point-of-impact to a vehicle, which can be a POI where the POI damage occurred. A vehicle can include more than one point-of-impact, such as a vehicle that was involved in a first collision where the vehicle collided with another vehicle in front of the vehicle and a second collision where another vehicle collided with the rear of the vehicle.

Next, block 728 includes determining PRCD to the first vehicle. The processor 40, 440 can determine the PRCD as described elsewhere in this description. The description of FIG. 15G to FIG. 15N describes some examples of determining PRCD. In some implementations, the processor 440 determines the PRCD and transmits the PRCD to the scanner 8. A benefit of determining PRCD can include expediting repair of a damaged vehicle.

Furthermore, in some implementations, determining the PRCD can include determining a DTC set in the first vehicle is collision-related. As an example, the processor 40, 440 can make that determination as described in this elsewhere in this description. In these implementations, determining the PRCD can also include determining a component related (i.e., a 'related component') to the collision-related DTC. As an example, the processor 40, 440 can refer to the VRD 66, 300, 466 to determine a related component based on the collision-related DTC.

In some implementations, determining the PRCD can include determining the PRCD is related to the POI damage to the first vehicle. As an example, the processor 40, 440 can refer to the VRD 800 to determine that the PRCD data 805, 806 is applicable to vehicles (from among multiple vehicle models including the vehicle model of the first vehicle) having POI damage data 804 matching the POI damage the processor 40, 440 determined occurred to the first vehicle. As another example, the processor 40, 440 can refer to the VRD 802 to determine that the PRCD data 808, 809 is applicable to all vehicles that are the vehicle model VM1 having POI damage data 807 matching the POI damage the processor 40, 440 determined occurred to the first vehicle.

Next, block 729 includes showing an identifier of the RCD to the first vehicle. As an example, the display 43 can display a display screen, such as the display screen 187 (shown in FIG. 15H), the display screen 850 (shown in FIG. 15K) or the display screen 852 (shown in FIG. 15M). As another example, the display 43 can show the collision report 68 that includes an identifier of the RCD to the first vehicle. As shown in FIG. 17, the collision report 68 shows identifiers of the RCD in the repair parts section including the seat belts and seat belt retractor pre-tensioner.

Next, block 730 includes augmenting a collision report based on the determined PRCD to the first vehicle. As an example, augmenting the collision report 68 can include adding identifiers of the RCD, such as the identifiers of the RCD in the repair parts section including the seat belts and seat belt retractor pre-tensioner. As another example, augmenting the collision report 68 can include adding a quantity of parts, a unit cost per part, and a total cost of parts arising from the RCD. In some implementations, augmenting the collision report with identifiers of the RCD can be conditioned on the scanner 8 receiving an input indicative that PRCD actually occurred to the vehicle.

Figure 18B:
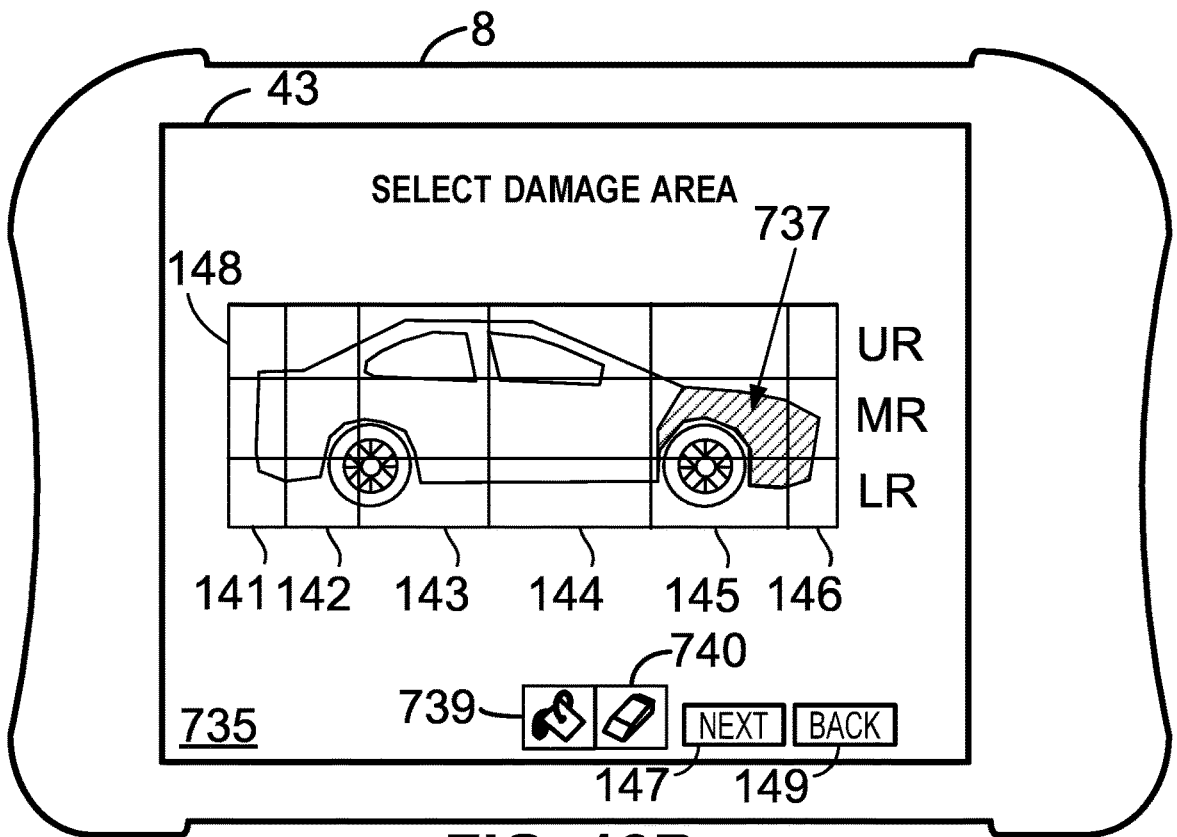
FIGS. 18B and 18C depict example implementations of the scanner and a display screen shown on a display of the scanner in accordance with the example implementations.
Figure 18C:
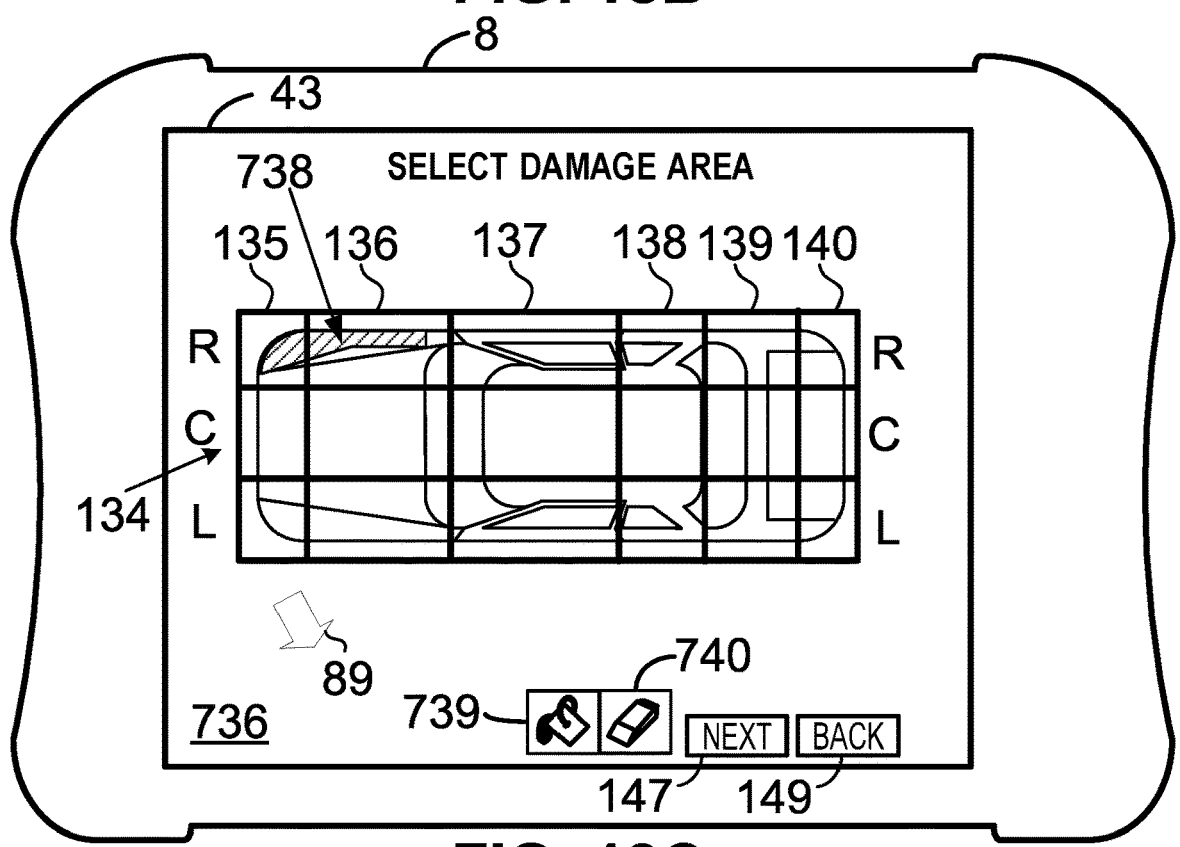

Next, FIG. 18B and FIG. 18C depict display screen 735, 736, respectively, displayed on the display 43. The display screen 735 shows the vehicle grid 148 in which a damage area 737 (represented by diagonal lines) has been selected within the grid locations 146LR, 146MR, 145LR, 145MR. Likewise, the display screen 736 shows the vehicle grid 134 in which a damage area 738 (represented by diagonal lines) has been selected within the grid locations 135R, 136R. The damage area 738 can be used to determine an amount of deflection of vehicle components of the damaged vehicle.

The scanner 8 can be arranged in one or more configuration to allow a user to make selections to identify the damage areas 737, 738. In at least some implementations, a scale of the grid locations are finer than the grid locations shown in FIG. 18B, 18C (e.g., grid locations covering a smaller portion of a vehicle and/or more grid locations covering the vehicle). In those implementations, as well as any other implementation using a vehicle grid with multiple grid locations, a grid location can have a non-rectangular shape. The processor 40 can detect which grid locations have been selected in the vehicle grid 148 to determine the damage area 737. Likewise, the processor 40 can detect which grid locations have been selected in the vehicle grid 134 to determine the damage area 738.

In at least some implementations, a portion of a vehicle displayed on the display 43 can be selected by tracing an outline of the portion on the display. As an example, the tracing can occur by a user touching the touch screen. As another example, the tracing can occur by moving the cursor 89 on the display 43. A perimeter of an area formed by moving the cursor 89 can indicate the damage area 737, 738.

In at least implementations, the display 43 can include a paint selector 739 for use in selecting portions of a vehicle displayed on the display 43 or other portions of an item displayed on the display 43. The display 43 can also include an eraser selector 740 for use in deselecting a portion of the displayed vehicle or other displayed item selected by use of the paint selector 739. Once the paint selector 739 is active the cursor 89 or a digit of the user, for example, can be used to select the portion. The processor 40 can show the selected area with a representation as having been painted.

The processor 40 can quantify an amount of deflection reflected in each grid location or an amount of deflection reflected in a portion of the vehicle shown in each grid location. In some implementations, the processor 40 can determine the vehicle deflection represented in grid location 135R is 75% and the vehicle deflection represented in the grid 136R is 30%. In other words, 75% of the vehicle shown in grid location 135R is indicated to be damaged and/or 25% of the vehicle shown in grid location 135R is shown as undamaged (i.e., not damaged), and 30% of the vehicle shown in grid location 136R is indicated to be damaged and/or 70% of the vehicle shown in grid location 136R is shown as undamaged. In other implementations, the processor 40 can determine the vehicle damage represented in grid locations 135R, 136R in terms of area or distance.

The processor 40, 440 can refer to the CADD 69, 467 to determine vehicles of the same vehicle model that experienced a similar amount of vehicle deflection in the same portions of the vehicle identified by the scanner 8. The processor 40, 440 can determine repairs made to the determined vehicles and display the repairs on a display screen as PRCD. As an example, the similar amount of vehicle deflection can be an amount of vehicle deflection within a range of the determined vehicle deflection plus or minus a threshold amount of vehicle deflection. The threshold amount of vehicle deflection can, but need not necessarily, be five percent, ten percent, of fifteen percent.

In one implementation, the processor 40 can determine the amount of deflection within a vehicle grid or a portion of a vehicle grid based on pixel quantities. For instance, the portion of the vehicle shown in the grid location 135R can cover 2,000 pixels and the amount of deflection represented in the grid location 135R can cover 1,500 pixels, such that the processor 40 can determine the amount of deflection by dividing the 1,500 pixels by 2,000 pixels to obtain the 75% deflection value.

Tables 5, 6, and 7 show examples of deflection data and repair data for other vehicles that are the same vehicle year, make, and model as the current vehicle identified by the scanner 8. Tables 5, 6, and 7 show the grid locations of the vehicle grid 134 (shown in FIG. 9B) and amounts of deflection determined for the portions of a vehicle shown in each grid position. Additionally, Tables 5 and 6 show repairs made to the particular vehicles identified in those tables and a cost associated with each of those repairs. Table 7 shows that no repairs were made to the particular vehicle identified in that table. The vehicle identified in Table 7 was "totaled" because the costs to repair the vehicle due to the amount of vehicle damage were considered to be too great. As an example, Repair R1 is replacement of the right front fender, Repair R2 is replacement of the B-pillar, Repair R3 is replacement of the front row right seat belt retractor pretensioner, Repair R4 is replacement of right front wheel speed sensor, Repair R5 is replacement of radiator, Repair R6 is replacement of front grill, Repair R7 is replacement of vehicle headlights, Repair R8 is replacement air conditioner condenser, and Repair R9 is replacement of vehicle hood. The repairs shown in Tables 5 and 6 can be considered PRCD for other vehicles that experienced vehicle deflection similar to the deflection values shown in those tables.

TABLE 5

| Null | 135 | 136 | 137 | 138 | 139 | 140 |
|---|---|---|---|---|---|---|
| R | 68% | 22% | 0% | 0% | 0% | 0% |
| C | 5% | 0% | 0% | 0% | 0% | 0% |
| L | 0% | 0% | 0% | 0% | 0% | 0% |

(Repair R1, Cost C1), (Repair R2, Cost C2), (Repair R3, Cost C3), (Repair R4, Cost C4)
Vehicle: 2017 Beta Tango - VIN 2G1FP22K67406002

TABLE 6

| Null | 135 | 136 | 137 | 138 | 139 | 140 |
|---|---|---|---|---|---|---|
| R | 53% | 8% | 0% | 0% | 0% | 0% |
| C | 15% | 0% | 0% | 0% | 0% | 0% |
| L | 32% | 0% | 0% | 0% | 0% | 0% |

(Repair R1, Cost C1), (Repair R2, Cost C2), (Repair R3, Cost C3), (Repair R4, Cost C4), (Repair R5, Cost C5), (Repair R6, Cost C6), (Repair R7, Cost C7), (Repair R8, Cost C8), (Repair R9, Cost C9)
Vehicle: 2017 Beta Tango - VIN 2G1FP22K67231223

TABLE 7

| Null | 135 | 136 | 137 | 138 | 139 | 140 |
|---|---|---|---|---|---|---|
| R | 100% | 100% | 0% | 0% | 0% | 0% |
| C | 100% | 100% | 0% | 0% | 0% | 0% |
| L | 100% | 100% | 0% | 0% | 0% | 0% |

Repairs: None - vehicle totaled
Vehicle: 2017 Beta Tango - VIN 2G1FP22K674712626

The processor can compare deflection data and repair data regarding different vehicles of a common vehicle model to determine a threshold that indicates a DTC is collision-related. For example, when the processor determines a particular portion of a vehicle that includes a wire harness experiences deflection of at least 50%, the wire harness is typically damaged, and the damaged wire harness results in a particular DTC being set active. In accordance with that example, the processor can determine a DTC set in vehicle 1 is collision-related by determining the particular portion of vehicle 1 has experienced at least 50% deflection. Moreover, the processor may associate a confidence rating with respect to the determination the DTC is collision-related. The processor can determine the confidence rating based on the amount of deflection. In some cases, the greater amount of deflection at the particular portion of the vehicle, the greater the confidence rating, and vice versa.

VIII. Example Computing System Configuration

Next, FIG. 19 is a simple block diagram of a computing system 650 in accordance with the example implementations. In a basic configuration 651, the computing system 650 can include one or more processors 652 and a system memory 654. A memory bus 659 can be used for communicating between the processor 652 and the system memory 654. Depending on the desired configuration, the processor 652 can be of any type including but not limited to a microprocessor (µP), a microcontroller (µC), a digital signal processor (DSP), or any combination thereof. A memory controller 653 can also be used with the processor 652, or in some implementations, the memory controller 653 can be an internal part of the processor 652.

Depending on the desired configuration, the system memory 654 can be of any type including but not limited to volatile memory (such as RAM), non-volatile memory (such as ROM, flash memory, etc.) or any combination thereof. The system memory 654 can include one or more applications 655, and program data 657. The application 655 can include an algorithm 656 that is arranged to perform the functions described as being performed by the scanner 8, or the server 9, or the NCS 24, 25, 26. The program data 657 can include system data 658 that could be directed to any number of types of data, such as one more of the following types of data: a vehicle model identifier 61, a DTC data 62, a vehicle portion identifier 63, captured data 64, an image 65, VRD 66, CADD 69, a display screen 67, and a collision report 68. In some example implementations, the applications 655 can be arranged to operate with the program data 657 on an operating system executable by the processor 652.

The computing system 650 can have additional features or functionality, and additional interfaces to facilitate communications between the basic configuration 651 and any devices and interfaces. For example, storage devices 660 can be provided including removable storage devices 661, non-removable storage devices 662, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and non-volatile, non-transitory, removable and non-removable media implemented in any method or technology for storage of information, such as computer-readable program instructions, data structures, program modules, or other data such as the data stored in a computer-readable memory, such at the memory 47.

The system memory 654 and the storage devices 660 are examples of computer-readable medium, such as the memory 47. The system memory 654 and the storage devices 660 can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 650.

The computing system 650 can include or be implemented as a portion of a small-form factor portable (i.e., mobile) electronic device such as a smartphone (e.g., an IPHONE® smartphone from Apple Inc. Of Cupertino, Calif., or a GALAXY S® smartphone from Samsung Electronics Co., Ltd. Of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The application 655, or the program data 657 can include an application downloaded to the communication interfaces 667 from the APP STORE® online retail store, from the GOOGLE PLAY® online retail store, or another source of the applications or the CRPI 60. A component of the scanner 8, such as the display 43 and/or the network transceiver 41, can be embodied in the small-form factor electronic device.

The computing system 650 can include or be implemented as part of a personal computing system (including both laptop computer and non-laptop computer configurations), or a server. The computing system 650 can be configured as an embedded system in which the processor 652 includes an embedded processor and the system memory 654 includes an embedded memory.

The computing system 650 can also include output interfaces 663 that can include a graphics processing unit 664, which can be configured to communicate to various external devices such as display devices 666 or speakers via one or more A/V ports 665 or a communication interface 667. The communication interface 667 can include a network controller 668, which can be arranged to facilitate communications with the other computing systems 670 over a network communication via one or more communication ports 669. The communication connection is one example of a communication media. Communication media can be embodied by computer-readable program instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

For the scanner 8, the communication interface 667 can include the network transceiver 41 and the VCT 42, and the communication port 669 can include a communication port connectable to a printer for printing a paper copy of the collision report 68.

Figure 20:
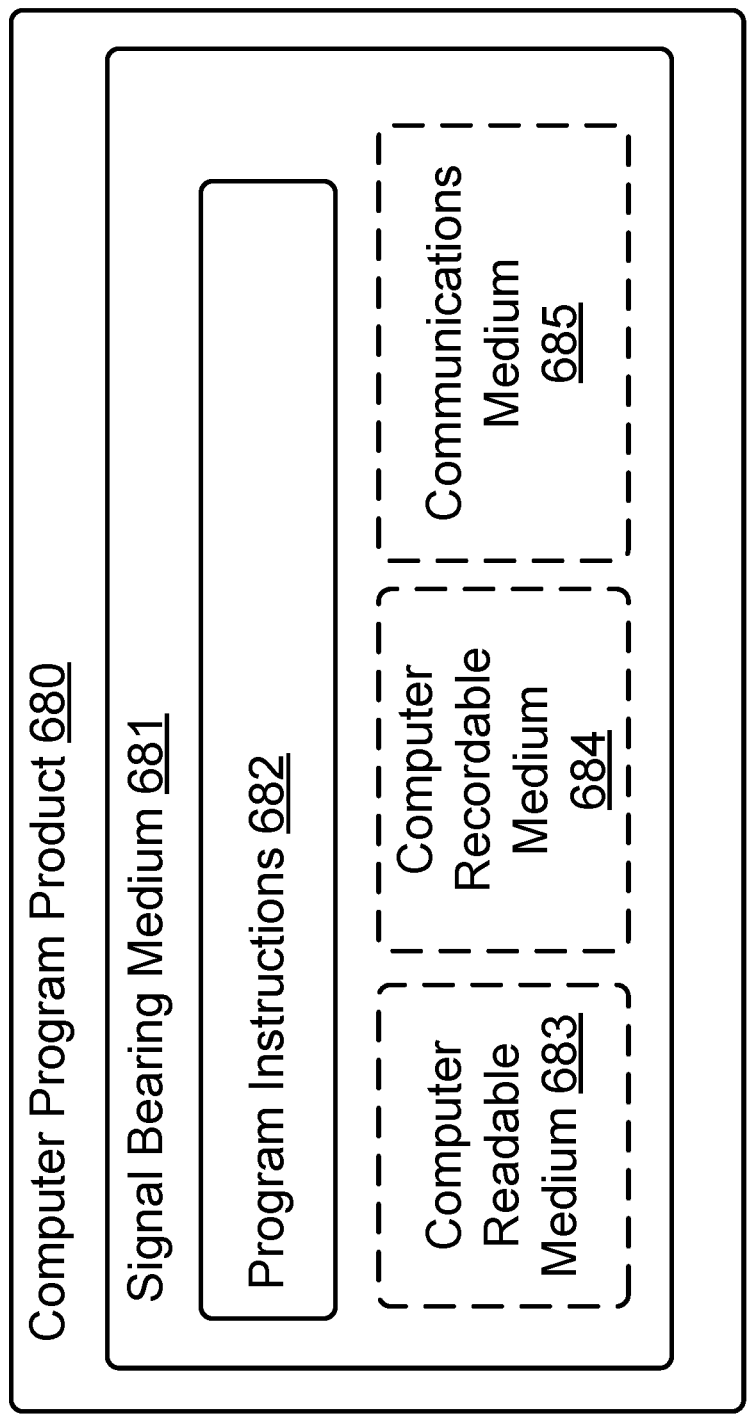
FIG. 20 is a schematic illustrating a conceptual partial view of an example computer program product.

Next, FIG. 20 is a schematic illustrating a conceptual partial view of an example computer program product 680 that includes a computer program for executing a computer process on a computing system, arranged according to at least some implementations presented herein. That computer program can be encoded on a non-transitory computer-readable storage medium in a machine-readable format, or on another non-transitory medium or article of manufacture.

In one implementation, the example computer program product 680 is provided using a signal bearing medium 681. The signal bearing medium 681 can include one or more programming instructions 682 that, when executed by one or more processors can provide functionality or portions of the functionality described above with respect to FIG. 1 to FIG. 17. In some examples, the signal bearing medium 681 can encompass a computer-readable medium 683, such as, but not limited to, a hard disk drive, a Compact Disc (CD), a Digital Video Disk (DVD), a digital tape, or any other memory described herein. In some implementations, the signal bearing medium 681 can encompass a computer recordable medium 684, such as, but not limited to, memory, read/write (R/W) CDs, R/W DVDs, etc. In some implementations, the signal bearing medium 681 can encompass a communications medium 685, such as, but not limited to, a digital and/or an analog communication medium (e.g., a fiber optic cable, a waveguide, a wired communications link, a wireless communication link, etc.). Thus, for example, the signal bearing medium 681 can be conveyed by a wireless form of the communications medium 685 (e.g., a wireless communications medium conforming to the IEEE 802.11 standard or another transmission protocol).

The one or more programming instructions 682 can be, for example, computer executable and/or logic implemented instructions. In some examples, a computing system such as the computing system 650 of FIG. 19 can be configured to provide various operations, functions, or actions in response to the programming instructions 682 conveyed to the computing system 650 by one or more of the following; the computer-readable medium 683, the computer recordable medium 684, or the communications medium 685.

The scanner 8 can include any of the components of the computing system 650. The processor 40 can be configured like the processor 652. The memory 47 can be configured as part of or all of the system memory 654 or the storage devices 660. The network transceiver 41 can be configured as part of or all of the communication interfaces 667.

In at least some implementations, the scanner 8, the server 9, the NCS 24, 25, 26, and/or the computing system 650 includes a power source. The power source can include a connection to an external power source and circuitry to allow current to flow to other elements connected to the power source. As an example, the external power source can include a wall outlet at which a connection to an alternating current can be made. As another example, the external power source can include an energy storage device (e.g., a battery) or an electric generator.

Additionally or alternatively, a power source can include a connection to an internal power source and power transfer circuitry to allow current to flow to other elements connected to the power source. As an example, the internal power source can include an energy storage device, such as a battery. Furthermore, any power source described herein can include various circuit protectors and signal conditioners. The power sources described herein can provide a way to transfer electrical currents to other elements that operate electrically.

IX. Definitions

The term "data" within this description can be used interchangeably with the term "information" or similar terms, such as "content." The data described herein can be transmitted and received via a communication. As an example, any transmission of data or a communication described herein can occur directly from a transmitting device (e.g., a transmitter) to a receiving device (e.g., a receiver). As another example, any transmission of data or a communication described herein can occur indirectly from the transmitter to a receiver via one or more intermediary network devices, such as an access point, an antenna, a base station, a hub, a modem, a relay, a router, a switch, or some other network device. The transmission of any of data or a communication described herein can include transmitting the data or communication over an air interface (e.g., using radio signals (i.e., wirelessly)). The transmission of any of data or communication described herein can include transmitting the data or communication over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of data or a communication over the conductor can occur electrically or optically.

A "collision estimate" is an estimate indicative to repairing a vehicle as a result of the vehicle being involved in a collision. A collision estimate can include data indicative of labor fees, vehicle component fees, hazardous material fees, subletting fees, and miscellaneous fees for vehicle fluids, welding rods, storage fees, etc. A "collision procedure" is content indicative of one or more procedural steps or procedures performable to repair a vehicle as result of the vehicle being involved in a collision. The content of a collision procedure can, for example, include textual content, an image, or a video. A collision estimate and/or a collision procedure can be configured according to an industry standard, such as a standard defined by CIECA.

A "DTC" is a diagnostic trouble code. A DTC can be manufacturer specific or industry specific, such as a DTC defined by the SAE® J2012 standard for Diagnostic Trouble Code Definitions, dated December 2016, or a DTC defined by the ISO® 15031-6 standard for diagnostic trouble code definitions, dated August 2015. A DTC can include a sub-code. For instance, a DTC can indicate that a sensor is out-of-range. A sub-code can indicate why the sensor is out-of-range, such as a sub-code indicating the sensor is shorted to ground, a sub-code indicating the sensor is open-circuited, or a sub-code indicating the sensor is shorted to voltage. Unless explicitly stated otherwise, any discussion in this description of a DTC can include a DTC that includes or does not include a sub-code.

In this description, the articles "a," "an," and "the" are used to introduce elements or functions of the example implementations. The intent of using those articles is that there is one or more of the introduced elements or functions. The word "next" is used to transition from paragraphs or aspects described in the description and is not intended to indicate an order of occurrence of any functions of method.

In this description, the intent of using the term "and/or" within a list of at least two elements or functions and the intent of using the terms "at least one of," "at least one of the following," "one or more of," or "one or more of the following" immediately preceding a list of at least two components or functions is to cover each implementation including a listed component or function independently and each implementation including a combination of the listed components or functions. For example, an implementation described as including A, B, and/or C, or at least one of A, B, or C, or at least one of the following: A, B or C, or one or more of A, B, or C, or one or more of the following: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number. The use of "at least one" is to indicate "one or more."

Example location abbreviations shown in the figures and/or in the description include "LF" for left front, "RF" for right front, "LFU" for left front upper and/or upper left front, "RFU" for right front upper and/or upper right front, "LRQ" for left rear quarter, "RRQ" for right rear quarter, "LR" for left rear, "RR" for right rear, "RFQ" for right front quarter, "RT FRT" for right front, and "LT rear" for left rear, "CHMSL" for center high mounted stop lamp, and "inop" for inoperative.

X. Conclusions and Enumerated Example Embodiments

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing CRPI or by a combination of hardware, firmware, and/or software. For purposes of this description, execution of CRPI contained in a memory to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing particular implementations only, and is not intended to be limiting.

Embodiments of the present disclosure may thus relate to one of the enumerated example implementation (EEEs) listed below.

EEE 1 is a method comprising: determining, by one or more processors, a vehicle model associated with a first vehicle; determining, by the one or more processors, a first diagnostic trouble code (DTC) set within a first electronic control unit (ECU) in the first vehicle; determining, by the one or more processors, a first damaged portion of the first vehicle, wherein the first damaged portion indicates where the first vehicle was damaged by a collision; determining, by the one or more processors, the first DTC is collision-related, wherein determining the first DTC is collision-related includes determining, by the one or more processors, the first damaged portion of the first vehicle matches a reference vehicle portion associated with both a component attributable to setting the first DTC and the vehicle model associated with the first vehicle; and outputting, by the one or more processors, a collision report that indicates the first DTC is collision-related.

EEE 2 is the method of EEE 1, wherein outputting the collision report includes displaying the collision report on a display, and wherein the collision report includes a vehicle adjustment selector applicable to the first vehicle, the method further comprising: receiving, by the one or more processors, a selection of the vehicle adjustment selector; and adjusting the vehicle in response to receiving the selection of the vehicle adjustment selector.

EEE 3 is the method of EEE 2, wherein adjusting the vehicle includes calibrating a component on the first vehicle, programming the component on the first vehicle, resetting a component on the first vehicle, or initializing a component on the first vehicle.

EEE 4 is the method of any one of EEEs 1 to 3, further comprising: outputting, by the one or more processors to a display, an image associated with the vehicle model, wherein the image is divided into multiple selectable image portions, wherein a first selectable image portion of the multiple selectable image portions corresponds to a first portion of the vehicle model, and wherein determining the first damaged portion of the first vehicle includes receiving, by the one or more processors, a selection of the first selectable image portion that corresponds to the first portion of the vehicle model.

EEE 5 is the method of EEE 4, wherein receiving the selection of the first selectable image portion includes the one or more processors determining a portion of the display at which the first selectable image portion is displayed is touched.

EEE 6 is the method of EEE 4, wherein receiving the selection of the first selectable image portion includes the processor selecting the first selectable image portion based on the first selectable image portion being associated with the first DTC.

EEE 7 is the method of any one of EEEs 4 to 6, wherein the image includes a three dimensional wire frame image.

EEE 8 is the method of any one of EEEs 4 to 7, wherein the image depicts a generic vehicle, and the image is further associated with at least a second vehicle model identifiable from attributes of a second vehicle that is not a vehicle of the vehicle model associated with the first vehicle.

EEE 9 is the method of any one of EEEs 4 to 8, wherein outputting the image associated with the vehicle model includes outputting, by the one or more processors, a first subset of the multiple selectable image portions, the method further comprising: receiving, by the one or more processors while the first subset of the multiple selectable image portions is output to the display, an input to change the image; and outputting, by the one or more processors in response to receiving the input to change the image, a second subset of the multiple selectable image portions to the display.

EEE 10 is the method of any one of EEEs 1 to 9, further comprising: receiving, by the one or more processors, one or more attributes of the first vehicle from a vehicle data message transmitted by an ECU within the first vehicle; and wherein determining the vehicle model associated with the first vehicle includes determining, by the one or more processors, the one or more attributes matches a stored attribute mapped to the vehicle model.

EEE 11 is the method of any one of EEEs 1 to 10, further comprising: outputting, by the one or more processors to a display, one or more of the following: a DTC selector, a damaged portion selector, or a vehicle adjustment selector; and displaying, by the display, one or more of the following: the DTC selector, the damaged portion selector, or the vehicle adjustment selector.

EEE 12 is the method of EEE 11, further comprising: receiving, by the one or more processors, an input indicative of the DTC selector being selected; outputting, by the one or more processors in response to receiving the input, DTC data, wherein the DTC data includes DTC data regarding the first DTC set within the first ECU in the first vehicle; and displaying, by the display, the DTC data.

EEE 13 is the method of EEE 11 or EEE 12, further comprising: receiving, by the one or more processors, an input indicative of the collision damage selector being selected; outputting, by the one or more processors in response to receiving the input, an image associated with the first vehicle model, wherein the image is divided into multiple selectable image portions, wherein each selectable image portion corresponds to a different damaged portion of vehicles of the first vehicle model, and wherein a first selectable image portion corresponds to the first damaged portion; and displaying, by the display, the image associated with the first vehicle model.

EEE 14 is the method of any one of EEEs 11 to 13, further comprising: receiving, by the one or more processors, a first input indicative of the vehicle adjustment selector being selected; outputting, by the one or more processors in response to receiving the first input, (a) vehicle adjustment information regarding a vehicle adjustment, and (b) a second vehicle adjustment selector; and displaying, by the display, the vehicle adjustment information and the second vehicle adjustment selector.

EEE 15 is the method of EEE 14, further comprising: receiving, by the one or more processors, a second input indicative of the second vehicle adjustment selector being selected; and outputting, by the one or more processors in response to receiving the second input, a signal or communication to perform a vehicle adjustment corresponding to the second vehicle adjustment selector, wherein the vehicle adjustment includes (a) programming a vehicle component in the first vehicle, (b) initializing a vehicle component in the first vehicle, (c) calibrating a vehicle component in the first vehicle, or (d) resetting a vehicle component in the first vehicle.

EEE 16 is the method of any one of EEEs 1 to 15, further comprising: determining, by the one or more processors, a first parameter from the first vehicle indicative of the first DTC setting within the first ECU; determining, by the one or more processors, a second parameter pertaining to a current operating state of the first vehicle; wherein determining the first DTC is collision-related is further based upon a difference in the first parameter and the second parameter being within a threshold range, and wherein the first parameter and the second parameter are both indicative of a distance the first vehicle has been driven or a number of driving cycles.

EEE 17 is the method of any one of EEEs 1 to 16, further comprising: determining, by the one or more processors, a second DTC set within the first ECU or a second ECU in the first vehicle; and determining, by the one or more processors, the second DTC is non-collision-related, wherein the collision report indicates the second DTC is non-collision-related.

EEE 18 is the method of any one of EEEs 1 to 17, further comprising: receiving, by the one or more processors, at least a portion of an estimate or repair order pertaining to the first vehicle and the collision, wherein determining the first damaged portion of the first vehicle includes the one or more processors determining the first damaged portion from the at least a portion of the estimate or repair order.

EEE 19 is the method of any one of EEEs 1 to 18, further comprising: receiving, by the one or more processors, an image of the first damaged portion of the first vehicle; and comparing, by the one or more processors, the image of the first damaged portion of the first vehicle to a stored image showing an undamaged portion of a vehicle associated with the vehicle model, wherein determining the first damaged portion of the first vehicle includes the one or more processors determining the first damaged portion of the first vehicle pertains to the undamaged portion shown in the stored image.

EEE 20 is the method of any one of EEEs 1 to 19, further comprising: performing, by the one or more processors, a pre-repair scan of the first vehicle to determine which diagnostic trouble codes are set in the first vehicle prior to the first damaged portion of the first vehicle being repaired; and performing, by the one or more processors, a post-repair scan of the first vehicle to determine which diagnostic trouble codes are set in the first vehicle after the first damaged portion of the first vehicle is repaired.

EEE 21 is the method of any one of EEEs 1 to 20, wherein the collision report includes time data indicative of when the first DTC was set with respect to a time when the collision occurred.

EEE 22 is the method of any one of EEEs 1 to 21, further comprising: determining, by the one or more processors, a warning regarding repairing the first vehicle, wherein determining the warning includes the one or more processors determining the warning is mapped to the reference vehicle portion; outputting, by the one or more processors to a display, the warning; and displaying, by the display, the warning.

EEE 23 is the method of any one of EEEs 1 to 22, wherein the component includes a wire or a fiber optical cable.

EEE 24 is the method of any one of EEEs 1 to 23, further comprising: determining, by the one or more processors, a possible related collision damage to the first vehicle; and augmenting, by the one or more processors, the collision report based on the possible related collision damage to the first vehicle.

EEE 25 is the method of EEE 24, further comprising; displaying, by the display, an identifier of the possible related collision damage to the first vehicle; and receiving, by the one or more processors, a selection of the possible related collision damage, wherein augmenting the collision report is further based on the selection of the possible related collision damage.

EEE 26 is the method of any one of EEEs 1 to 25, wherein the vehicle is a first vehicle, the method further comprising: determining, by the one or more processors, an amount of deflection at the first damaged portion of the first vehicle, determining, by the one or more processors, possible related collision damage based on the amount of deflection at the first damaged portion of the first vehicle and actual damage to a second vehicle associated with an amount of deflection at a damaged portion of the second vehicle, wherein the damaged portion of the second vehicle matches the first damaged portion of the first vehicle; and displaying, by the display, an indication of the possible related collision damage.

EEE 27 is a computing system comprising: a computer-readable memory having stored thereon a reference vehicle portion associated with both a component attributable to setting a first diagnostic trouble code (DTC) and a vehicle model associated with a first vehicle; and one or more processors configured to refer to the computer-readable memory and programmed to: (1) determine the vehicle model associated with the first vehicle; (2) determine the first DTC set within a first electronic control unit (ECU) in the first vehicle; (3) determine, a first damaged portion of the first vehicle, wherein the first damaged portion indicates where the first vehicle was damaged by a collision; (4) determine the first DTC is collision-related, wherein determining the first DTC is collision-related includes determining the first damaged portion of the first vehicle matches the reference vehicle portion associated with both the component attributable to setting the first DTC and the vehicle model associated with the first vehicle; and (5) output a collision report that indicates the first DTC is collision-related.

EEE 28 is the computing system of EEE 27, further comprising: a vehicle communications transceiver configured for being operatively connected to the first vehicle.

EEE 29 is the computing system of EEE 27 or EEE 28, further comprising: a network transceiver configured for being operatively connected to a scanner coupled to the first vehicle.

EEE 30 is the computing system of EEE 27 or EEE 28, further comprising: a network transceiver configured for being operatively connected to a server and/or a network computing system.

EEE 31 is the computing system of one of EEE 27 to EEE 30, further comprising: a display operatively connected to the one or more processors, wherein the display is configured to display a display screen output by the one or more processors.

EEE 32 is the computing system of one of EEE 27 to EEE 31, further comprising: a keypad.

EEE 33 is the computing system of one of EEE 27 to EEE 32, further comprising: a capture device, wherein the capture device is configured to generate data based on objects in proximity to the computing system and/or signals from which that data can be generated.

EEE 34 is the computing system of one of EEE 27 to EEE 33, further comprising: an audio device.

EEE 35 is the computing system of one of EEE 27 to EEE 34, further comprising: a power supply and/or housing.

EEE 36 is a computer readable memory having stored thereon instructions executable by one or more processors to cause a computing system to perform functions comprising: (1) determining a vehicle model associated with a first vehicle; (2) determining a first diagnostic trouble code (DTC) set within a first electronic control unit (ECU) in the first vehicle; (3) determining a first damaged portion of the first vehicle, wherein the first damaged portion indicates where the first vehicle was damaged by a collision; (4) determining the first DTC is collision-related, wherein determining the first DTC is collision-related includes determining, by the one or more processors, the first damaged portion of the first vehicle matches a reference vehicle portion associated with both a component attributable to setting the first DTC and the vehicle model associated with the first vehicle; and (5) outputting a collision report that indicates the first DTC is collision-related.

EEE 37 is a system comprising: one or more processors, a non-transitory computer readable medium, and program instructions stored on the non-transitory computer readable medium and executable by the one or more processors to cause a set of functions to be performed, the set of functions comprising a method in accordance with any one of EEEs 1 to 26.

EEE 38 is the computing system of EEE 37, further comprising: a vehicle communications transceiver configured for being operatively connected to the first vehicle.

EEE 39 is the computing system of EEE 37 or EEE 38, further comprising: a network transceiver configured for being operatively connected to a scanner coupled to the first vehicle.

EEE 40 is the computing system of EEE 37 or EEE 38, further comprising: a network transceiver configured for being operatively connected to a server and/or a network computing system.

EEE 41 is the computing system of one of EEE 37 to EEE 40, further comprising: a display operatively connected to the one or more processors, wherein the display is configured to display a display screen output by the one or more processors.

EEE 42 is the computing system of one of EEE 37 to EEE 41, further comprising: a keypad.

EEE 43 is the computing system of one of EEE 37 to EEE 42, further comprising: a capture device, wherein the capture device is configured to generate data based on objects in proximity to the computing system and/or signals from which that data can be generated.

EEE 44 is the computing system of one of EEE 37 to EEE 43, further comprising: an audio device.

EEE 45 is the computing system of one of EEE 37 to EEE 44, further comprising: a power supply and/or housing.

EEE 46 is a computer readable medium storing program instructions, that when executed by one or more processors, cause a set functions to be performed, the set of functions comprising a method in accordance with any one of EEEs 1 to 26.

We claim:

1. A method performed by a computing system including a processor and a user interface component, the method comprising:
   determining, by the processor, a vehicle model associated with a first vehicle;
   determining, by the processor, a diagnostic trouble code set within an electronic control unit in the first vehicle;
   determining, by the processor, a damaged portion of the first vehicle via the user interface component, wherein the damaged portion indicates where the first vehicle was damaged by a collision;
   determining, by the processor, that the diagnostic trouble code is collision-related, wherein determining the diagnostic trouble code is collision-related includes determining that the damaged portion of the first vehicle matches a reference vehicle portion associated with both a component attributable to setting the diagnostic trouble code and the vehicle model associated with the first vehicle; and
   outputting, by the processor, a collision report that indicates the diagnostic trouble code is collision-related.

2. The method of claim 1,
   wherein the user interface component includes a display and a capture device, and
   wherein determining the damaged portion of the first vehicle via the user interface component includes:
     capturing, by the capture device, an image of the first vehicle;
     displaying, on the display, the image including multiple grid locations that correspond to respective portions of a grid and to respective portions of the first vehicle, wherein a first grid location of the multiple grid locations corresponds to a particular portion of the first vehicle, and
     receiving a selection of the first grid location;
   wherein the damaged portion of the first vehicle includes the particular portion of the first vehicle.

3. The method of claim 1,
   wherein the user interface component includes a display and a capture device,
   wherein determining the damaged portion of the first vehicle via the user interface component includes:
     capturing, by the capture device, a first image showing the first vehicle;
     displaying, on the display, the first image and a reference image of a second vehicle similar to the first vehicle;
     aligning edges of a first portion of the first vehicle shown in the first image with edges of a first portion of the second vehicle shown in the reference image, wherein the first portion of the first vehicle is similar to the first portion of the second vehicle; and
     while the edges of the first portion of the first vehicle and the edges of the first portion of the second vehicle are aligned, determining edges of a second portion of the first vehicle shown in the first image and edges of a second portion of the second vehicle shown in the reference image are not aligned; and
   wherein the damaged portion of the first vehicle includes the second portion of the first vehicle.

4. The method of claim 1,
   wherein the user interface component includes a display,
   wherein determining the damaged portion of the first vehicle via the user interface component includes:
     displaying, on the display, an image showing separately-selectable portions of a reference vehicle, wherein the separately-selection portions include a particular portion of the reference vehicle;
     highlighting, on the display, the particular portion of the reference vehicle in response to a selection of the particular portion made using the user interface component;
     determining, by the processor, occurrence of a selection of a control indicating selections of damaged vehicle portions is complete, and
   wherein the particular portion of the reference vehicle is indicative of the damaged portion of the first vehicle.

5. The method of claim 1:
   wherein the user interface component includes a display,
   wherein determining the damaged portion of the first vehicle via the user interface component includes:
     outputting, on the display, one or more measurement fields configured for entry of a gap measurement that indicates a distance between two adjacent vehicle body components, and
     determining that a particular gap measurement entered into a particular measurement field is greater than a gap measurement between two corresponding adjacent vehicle body components on a reference vehicle similar to the first vehicle, and
   wherein the damaged portion of the first vehicle is one or both of the two adjacent vehicle body components.

6. The method of claim 1, wherein the computing system includes and/or is arranged as a wearable computing device.

7. A non-transitory computer readable memory having stored thereon instructions executable by a processor to cause a computing system including the processor and a user interface component to perform functions comprising:
   determining a vehicle model associated with a first vehicle;
   determining a diagnostic trouble code set within an electronic control unit in the first vehicle;
   determining a damaged portion of the first vehicle via the user interface component, wherein the damaged portion indicates where the first vehicle was damaged by a collision;
   determining that the diagnostic trouble code is collision-related, wherein determining the diagnostic trouble code is collision-related includes determining that the damaged portion of the first vehicle matches a reference vehicle portion associated with both a component attributable to setting the diagnostic trouble code and the vehicle model associated with the first vehicle; and outputting a collision report that indicates the diagnostic trouble code is collision-related.

8. A computing system comprising:
a processor;
a user interface component;
a non-transitory computer-readable memory; and
program instructions stored on the non-transitory computer-readable memory and executable by the processor to perform functions comprising:
  determining a vehicle model associated with a first vehicle;
  determining a diagnostic trouble code set within an electronic control unit in the first vehicle;
  determining a damaged portion of the first vehicle via the user interface component, wherein the damaged portion indicates where the first vehicle was damaged by a collision;
  determining that the diagnostic trouble code is collision-related, wherein determining the diagnostic trouble code is collision-related includes determining that the damaged portion of the first vehicle matches a reference vehicle portion associated with both a component attributable to setting the diagnostic trouble code and the vehicle model associated with the first vehicle; and
  outputting a collision report that indicates the diagnostic trouble code is collision-related.

9. The computing system of claim 8,
wherein the user interface component includes a display and a capture device, and
wherein determining the damaged portion of the first vehicle via the user interface component includes:
  capturing, by the capture device, an image of the first vehicle;
  displaying, on the display, the image including multiple grid locations that correspond to respective portions of a grid and to respective portions of the first vehicle, wherein a first grid location of the multiple grid locations corresponds to a particular portion of the first vehicle, and
  receiving a selection of the first grid location;
wherein the damaged portion of the first vehicle includes the particular portion of the first vehicle.

10. The computing system of claim 9, wherein:
the display comprises a touch screen display, and
the touch screen display is configured for entry of the selection of the first grid location.

11. The computing system of claim 9, wherein displaying the image including multiple grid locations includes displaying the grid.

12. The computing system of claim 8,
wherein the user interface component includes a display and a capture device,
wherein determining the damaged portion of the first vehicle via the user interface component includes:
  capturing, by the capture device, a first image showing the first vehicle;
  displaying, on the display, the first image and a reference image of a second vehicle similar to the first vehicle;
  aligning edges of a first portion of the first vehicle shown in the first image with edges of a first portion of the second vehicle shown in the reference image, wherein the first portion of the first vehicle is similar to the first portion of the second vehicle; and
  while the edges of the first portion of the first vehicle and the edges of the first portion of the second vehicle are aligned, determining edges of a second portion of the first vehicle shown in the first image and edges of a second portion of the second vehicle shown in the reference image are not aligned; and
wherein the damaged portion of the first vehicle includes the second portion of the first vehicle.

13. The computing system of claim 8:
wherein the user interface component includes a display,
wherein determining the damaged portion of the first vehicle via the user interface component includes:
  displaying, on the display, an image showing separately-selectable portions of a reference vehicle, wherein the separately-selectable portions include a particular portion of the reference vehicle;
  highlighting, on the display, the particular portion of the reference vehicle in response to a selection of the particular portion made using the user interface component;
  determining, by the processor, selection of damaged vehicle portions is complete, and
wherein the particular portion of the reference vehicle is indicative of the damaged portion of the first vehicle.

14. The computing system of claim 13, wherein displaying the image includes rotating the image to display a portion of the reference vehicle not shown on the display prior to rotating the image.

15. The computing system of claim 8, wherein:
the user interface component includes a virtual control, and
the damaged portion of the first vehicle is selected using the virtual control.

16. The computing system of claim 8:
wherein the user interface component includes a display,
wherein determining the damaged portion of the first vehicle via the user interface component includes:
  outputting, on the display, one or more measurement fields configured for entry of a gap measurement that indicates a distance between two adjacent vehicle body components, and
  determining that a particular gap measurement entered into a particular measurement field is greater than a gap measurement between two corresponding adjacent vehicle body components on a reference vehicle, and
wherein the damaged portion of the first vehicle is one or both of the two adjacent vehicle body components.

17. The computing system of claim 8, wherein:
the user interface component includes one or more from among: a display, a keypad, a capture device, or a microphone, and
the capture device includes one or more from among: an image scanner, a barcode scanner, a visual light camera, a thermal camera, a light source, a lens, or an image sensor.

18. The computing system of claim 8, wherein the computing system includes and/or is arranged as a wearable computing device.

19. The computing system of claim 18, wherein the wearable computing device is wearable on a user's head.

20. The computing system of claim 8, wherein the user interface component includes a virtual control.

* * * * *